US010514087B2

(12) United States Patent
Nakayama et al.

(10) Patent No.: US 10,514,087 B2
(45) Date of Patent: Dec. 24, 2019

(54) DRIVING SYSTEM

(71) Applicant: HONDA MOTOR CO., LTD., Tokyo (JP)

(72) Inventors: Shigeru Nakayama, Wako (JP); Kenji Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/134,104

(22) Filed: Sep. 18, 2018

(65) Prior Publication Data

US 2019/0017584 A1 Jan. 17, 2019

Related U.S. Application Data

(63) Continuation of application No. 15/104,901, filed as application No. PCT/JP2014/083186 on Dec. 16, 2014, now Pat. No. 10,100,910.

(30) Foreign Application Priority Data

Dec. 16, 2013 (JP) ................................. 2013-259429

(51) Int. Cl.
F16H 48/10 (2012.01)
B60K 6/365 (2007.10)
(Continued)

(52) U.S. Cl.
CPC ............. F16H 48/10 (2013.01); B60K 6/365 (2013.01); B60K 6/52 (2013.01); B60Y 2200/92 (2013.01);
(Continued)

(58) Field of Classification Search
CPC ................. F16H 48/10; B60K 6/365
See application file for complete search history.

(56) References Cited

U.S. PATENT DOCUMENTS 6,120,407 A * 9/2000 Mimura ................. B60K 17/16
475/205
7,156,766 B2 * 1/2007 Gassmann ............. B60K 17/16
475/249

(Continued)

FOREIGN PATENT DOCUMENTS

CN 102448757 A 5/2012
JP 3599847 B2 12/2004
(Continued)

OTHER PUBLICATIONS

International Search Report dated Mar. 17, 2015, issued in counterpart International Application No. PCT/JP2014/083186, with English translation (4 pages).
(Continued)

Primary Examiner — Tisha D Lewis
(74) Attorney, Agent, or Firm — Westerman, Hattori, Daniels & Adrian, LLP

(57) ABSTRACT

A driving system includes a drive source for driving a left drive portion and a right drive portion, a power transmission mechanism having first and second differential mechanisms each including a first rotating element, a second rotating element and a third rotating element and a switching unit. The first rotating elements of the first and second differential mechanisms are connected to each other so as to rotate in the same direction, the second rotating elements of the first and second differential elements are connected to the left drive portion and the right drive portion, respectively, and the third rotating elements of the first and second differential mechanisms are connected to each other so as to rotate in opposite directions.

3 Claims, 36 Drawing Sheets

(51) Int. Cl.
 *B60K 6/52* (2007.10)
 *F16H 48/36* (2012.01)
(52) U.S. Cl.
 CPC ....... *B60Y 2400/73* (2013.01); *B60Y 2400/80* (2013.01); *B60Y 2400/82* (2013.01); *F16H 48/36* (2013.01); *F16H 2048/104* (2013.01); *F16H 2048/106* (2013.01); *Y10S 903/911* (2013.01); *Y10S 903/916* (2013.01)

(56) References Cited

U.S. PATENT DOCUMENTS

| | | |
|---|---|---|
| 7,429,227 B2 | 9/2008 | Honda et al. |
| 9,248,732 B2 | 2/2016 | Honda |
| 9,494,218 B2 | 11/2016 | Honda |
| 9,657,825 B2 | 5/2017 | Ohmura et al. |
| 9,671,016 B2 | 6/2017 | Nakayama |
| 10,100,910 B2 * | 10/2018 | Nakayama .............. F16H 48/10 |
| 2011/0035130 A1 | 2/2011 | Noguchi et al. |
| 2012/0115677 A1 | 5/2012 | Sakai et al. |

FOREIGN PATENT DOCUMENTS

| | | |
|---|---|---|
| JP | 2007-137289 A | 6/2007 |
| JP | 2008-298240 A | 12/2008 |
| JP | 2010-001963 A | 1/2010 |
| JP | 2010-144762 A | 7/2010 |
| JP | 2010-190285 A | 9/2010 |

OTHER PUBLICATIONS

Extended (supplementary) European Search Report dated Jul. 26, 2017, issued in counterpart European Application No. 14870895.1. (9 pages).

Office Action dated Jan. 19, 2018, issued in counterpart Chinese Application No. 201480068417.X, with English translation. (18 pages).

Machine translation of JP2010190285A filed Jan. 21, 2018 (Year: 2018).

* cited by examiner

<FWD STRAIGHT-TRAVELING>

<FWD TURNING>

<FWD STRAIGHT-TRAVELING>

<FWD TURNING>

<4WD STRAIGHT-TRAVELING>

<4WD TURNING>

<4WD TURNING>

<TORQUE VECTORING STRAIGHT-TRAVELING>

<TORQUE VECTORING TURNING>

<TORQUE VECTORING TURNING>

<FWD STRAIGHT-TRAVELING>

<4WD STRAIGHT-TRAVELING>

(a)

(b)

(c)

DRIVING SYSTEM

CROSS-REFERENCE TO RELATED APPLICATIONS

This application is a continuation of U.S. application Ser. No. 15/104,901, filed on Jun. 15, 2016, now U.S. Pat. No. 10,100,910, issued on Oct. 16, 2018, which is a national stage application filed under 35 U.S.C. § 371 of International Application No. PCT/JP2014/083186, filed on Dec. 16, 2014, which is based upon and claims the benefit of priority of the prior Japanese Patent Application No. 2013-259429, filed on Dec. 16, 2013, the entire contents of which are incorporated herein by reference.

TECHNICAL FIELD

The present invention relates to a driving system and more particularly to a driving system that includes a drive source and two differential mechanisms.

BACKGROUND ART

A power transmission mechanism is conventionally known which includes a drive source and two planetary gear mechanisms. For example, a driving force distribution system 100 described in Patent Literature 1 includes, as shown in FIG. 21, two planetary gear mechanisms PL each including a ring gear R, planetary gears P, a planetary carrier C and a sun gear S and two power sources having a drive motor 102 that gives a driving force to a shaft 101 that connects together the sun gears S of the two planetary gear mechanisms PL and a control motor 103 that generates a difference in driving force between left and right wheels. Then, according to the description of Patent Literature 1, the driving force distribution system 100 can be controlled so that a driving force sum of the left and right wheels that influences a front-rear motion (behavior) of a wheeled vehicle is given by driving the drive motor 102 while by driving the control motor 103 as required while running by means of the driving force of the drive motor 102, a driving force difference of the left and right wheels that influences a turning motion (behavior) of the wheeled vehicle is given.

Namely, the driving force distribution system 100 described in Patent Literature 1 includes the two power sources (the drive motor 102, the control motor 103) and can control simultaneously both the driving force sum of the left and right wheels that influences mainly the front-rear motion (behavior) of the wheeled vehicle and the driving force difference of the left and right wheels that influences mainly the turning motion (behavior) of the wheeled vehicle.

Additionally, Patent Literature 2 discloses a left and right wheel coupling unit in which a transmission system including two gears is provided at one side of a bevel differential gear that is connected to a motor and a transmission system including two gears and a transmission system including three gears are provided via a switching device at the other side of the bevel differential gear. In the transmission system including the two gears that is provided at the other side of the bevel differential gear, a gear ratio thereof is set to be the same as that of the transmission system including the two gears that is provided at the one side of the bevel differential gear. In the transmission system including the three gears that is provided at the other side of the bevel differential gear, a gear ratio thereof is set to be the same as that of the transmission system including the two gears that is provided at the one side of the bevel differential gear, these two gear ratios being opposite to each other in working direction and equal to each other in absolute value. According to this coupling unit, when the transmission system including the two gears is selected by the switching device, the torque of the motor is transmitted to the left and right wheels in the same direction and in the same magnitude, whereby a forward start or a reverse start can be assisted. When the transmission system including the three gears is selected, the torque of the motor is transmitted to the left and right wheels in the opposite directions and in the same magnitude, whereby a turning assist can be provided in which a yaw moment is generated in a turning direction.

PRIOR ART LITERATURE

Patent Literature

Patent Literature 1: JP-A-2010-144762
Patent Literature 2: Japanese Patent No. 3599847

SUMMARY OF THE INVENTION

Problem that the Invention is to Solve

However, with the driving force distribution system 100 of Patent Literature 1, the two power sources are needed, the increased production costs have to be involved, and the enlargement in size of the system is inevitable. Thus, there is still room for improvement. Additionally, with the coupling unit of Patent Literature 2, the absolute values of the gear ratios are the same whether the starting assist or the turning assist is performed, and hence, a large difference in magnitude cannot be given between the front-rear assist and the turning assist. Thus, there is still room for improvement.

The invention provides a driving system in which a control to give a driving force sum to a left driving portion and a right driving portion and a control to give a driving force difference between the left driving portion and the right driving portion can be switched to one or the other with a single drive source and magnitudes of absolute values of the driving force sum and the driving force difference that are given to the same power of the drive source can be set separately and independently.

Means for Solving the Problem

The present invention provides the following aspects.
According to a first aspect, there is provided a driving system (e.g., a rear wheel driving system 20 in embodiment) including:
a drive source (e.g., a motor MOT in embodiment), which drives a left driving portion (e.g., a left rear wheel LWr in embodiment) that is disposed on a left side of a vehicle (e.g., a wheeled vehicle V in embodiment) with respect to a traveling direction and a right driving portion (e.g., a right rear wheel RWr in embodiment) that is disposed on a right side of the vehicle with respect to the traveling direction; and
a power transmission mechanism (e.g., a power transmission mechanism TM2 in embodiment), which has a first differential mechanism (e.g., a first planetary gear mechanism PL1 in embodiment) and a second differential mechanism (e.g., a second planetary gear mechanism PL2 in embodiment), each having a first rotating element, a second rotating element, and a third rotating element, wherein:
the first rotating elements of the first and second differential mechanisms are connected to each other so as to rotate integrally in a same direction;

the second rotating elements of the first and second differential mechanisms are connected to the left driving portion and the right driving portion, respectively;

the third rotating elements of the first and second differential mechanisms are connected to each other so as to rotate in opposite directions; and the power transmission mechanism includes a switching unit (e.g., first and second clutches CL1, CL2 in embodiment) that switches selectively between a first connected state where the drive source and the first rotating elements of the first and second differential mechanisms are connected and a second connected state where the drive source and the third rotating elements of the first and second differential mechanisms are connected.

In addition to the configuration of the first aspect, a second aspect is characterized in that:

the power transmission mechanism includes:

a first switching mechanism (e.g., the first clutch CL1 in embodiment) that can switch between an applied state where a power transmission path between the drive source and the first rotating elements of the first and second differential mechanisms is connected and a released state where the power transmission path between the drive source and the first rotating elements of the first and second differential mechanisms is disconnected; and a second switching mechanism (e.g., the second clutch CL2 in embodiment) that can switch between an applied state where a power transmission path between the drive source and the third rotating elements of the first and second differential mechanisms is connected and a released state where the power transmission path between the drive source and the third rotating elements of the first and second differential mechanisms is disconnected; and the power transmission mechanism is configured to switch between a first state where the first switching mechanism is in the applied state while the second switching mechanism is in the released state and a second state where the first switching mechanism is in the released state while the second switching mechanism is in the applied state.

In addition to the configuration of the second aspect, a third aspect is characterized in that the first switching mechanism and the second switching mechanism are switched between the applied state and the released state by a same operating device (e.g., an actuator in embodiment).

In addition to the configuration of the third aspect, a fourth aspect is characterized in that the first switching mechanism and the second switching mechanism are disposed on a same rotational axis.

In addition to the configuration of the fourth aspect, a fifth aspect is characterized in that the first rotating elements of the first and second differential mechanisms are disposed on the rotational axis.

In addition to the configuration of the second or third aspect, a sixth aspect is characterized in that the first switching mechanism and the first rotating elements of the first and second differential mechanisms are disposed on a same rotational axis.

In addition to the sixth aspect, a seventh aspect is characterized in that the first switching mechanism and the second switching mechanism are disposed in positions that are offset in a radial direction and are disposed in positions that overlap in an axial direction.

In addition to the configuration according to any one of the first to seventh aspects, an eighth aspect is characterized in that the drive source is disposed on one side or the other side of the first and second differential mechanisms in an axial direction.

In addition to the configuration of the eighth aspect, a ninth aspect is characterized in that the drive source is disposed on a side opposite to the second differential mechanism with respect to the first differential mechanism in the axial direction or on a side opposite to the first differential mechanism with respect to the second differential mechanism in the axial direction, and in a position that is offset from the first and second differential mechanism in the axial direction.

In addition to the configuration of any one of the first to ninth aspects, a tenth aspect is characterized in that:

the switching unit switches to the first connected state when a speed of the vehicle is slower than a predetermined speed; and the switching unit switches to the second connected state when the speed of the vehicle is equal to or faster than the predetermined speed.

In addition to the configuration of the tenth aspect, an eleventh aspect is characterized in that:

the driving system is connected to an energy delivery and receipt unit that executes at least one of a supply of energy to the drive source and a recovery of energy from the drive source;

the energy delivery and receipt unit includes a first energy delivery and receipt unit (e.g., a generator GEN, a capacitor CAP in embodiment) and a second energy delivery and receipt unit (e.g., a battery BATT in embodiment);

the drive source is connected to the first energy delivery and receipt unit and the second energy delivery and receipt unit in a switchable fashion;

the first energy delivery and receipt unit is connected to another drive source (e.g., an engine ENG in embodiment) that is different from the drive source so as to recover energy from the another drive source; and the second energy delivery and receipt unit includes an energy storage unit (e.g., a battery BATT in embodiment).

In addition to the configuration of the eleventh aspect, a twelfth aspect is characterized in that:

the drive source is connected to the first energy delivery and receipt unit when the speed of the vehicle is slower than the predetermined speed; and the drive source is connected to the second energy delivery and receipt unit when the speed of the vehicle is equal to or faster than the predetermined speed.

According to a thirteenth aspect, the third rotating elements of the first and second differential mechanisms are connected to each other via an odd number of times of meshing occurring therebetween.

Advantage of the Invention

According to the first aspect, with the single drive source, the driving force can be applied to the two driving portions in the same direction or the driving force can be applied to the two driving portions in opposite directions. Then, for example, in the event that the driving system is mounted on a vehicle, a control to give a driving force sum to left and right wheels and a control to create a driving force difference between the left and right wheels can be switched to one or the other. In addition, the magnitudes of absolute values of the driving force sum and the driving force difference that are given by the same power of the drive source can be set separately and independently.

According to the second aspect, the power transmission path between the drive source and the third rotating elements is disconnected when the drive source and the first rotating elements are connected together and the power transmission path between the drive source and the first rotating elements is disconnected when the drive source and the third rotating elements are connected together. Thus, the power can be transmitted either to the first rotating elements or to the third rotating elements in an ensured fashion.

According to the third aspect, since the two switching mechanisms can be controlled by the same operating device, not only can it easily be avoided that both the first switching mechanism and the second switching mechanism are put in the applied state, but also the number of components involved can be reduced compared with a case where two separate operating devices are provided for the two switching mechanisms, thereby making it possible to suppress the production costs.

According to the fourth aspect, the first switching mechanism and the second switching mechanism can be disposed while suppressing the expansion of the radial dimension of the driving system.

According to the fifth aspect, since the first switching mechanism and the second switching mechanism are disposed in line with the first rotating elements of the first and second differential mechanisms, the first switching mechanism and the second switching mechanism can be disposed, for example, by making use of a space defined between the first and second differential mechanisms.

According to the sixth aspect, since the first switching mechanism is disposed in line with the first rotating elements of the first and second differential mechanisms, the first switching mechanism can be disposed, for example, by making use of the space defined between the first and second differential mechanisms.

According to the seventh aspect, the first switching mechanism and the second switching mechanism can be disposed while suppressing the expansion of the axial dimension of the driving system.

According to the eighth aspect, compared with a case where the drive source is disposed so as to be held between the first and second differential mechanisms, the connecting portions between the left and right driving portions and the second rotating elements can be shifted inwards in a vehicle's width direction. Therefore, an angle defined from the connecting portion to the wheel or a wheel side member can be restrained from being increased.

According to the ninth aspect, the radial dimension can also be reduced.

According to the tenth aspect, the two driving portions can be driven in the same direction when the speed of the vehicle is slower than the predetermined speed, while the two driving portions can be driven in the opposite directions when the speed of the vehicle is equal to or faster than the predetermined speed. Therefore, it is possible to give assist in a case where a large front-rear driving force is required as when the wheeled vehicle starts and travels at low speeds and to effect torque vectoring to improve a vehicle's steering performance.

According to the eleventh aspect, since the drive source is connected to the first energy delivery and receipt unit that can be connected to the another drive source and the storage unit in a switchable fashion, the connecting destination of the drive source can be selected according to situations.

According to the twelfth aspect, since a large driving force is needed when the vehicle starts or travels at low speeds, the drive source is driven with electric power generated by the first energy delivery and receipt unit that can be connected to the another drive source, and since only less electric power is needed when the torque vectoring is effected at vehicle speeds equal to or faster than the predetermined speed than when the vehicle starts or travels at low speeds, the drive source can be driven with electric power of the storage unit.

According to the thirteenth aspect, the third rotating elements of the first and second differential mechanisms can easily be connected so as to rotate in the opposite directions.

MODE FOR CARRYING OUT THE INVENTION

Firstly, referring to FIG. 1, a wheeled vehicle according to an embodiment will be described on which a driving system of the invention can be mounted.

Figure 1:
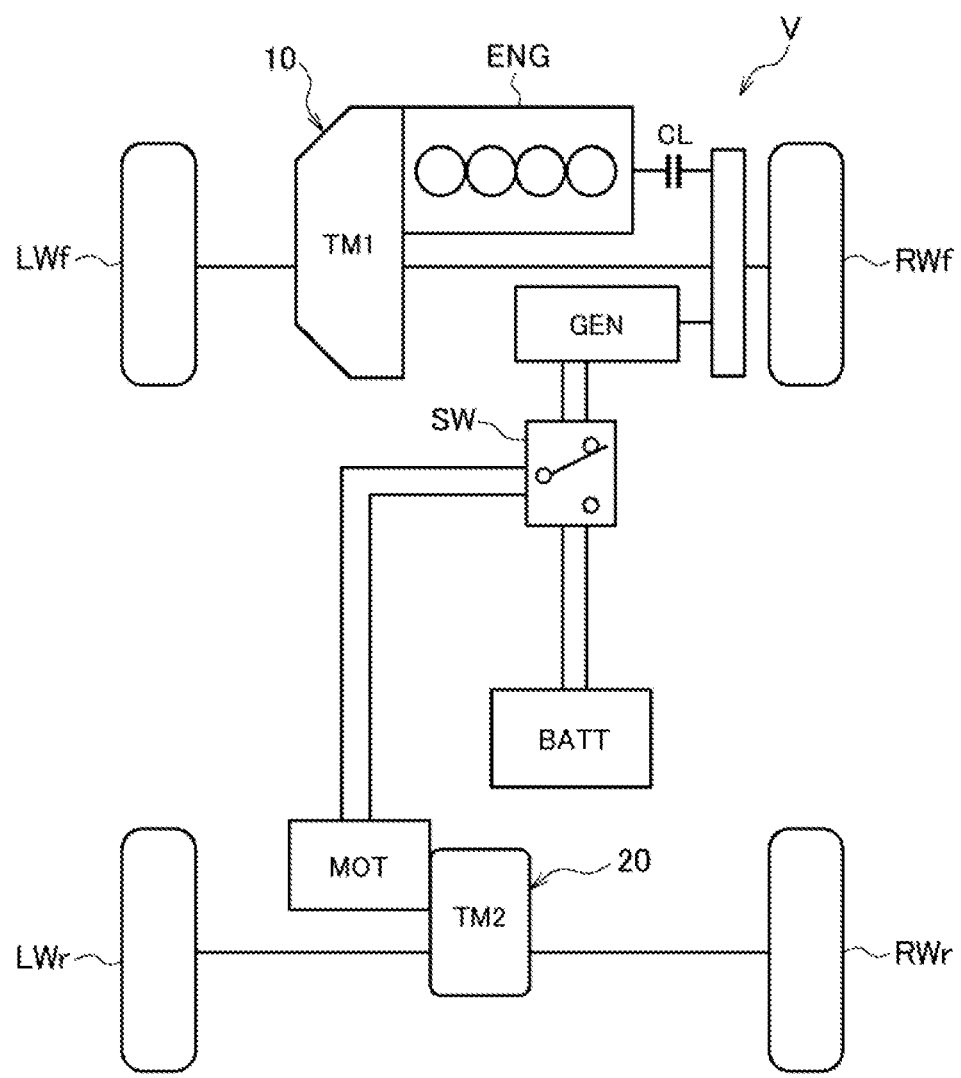
FIG. 1 is a schematic block diagram of a wheeled vehicle according to an embodiment on which a driving system of the invention can be mounted.

As shown in FIG. 1, a wheeled vehicle V is a four-wheel drive vehicle that includes a front wheel driving system 10 that drives left and right front wheels LWf, RWf by the use of an engine ENG via a power transmission mechanism TM1 and a rear wheel driving system 20 that drives left and right rear wheels LWr, RWr by the use of a motor MOT via a power transmission mechanism TM2.

In the front wheel driving system 10, the engine ENG is connected to a generator GEN via a clutch CL, and the engine ENG provides a thrusting force to the vehicle V as a main drive source. The rear wheel driving system 20 assists the front wheel driving system 10 and executes a front-rear traveling assist and a left-right turning assist, which will both be described later, as required by switching to one or the other of the assists. The motor MOT of the rear wheel driving system 20 is connected selectively to the generator GEN of the front wheel driving system 10 and a battery BATT via a switching mechanism SW. Namely, the switching mechanism SW enables the selection of a state where the motor MOT and the generator GEN are electrically connected and a state where the motor MOT and the battery BATT are electrically connected.

Hereinafter, embodiments of the rear wheel driving system 20, which is a driving system by which the invention is characterized, will be described in detail. Although the driving system by which the invention is characterized may be used in the front wheel driving system 10 of the wheeled vehicle V, here, the driving system will be described as being used in the rear wheel driving system 20.

First Embodiment

Figure 2:
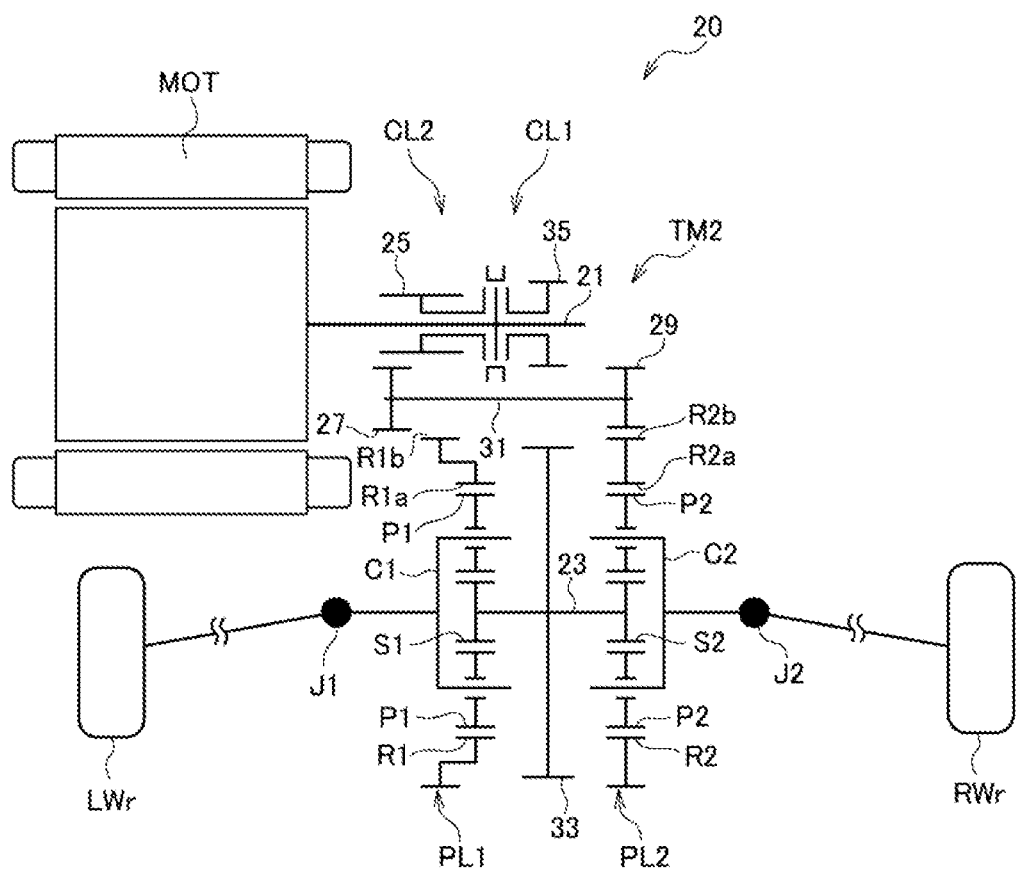
FIG. 2 is a skeleton diagram of a rear wheel driving system of a first embodiment.

The rear wheel driving system 20 includes, as shown in FIG. 2, the motor MOT and the power transmission mechanism TM2. Then, the power transmission mechanism TM2 includes first and second clutches CL1, CL2 which are provided on an output shaft 21 of the motor MOT and two planetary gear mechanisms, which are first and second planetary gear mechanisms PL1, PL2. The first and second planetary gear mechanisms PL1, PL2 are each made up of a so-called single pinion planetary gear mechanism and include, respectively, sun gears S1, S2, ring gears R1, R2 and carriers C1, C2 which support pinions P1, P2 which mesh, respectively, with the sun gears S1, S2 and the ring gears R1, R2 in such a way that the pinions P1, P2 rotate on their own axes and revolve or walk around the sun gears S1, S2. In the first embodiment and modified examples of the first embodiment, the sun gears S1, S2 of the first and second planetary gear mechanisms PL1, PL2 make up first rotating elements of first and second differential mechanisms. The carriers C1, C2 of the first and second planetary gear mechanisms PL1, PL2 make up second rotating elements of the first and second differential mechanisms. The ring gears R1, R2 of the first and second planetary gear mechanisms PL1, PL2 make up third rotating elements of the first and second differential mechanisms. Then, the sun gears S1, S2 of the first and second planetary gear mechanisms PL1, PL2 are connected to each other so as to rotate integrally via a connecting shaft 23. The carriers C1, C2 of the first and second planetary gear mechanisms PL1, PL2 are connected to the left and right rear wheels LWr, RWr via joints J1, J2, respectively.

The first and second planetary gear mechanisms PL1, PL2 have equal gear ratios and are disposed close to each other. The motor MOT is disposed so as to be offset to the left in relation to an axial direction relative to the first and second planetary gear mechanisms PL1, PL2. In addition, the motor MOT overlaps the first and second planetary gear mechanisms PL1, PL2 in a radial direction.

A second input gear 33 is provided on the connecting shaft 23 that connects together the sun gears S1, S2 of the first and second planetary gear mechanisms PL1, PL2 equidistantly from the sun gears S1, S2 so as to rotate integrally with the sun gears S1, S2. Then, this second input gear 33 meshes with a second output gear 35 that is provided on the output shaft 21 of the motor MOT.

The ring gears R1, R2 of the first and second planetary gear mechanisms PL1, PL2 have external teeth R1*b*, R2*b* that are formed on outer circumferential surfaces thereof in addition to internal teeth R1*a*, R2*a* that are formed on inner circumferential surfaces thereof so as to mesh with the pinions P1, P2, respectively. The external teeth R1*b* of the ring gear R1 of the first planetary gear mechanism PL1 mesh with a first output gear 25 that is provided on the output shaft 21 of the motor MOT. The external teeth R2*b* of the ring gear R2 of the second planetary gear mechanism PL2 mesh with a first input gear 29 that is provided coaxially with an idle gear 27 that meshes with the first output gear 25 so as to rotate integrally. Namely, the ring gears R1, R2 of the first and second planetary gear mechanisms PL1, PL2 are connected together through three times of meshing including the meshing of the external teeth R1*b* of the ring gear R1 with the first output gear 25, the meshing of the first output gear 25 with the idle gear 27, and the meshing of the first input gear 29 with the external teeth R2*b* of the ring gear R2. Reference Numeral 31 denotes an idle shaft to one end of which the idle gear 27 is attached and to the other end of which the first input gear 29 is attached.

The two ring gears R1, R2 operate so as to rotate in opposite directions to each other as a result of the ring gears R1, R2 of the first and second planetary gear mechanisms PL1, PL2 being connected together through the odd number of times of meshing in the way described above. Namely, a rotation of the ring gear R1 in one direction causes the first output gear 25 to rotate in the other direction through the meshing of the external teeth R1*b* of the ring gear R1 with the first output gear 25. In addition, the meshing of the first output gear 25 with the idle gear 27 causes the idle gear 27 to rotate in one direction. Since the idle gear 27 and the first input gear 29 rotate integrally via the idle shaft 31, the first input gear 29 also rotates in the one direction. Further, the rotation of the first input gear 29 in the one direction acts to cause the ring gear R2 to rotate in the other direction as a result of the first input gear 29 meshing with the external teeth R2*b* of the ring gear R2.

Additionally, a gear ratio resulting from the meshing of the external teeth R1*b* of the ring gear R1 with the first output gear 25 and a gear ratio resulting from the meshing of the first output gear 25 with the idle gear 27 and the meshing of the first input gear 29 with the external teeth R2*b* of the ring gear R2 are set so that absolute values thereof become equal to each other. Consequently, torque of the motor MOT that is transmitted to the first output gear 25 is always transmitted to the ring gears R1, R2 as torque having the equal absolute value and acting in the opposite directions.

A second output gear 35 provided on the output shaft 21 of the motor MOT and the first output gear 25 are disposed so as not only to rotate relatively but also to face each other in the axial direction. The second output gear 35 and the first output gear 25 are made to rotate integrally with or rotate relative to the output shaft 21 through switching by the first and second clutches CL1, CL2. Namely, when applied or released, the first clutch CL1 connects or disconnects a power transmission between the output shaft 21 of the motor MOT and the second output gear 35. When applied or released, the second clutch CL2 connects or disconnects a power transmission between the output shaft 21 of the motor MOT and the first output gear 25. The first and second clutches CL1, CL2 are each made up of a synchromesh mechanism that can be switched over by a common actuator and can be switched over on the same rotation axis, that is, the same rotation axis as the output shaft 21 of the motor MOT.

The first and second clutches CL1, CL2 are allowed to take selectively one of a state in which the first and second clutches CL1, CL2 are both released, a first state in which the first clutch CL1 is applied while the second clutch CL2 is released, and a second state in which the first clutch CL1 is released while the second clutch CL2 is applied.

In the state in which both the first and second clutches CL1, CL2 are released, the output shaft 21 of the motor MOT is not connected to either of the first output gear 25 and the second output gear 35, whereby a power transmission path between the output shaft 21 of the motor MOT and the first and second planetary gear mechanisms PL1, PL2 becomes a disconnected state. When the first and second clutches CL1, CL2 take the state in which the clutches CL1, CL2 are both released, no torque is transmitted from the motor MOT to the left and right rear wheels LWr, RWr, whereby neither a left-right driving force sum nor a left-right driving force difference is generated from the rear wheel driving system 20, this enabling a front-wheel drive (FWD), which will be described later.

In the first state in which the first clutch CL1 is applied while the second clutch CL2 is released, the output shaft 21 of the motor MOT is connected to the second output gear 35, whereby a power transmission path between the output shaft 21 of the motor MOT and the sun gears S1, S2 of the first and second planetary gear mechanisms PL1, PL2 becomes a connected state via a second input gear 33. When the first and second clutches CL1, CL2 take the first state, torques of the same magnitude are transmitted from the motor MOT to the left and right rear wheels LWr, RWr in the same direction in the front-rear direction, whereby a desired left-right driving force sum is generated from the rear wheel driving system 20 while no left-right driving force difference is generated therefrom, this enabling a four-wheel drive (4WD), which will be described later.

In the second state in which the first clutch CL1 is released while the second clutch CL2 is applied, the output shaft 21 of the motor MOT is connected to the first output gear 25, whereby a power transmission path between the output shaft 21 of the motor MOT and the ring gears R1, R2 of the first and second planetary gear mechanisms PL1, PL2 becomes a connected state. When the first and second clutches CL1, CL2 take the second state, torques of the same magnitude are transmitted from the motor MOT to the left and right rear wheels LWr, RWr in opposite directions in the front-rear direction, whereby a desired left-right driving force difference is generated from the rear wheel driving system 20 while no left-right driving force sum is generated therefrom, this enabling a torque vectoring drive (TV), which will be described later.

Namely, the output shaft 21 of the motor MOT can selectively be switched for connection with the sun gears S1, S2 of the first and second planetary gear mechanisms PL1, PL2 and the ring gears R1, R2 of the first and second planetary gear mechanisms PL1, PL2.

In the rear wheel driving system 20 that is configured in the way described heretofore, since the first and second planetary gear mechanisms PL1, PL2 are configured in the way described above, the sun gear S1, the carrier C1 and the ring gear R1 can transmit power to one another, and rotation speeds thereof are in a collinear relationship. Then, the sun gear S2, the carrier C2 and the ring gear R2 can transmit power to one another, and rotation speeds thereof are in a collinear relationship. Here, the collinear relationship means a relationship in which the rotation speeds thereof are aligned on a single straight line in a collinear chart.

Since the sun gear S1 and the sun gear S2 are connected so as to rotate integrally via the connecting shaft 23, the rotation speeds of the sun gear S1 and the sun gear S2 are equal to each other. Further, the two ring gears R1, R2 operate so as to rotate in the opposite directions to each other at the same rotation speed as a result of the ring gears R1, R2 of the first and second planetary gear mechanisms PL1, PL2 being connected together through the odd number of times of meshing. This means that to describe using a collinear chart (for example, FIGS. 3A and 3B) showing rotation speeds, the rotation speeds of the two ring gears R1, R2 are controlled under a relationship in which an imaginary line L1 that connects the two ring gears R1, R2 rotate on a point of intersection where the imaginary line L1 intersects a zero rotation line L2 as a fulcrum O. In this embodiment, due to the gear ratios of the first and second planetary gear mechanisms PL1, PL2 being equal, the point of intersection, which makes up the fulcrum, between the imaginary line L1 and the zero rotation line L2 that indicates zero rotation is positioned at a center of the zero rotation line L2. However, in case the gear ratios of the first and second planetary gear mechanisms PL1, PL2 differ, the point of intersection takes a point on the zero rotation line L2 that deviates from the center thereof.

Consequently, when the wheeled vehicle travels straight ahead with no difference in rotation speed between the left and right rear wheels LWr, RWr, the rotation speeds of the carriers C1, C2 that are connected to the left and right rear wheels LWr, RWr become equal to each other, and the imaginary line L1 that connects the two ring gears R1, R2 coincides with the zero rotation line L2, whereby the rotation speeds of the ring gears R1, R2 both become zero rotation. On the other hand, when the wheeled vehicle turns with a difference in rotation speed between the left and right rear wheels LWr, RWr, a difference in rotation speed is generated on the carriers C1, C2 that are connected to the left and right rear wheels LWr, RWr, and the imaginary line L1 that connects the two ring gears R1, R2 rotates about the fulcrum O, whereby the ring gears R1, R2 rotate in the opposite directions at the same rotation speed.

Hereinafter, the front-wheel drive (FWD), the four-wheel drive (4WD) and the torque vectoring drive (TV) will be described in detail.

—Front-Wheel Drive (FWD)—

Figure 3A:
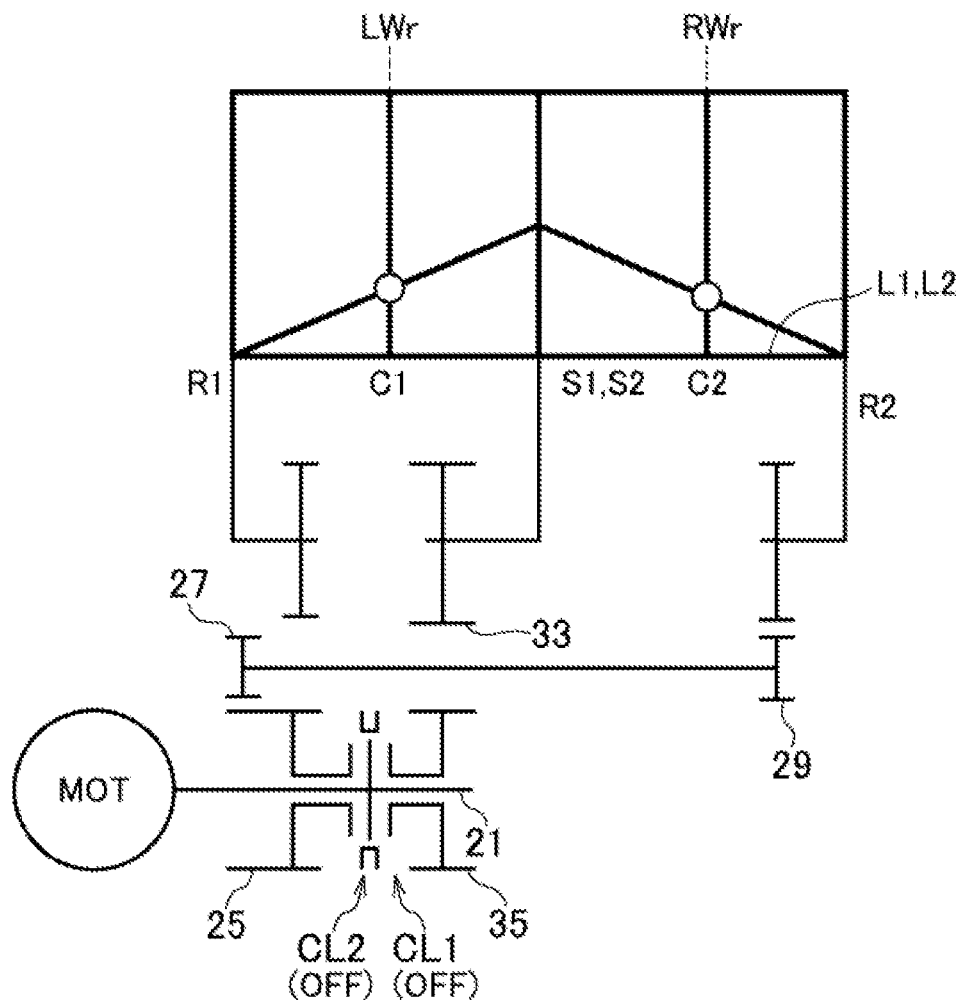
FIG. 3A is a diagram showing a power transmission path and a collinear chart in the rear wheel driving system of the first embodiment when the wheeled vehicle travels straight ahead by front-wheel drive (FWD).
Figure 3B:
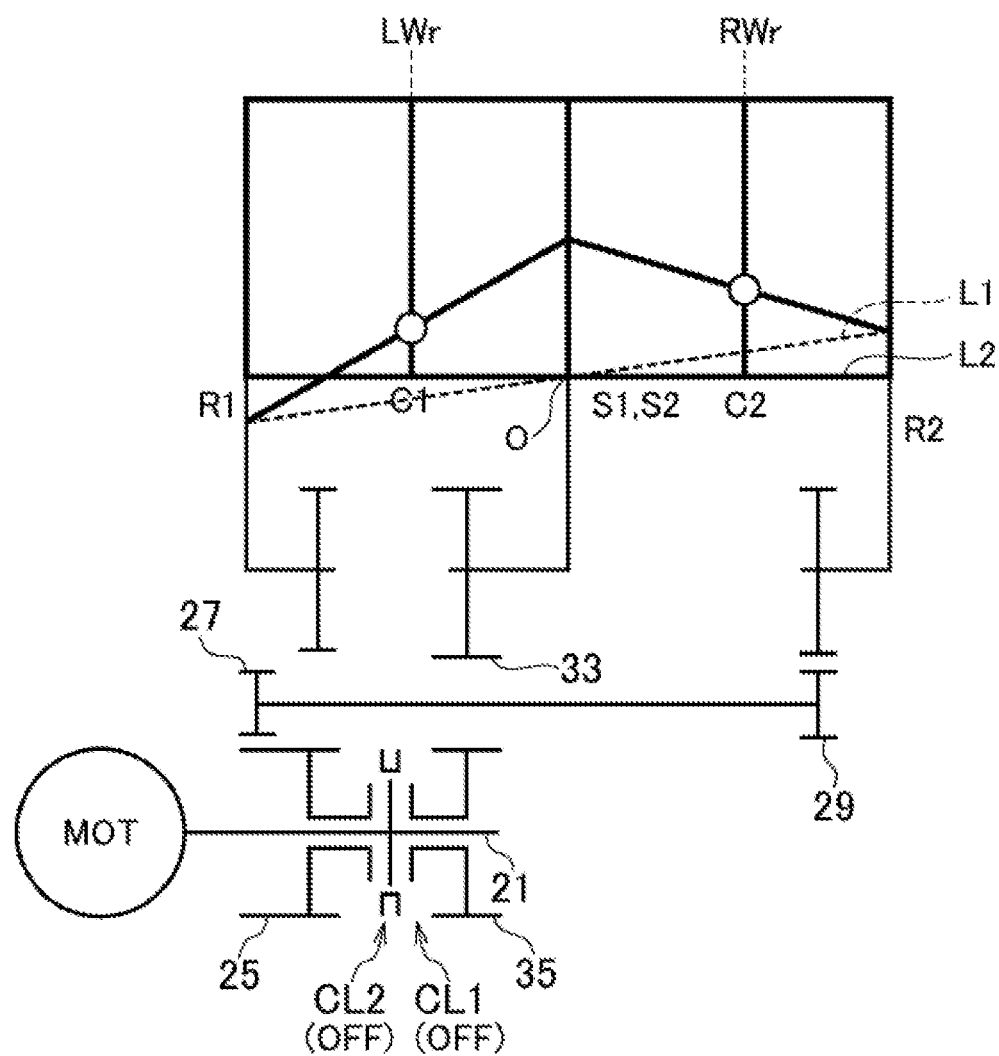
FIG. 3B is a diagram showing a power transmission path and a collinear chart in the rear wheel driving system of the first embodiment when the wheeled vehicle turns by front-wheel drive (FWD).
Figure 3C:
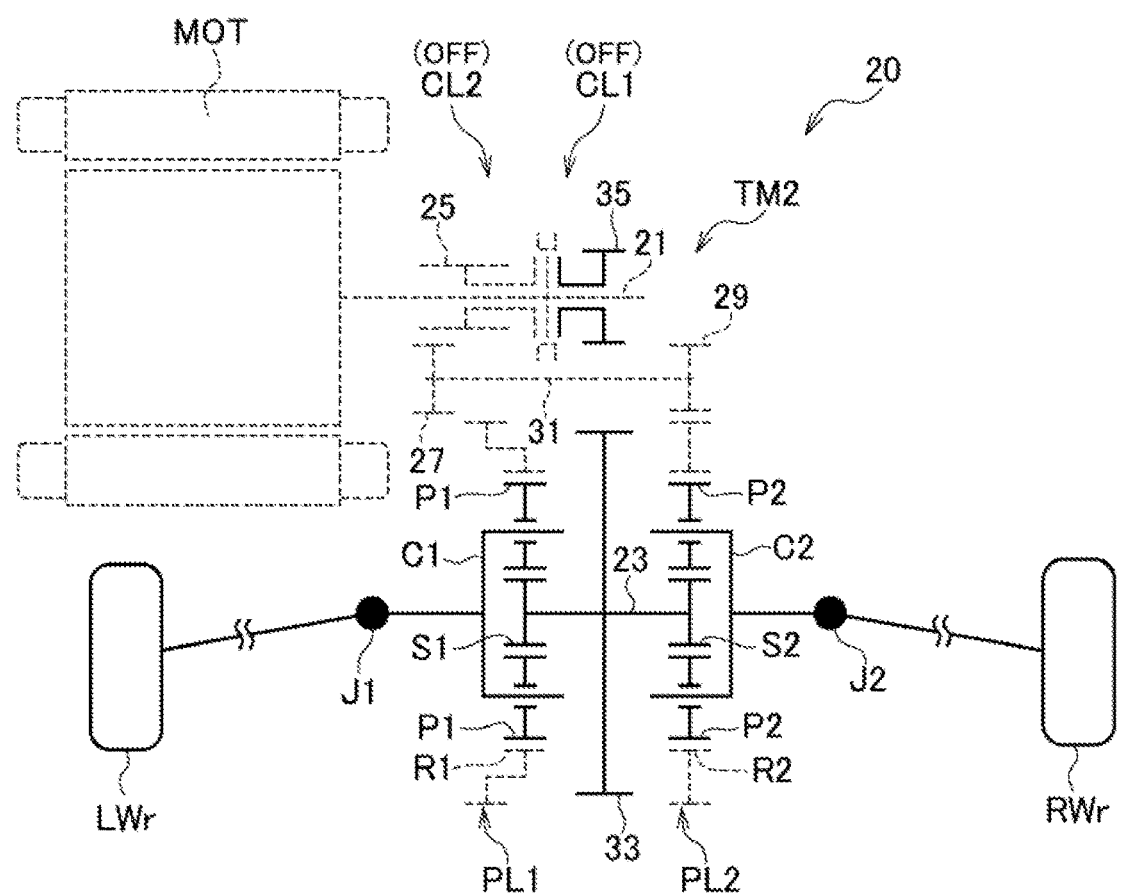
FIG. 3C is a skeleton diagram showing rotating elements in the rear wheel driving system shown in FIG. 3A when the wheeled vehicle travels straight ahead by front-wheel drive (FWD).
Figure 3D:
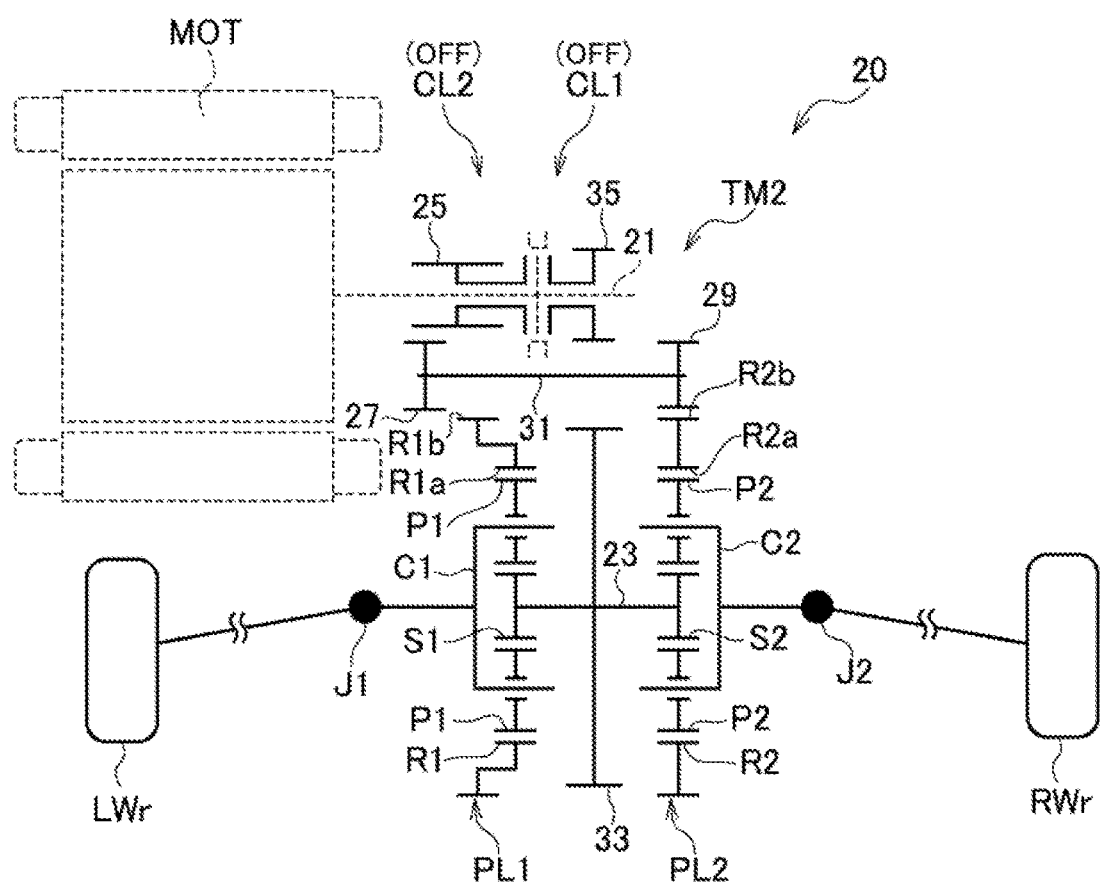
FIG. 3D is a skeleton diagram showing rotating elements in the rear wheel driving system shown in FIG. 3B when the wheeled vehicle turns by front-wheel drive (FWD).

When the state results in which both the first and second clutches CL1, CL2 are released (the first clutch CL1: released/the second clutch CL2: released), the power transmission path between the motor MOT and the first and second planetary gear mechanisms PL1, PL2 becomes a disconnected state, and hence, no torque is transmitted from the motor MOT to the left and right rear wheels LWr, RWr, whereby neither a left-right driving force sum nor a left-right driving force difference is generated from the rear wheel driving system 20. As shown in FIG. 3A, the imaginary line L1 coincides with the zero rotation line L2 when the wheeled vehicle travels straight ahead with no difference in rotation speed between the left and right rear wheels LWr, RWr, and the rotation speeds of the ring gears R1, R2 become zero rotation. On the other hand, when the wheeled vehicle turns with a difference in rotation speed between the left and right rear wheels LWr, RWr, as shown in FIG. 3B, the imaginary line L1 rotates about the fulcrum O on the collinear chart, and the ring gears R1, R2 rotate in the opposite directions at the same rotation speed. In FIG. 3C, the rotating elements of the power transmission mechanism TM2 are shown by solid lines when the wheeled vehicle travels straight ahead by front-wheel drive (FWD) with no difference in rotation speed between the left and right rear wheels LWr, RWr (FIG. 3A). In FIG. 3D, the rotating elements of the power transmission mechanism TM2 are shown by solid lines when the wheeled vehicle turns by front-wheel drive (FWD) with a difference in rotation speed between the left and right rear wheels LWr, RWr (FIG. 3B).

—Four-Wheel Drive (4WD)—

When the first and second clutches CL1, CL2 are in the first state (the first clutch CL1: applied/the second clutch CL2: released), the power transmission path between the motor MOT and the sun gears S1, S2 of the first and second planetary gear mechanisms PL1, PL2 becomes a connected state by way of the second output gear 35 and the second input gear 33, and motor torque M in a forward direction is inputted from the motor MOT into the sun gears S1, S2. In normal first and second planetary gear mechanisms PL1, PL2, in the event that forward torque is inputted into sun gears S1, S2, torque attempting to increase rotation speeds is transmitted to carriers C1, C2 and ring gears R1, R2. However, in the first and second planetary gear mechanisms PL1, PL2 of this embodiment, as has been described above, the ring gears R1, R2 are controlled so as to rotate only in the opposite directions to each other at the same rotation speed, and therefore, with the ring gears R1, R2 acting as fulcrums, the forward motor torque M that is inputted into the sun gears S1, S2 that act as points of application of force is transmitted to the carriers C1, C2 that act as points of action as forward left and right rear wheel torques T1, T2 that result from multiplying motor torques M1, M2 by the gear ratios of the first and second planetary gear mechanisms PL1, PL2. Since the gear ratios of the first and second planetary gear mechanisms PL1, PL2 are equal, the left and right rear wheel torques T1, T2 become torques having equal absolute values and acting in the same direction, and this generates a left-right driving force sum that corresponds to a sum of the left and right rear wheel torques T1, T2 (T1+T2), whereby a forward driving force is given to the wheeled vehicle V stably. A difference between the left and right rear wheel torques T1, T2 (T1−T2) becomes zero, and with the first and second clutch CL1, CL2 staying in the first state, there is no such situation that a left-right driving force difference is generated from the rear wheel driving system 20 due to the generation of torque of the motor MOT, whereby no yaw moment is given to the wheeled vehicle V. In this description, the forward direction means a direction in which the wheeled vehicle V is driven to travel forwards. The rotation direction of the motor MOT that causes the wheeled vehicle V to travel forwards can be changed depending on the arrangement of the gears and the number of gears. In the case of giving torque in a reverse direction to the wheeled vehicle V, namely, when the wheeled vehicle V is reversed, the motor MOT should be torque controlled so as to generate torque acting in an opposite direction to the direction in which the torque acts when the wheeled vehicle V travels forwards.

Figure 4A:
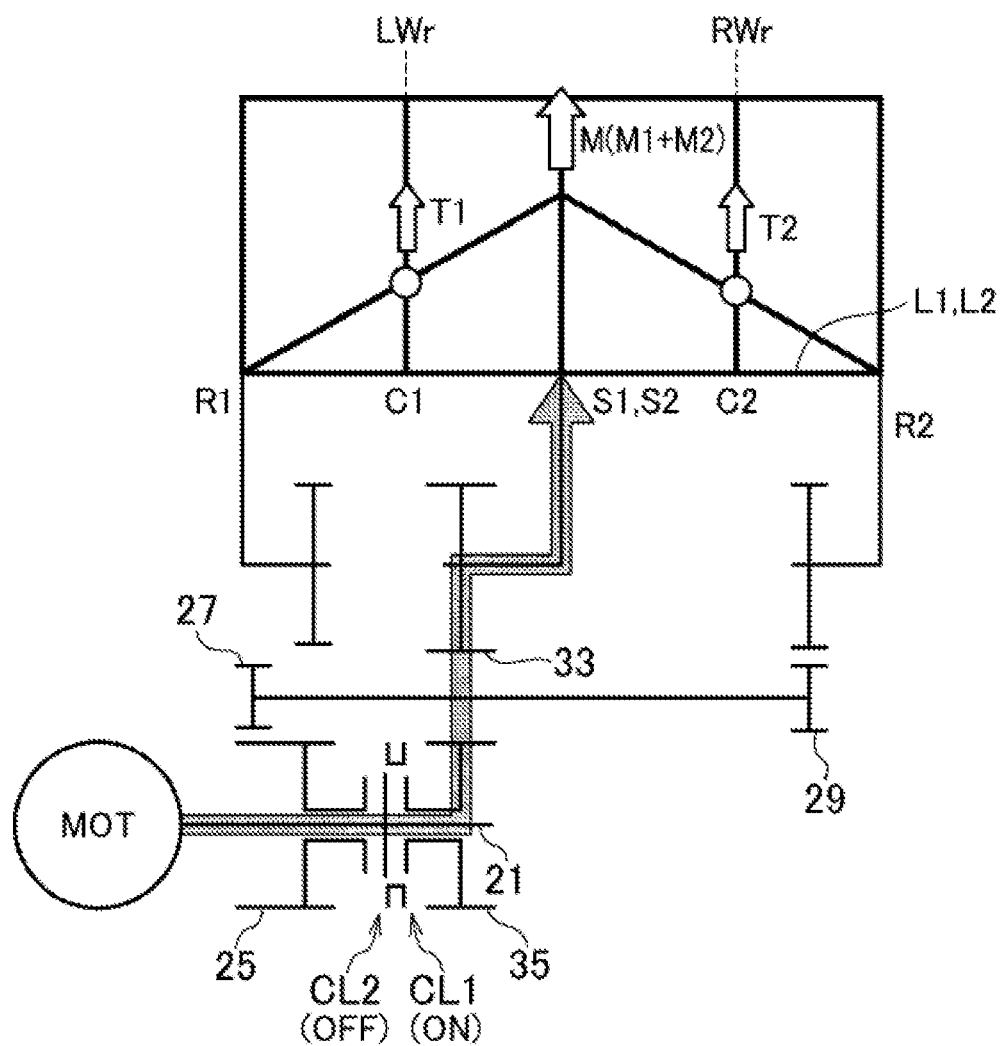
FIG. 4A is a diagram showing a power transmission path and a collinear chart in the rear wheel driving system of the first embodiment when the wheeled vehicle travels straight ahead by four-wheel drive (4WD).
Figure 4B:
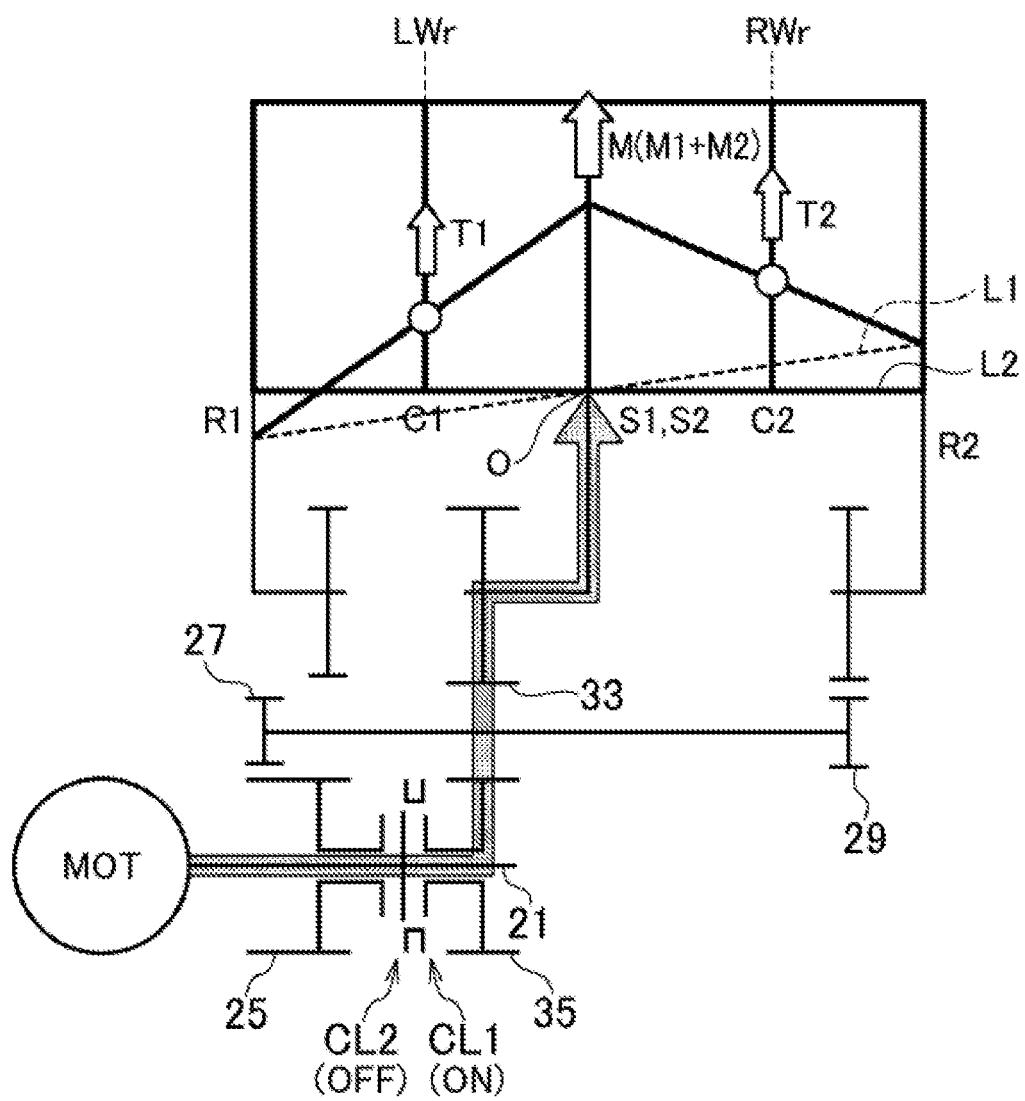
FIG. 4B is a diagram showing a power transmission path and a collinear chart in the rear wheel driving system of the first embodiment when the vehicle turns by four-wheel drive (4WD).
Figure 4C:
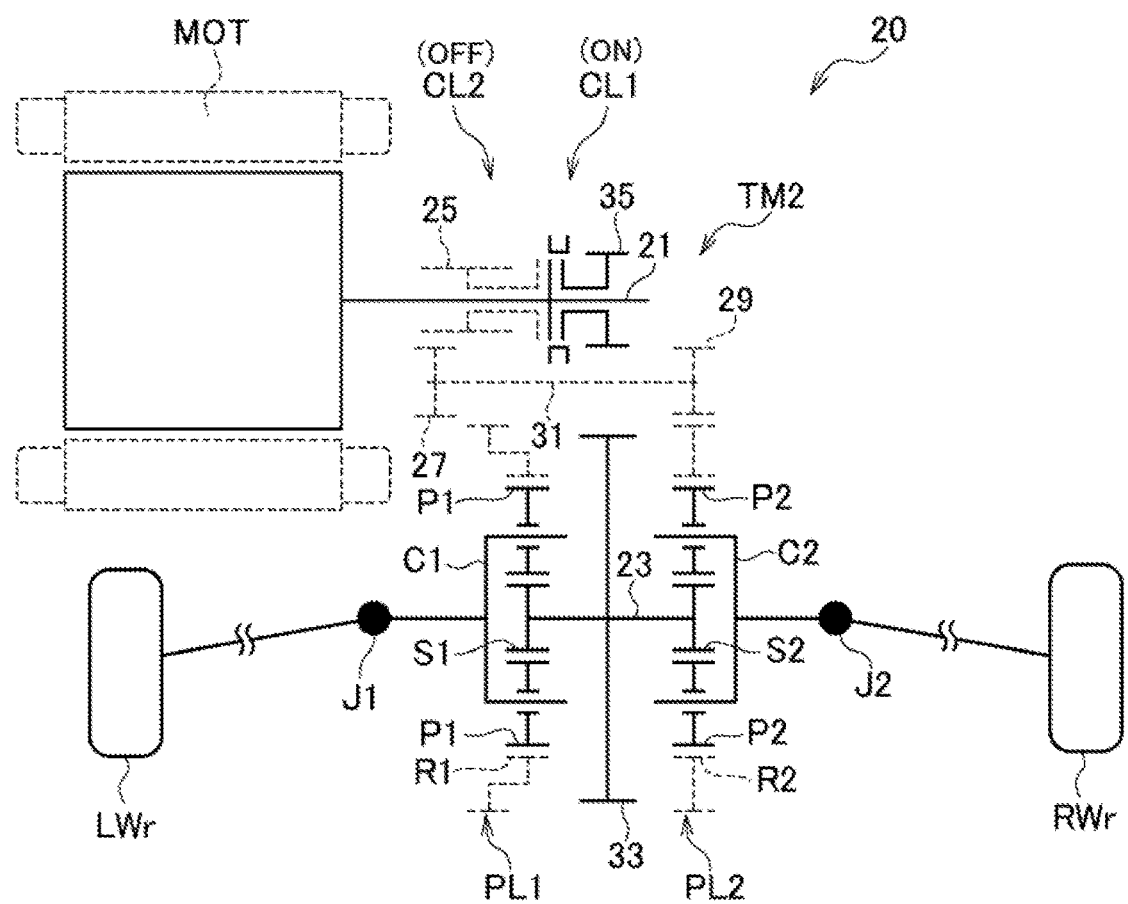
FIG. 4C is a skeleton diagram showing rotating elements in the rear wheel driving system shown in FIG. 4A when the wheeled vehicle travels straight ahead by four-wheel drive (4WD).
Figure 4D:
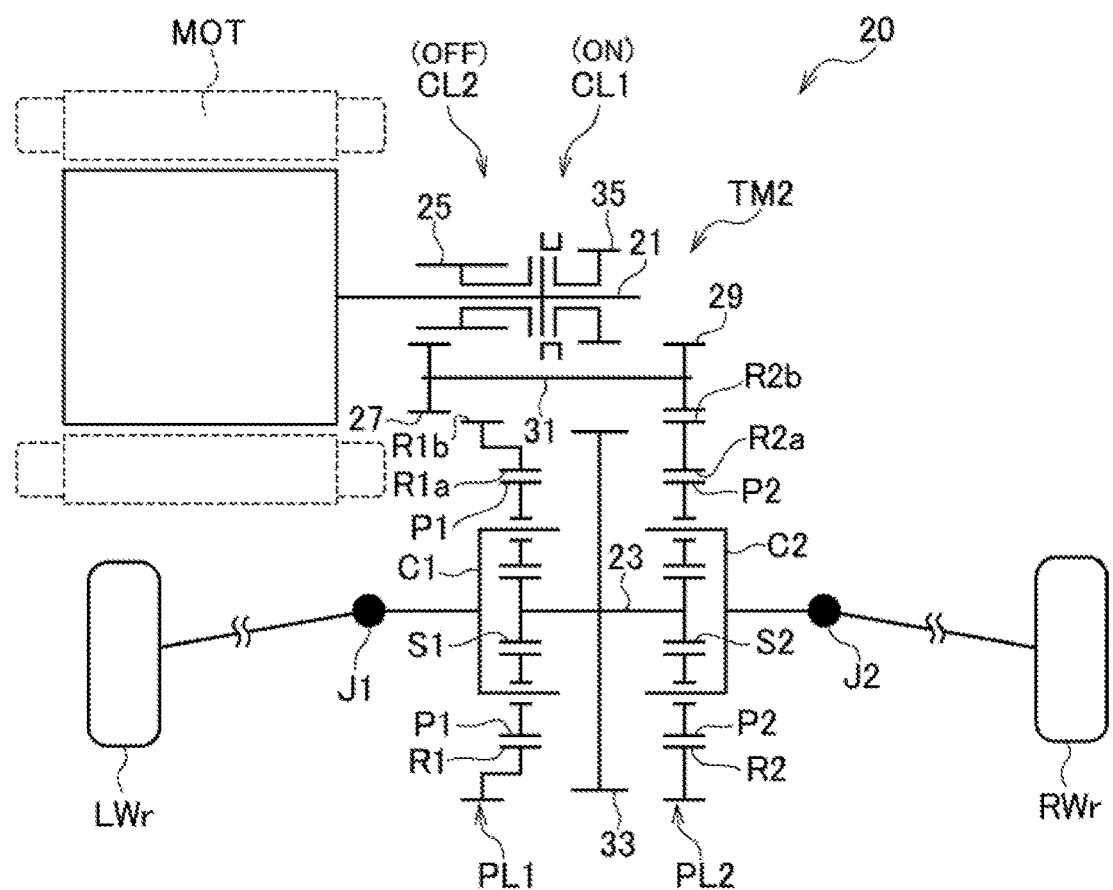
FIG. 4D is a skeleton diagram showing rotating elements in the rear wheel driving system shown in FIG. 4B when the wheeled vehicle turns during four-whee drive (4WD).

In FIGS. 4A, 4B, arrows in a collinear chart indicate torque acting on the individual elements, and an arrow reaching the collinear chart from the motor MOT indicates a power transmission path of the motor MOT (this will be the same also in FIG. 11). In FIGS. 4C, 4D, the rotating elements of the power transmission mechanism TM2 are indicated by solid lines when the vehicle V runs by four-wheel drive (4WD).

When the vehicle V travels straight ahead with no difference in rotation speed between the left and right rear wheels LWr, RWr, as shown in FIG. 4A, the imaginary line L1 coincides with the zero rotation line L2, whereby the rotation speeds of the ring gears R1, R2 both become zero rotation. On the other hand, when the wheeled vehicle V turns with a difference in rotation speed between the left and right rear wheels LWr, RWr, as shown in FIG. 4B, the imaginary line L1 rotates about the fulcrum O on the collinear chart, and the ring gears R1, R2 rotate in the opposite directions to each other at the same rotation speed. In FIG. 4c, the rotating elements of the power transmission mechanism TM2 are shown by solid lines when the wheeled vehicle V travels straight ahead by four-wheel drive (4WD) with no difference in rotation speed between the left and right rear wheels LWr, RWr (FIG. 4A). In FIG. 4D, the rotating elements of the power transmission mechanism TM2 are shown by solid lines when the wheeled vehicle V turns by four-wheel drive (4WD) with a difference in rotation speed between the left and right rear wheels LWr, RWr (FIG. 4B).

In this way, the desired front-rear driving force can be generated in the left and right rear wheels LWr, RWr by controlling the first and second clutches CL1, CL2 to be put in the first state (the first clutch CL1: applied/the second clutch CL2: released) and torque controlling the motor MOT by changing the rotation direction of the motor MOT according to whether the vehicle V travels forwards or rearwards, whereby a front-rear running assist can be performed. This four-wheel drive (4WD) may be used as a starting assist when the wheeled vehicle V starts from rest or may be switched from the front wheel-drive (FWD) while the wheeled vehicle is running. In switching from the front-wheel drive (FWD) to the four-wheel drive (4WD) while the wheeled vehicle V is running, the rotation speed of the motor MOT is increased to the same rotation speed as that of the second output gear 35 with the first and second clutches CL1, CL2 in FIG. 3 both left released, whereafter the first clutch CL1 is applied, whereby the drive can be shifted to the four-wheel drive (4WD) while suppressing the generation of shift shock.

—Torque Vectoring Drive (TV)—

When the first and second clutches CL1, CL2 are in the second state (the first clutch CL1: released/the second clutch CL2: applied), the power transmission path between the motor MOT and the ring gears R1, R2 of the first and second planetary gear mechanisms PL1, PL2 becomes connected state, and motor torques having equal absolute values and acting in opposite directions are inputted from the motor MOT into the ring gears R1, R2.

Namely, the torque of the motor MOT gives a first motor torque M1 that acts in a reverse direction opposite to the direction of the torque of the motor MOT to the ring gear R1 as a result of the external teeth R1b of the ring gear R1 meshing with the first output gear 25. As this occurs, the forward torque (not shown) attempting to cause the wheeled vehicle V to travel forwards is being applied to the carrier C1 from the left rear wheel LWr. Thus, in the first planetary gear mechanism PL1, as a result of the first motor torque M1 acting in the reverse direction being applied to the ring gear R1 that acts as the point of application of force with the carrier C1 acting as the fulcrum, a first motor torque distribution forth M1' acting in the forward direction is applied to the sun gears S1, S2 that act as the points of action.

Additionally, the torque of the motor MOT gives a second motor torque M2 that acts in the forward direction that is the same as the direction of the torque of the motor MOT to the ring gear R2 as a result of the first output gear 25 meshing with the idle gear 27 and the external teeth R2b of the ring gear R2 meshing with the first input gear 29. As this occurs, the forward torque (not shown) attempting to cause the wheeled vehicle V to travel forwards is being applied to the carrier C2 from the right rear wheel RWr. Thus, in the second planetary gear mechanism PL2, as a result of the second motor torque M2 acting in the forward direction being applied to the ring gear R2 that acts as the point of application of force with the carrier C2 acting as the fulcrum, a second motor torque distribution forth M2' acting in the reverse direction is applied to the sun gears S1, S2 that act as the points of action.

Here, the first motor torque M1 and the second motor torque M2 are the torques having the equal absolute values and acting in the opposite directions. Thus, the first motor torque distribution force M1' acting in the forward direction and the second motor torque distribution force M2' acting in the reverse direction to the sun gears S1, S2 cancel (offset) each other. Due to this offsetting of the first and second motor torque distribution forces M1', M2', with the sun gear S1 acting as the fulcrum, the reverse first motor torque M1 that is inputted into the ring gear R1 that acts as the point of application of force is transmitted to the carrier C1 that acts as the point of action as a reverse left rear wheel torque T1 that results from being multiplied by the gear ratio of the first planetary gear mechanism PL1. Then, with the sun gear S2 acting as the fulcrum, the forward second motor torque M2 that is inputted into the ring gear R2 that acts as the point of application of force is transmitted to the carrier C2 that acts as the point of action as a forward right rear wheel torque T2 that results from being multiplied by the gear ratio of the second planetary gear mechanism PL2.

Since the gear ratios of the first and second planetary gear mechanisms PL1, PL2 are equal, the left and right rear wheel torques T1, T2 become torques having equal absolute values and acting in opposite directions, and this generates a left-right driving force difference that corresponds to a difference between the left and right rear wheel torques T1, T2 (T1−T2), whereby a counterclockwise yaw moment Y is given to the wheeled vehicle V stably. With the sum of the left and right rear wheel torques T1, T2 (T1+T2) becomes zero and the first and second clutches CL1, CL2 staying in the second state, a left-right driving force sum is not generated from the rear wheel driving system 20 by the generation of torque of the motor MOT, and no front-rear torque is given to the wheeled vehicle V. In the case of giving yaw moment acting in a clockwise direction to the wheeled vehicle V, the motor MOT should be torque controlled so as to generate torque acting in an opposite direction to the direction described above.

Figure 5A:
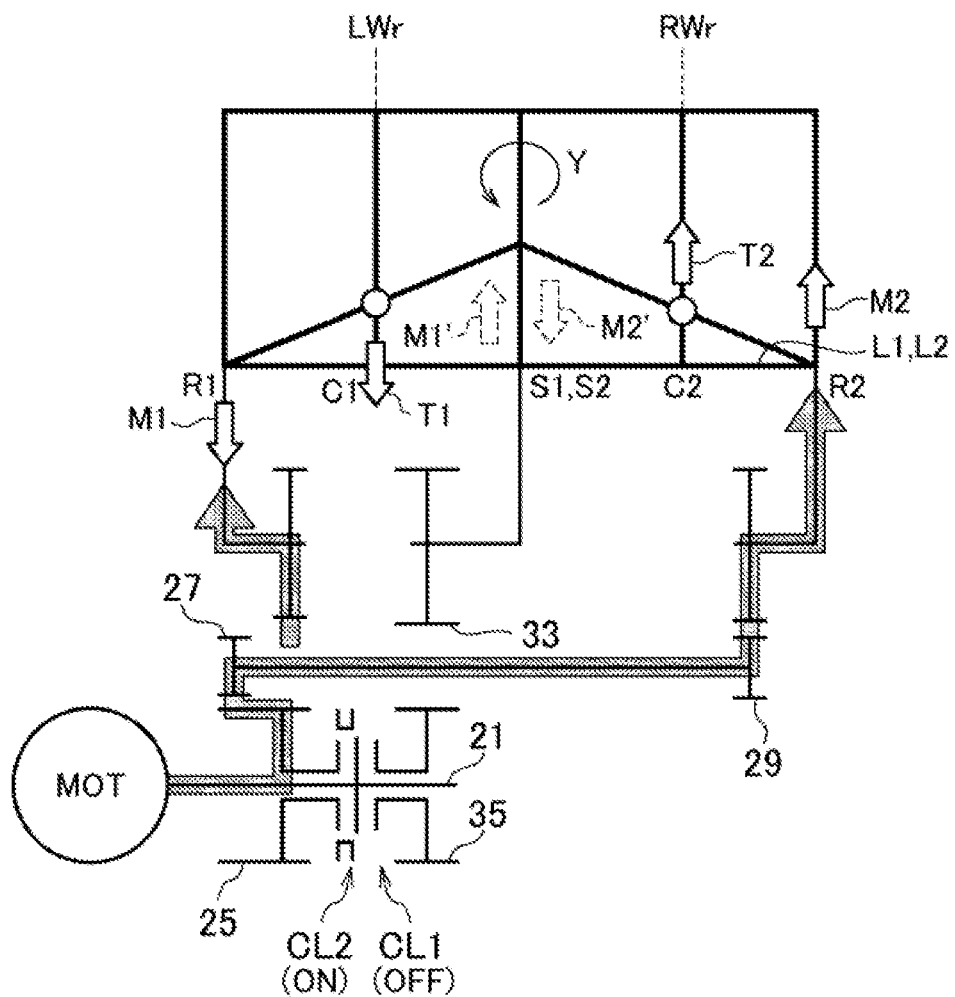
FIG. 5A is a diagram showing a power transmission path and a collinear chart in the rear wheel driving system of the first embodiment when the wheeled vehicle travels straight ahead by torque vectoring drive (TV).
Figure 5B:
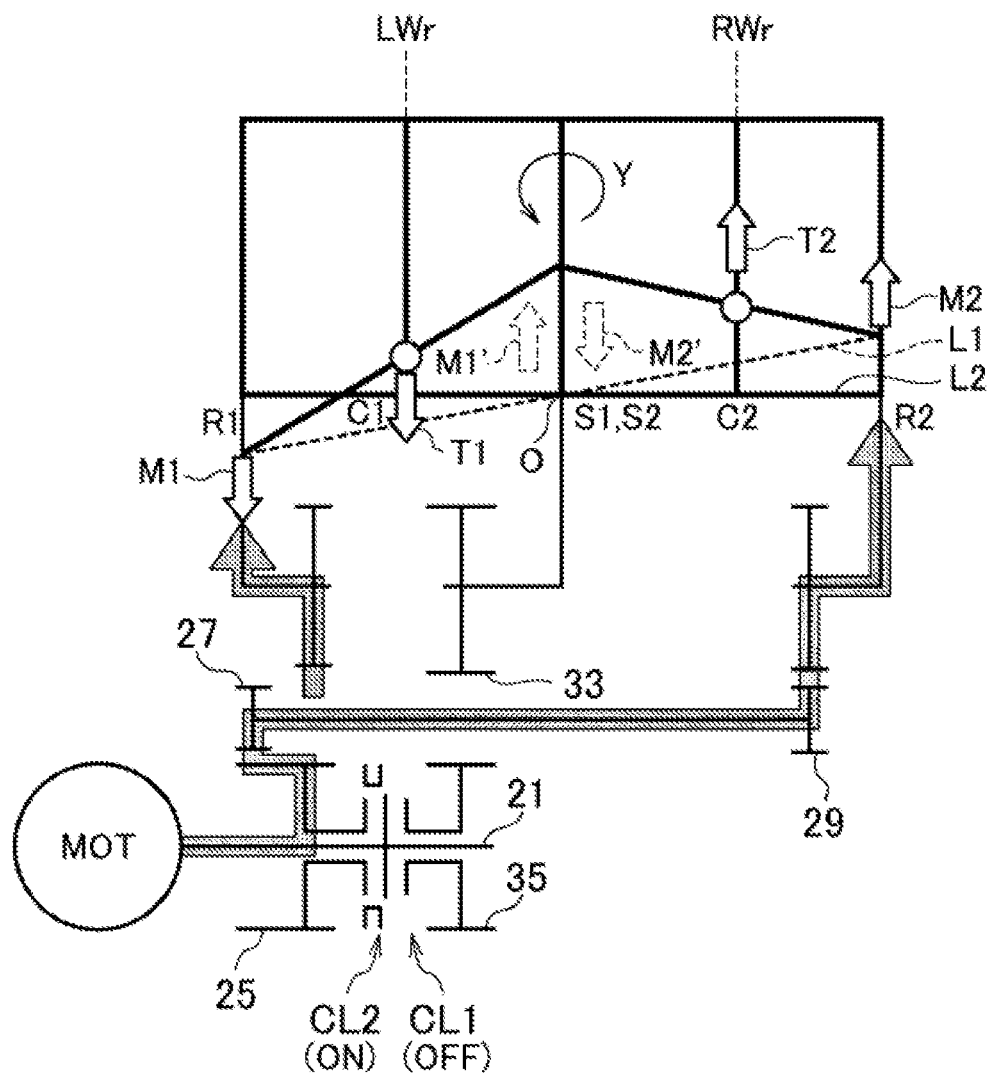
FIG. 5B is a diagram showing a power transmission path and a collinear chart in the rear wheel driving system of the first embodiment when the wheeled vehicle turns by torque vectoring drive (TV).
Figure 5C:
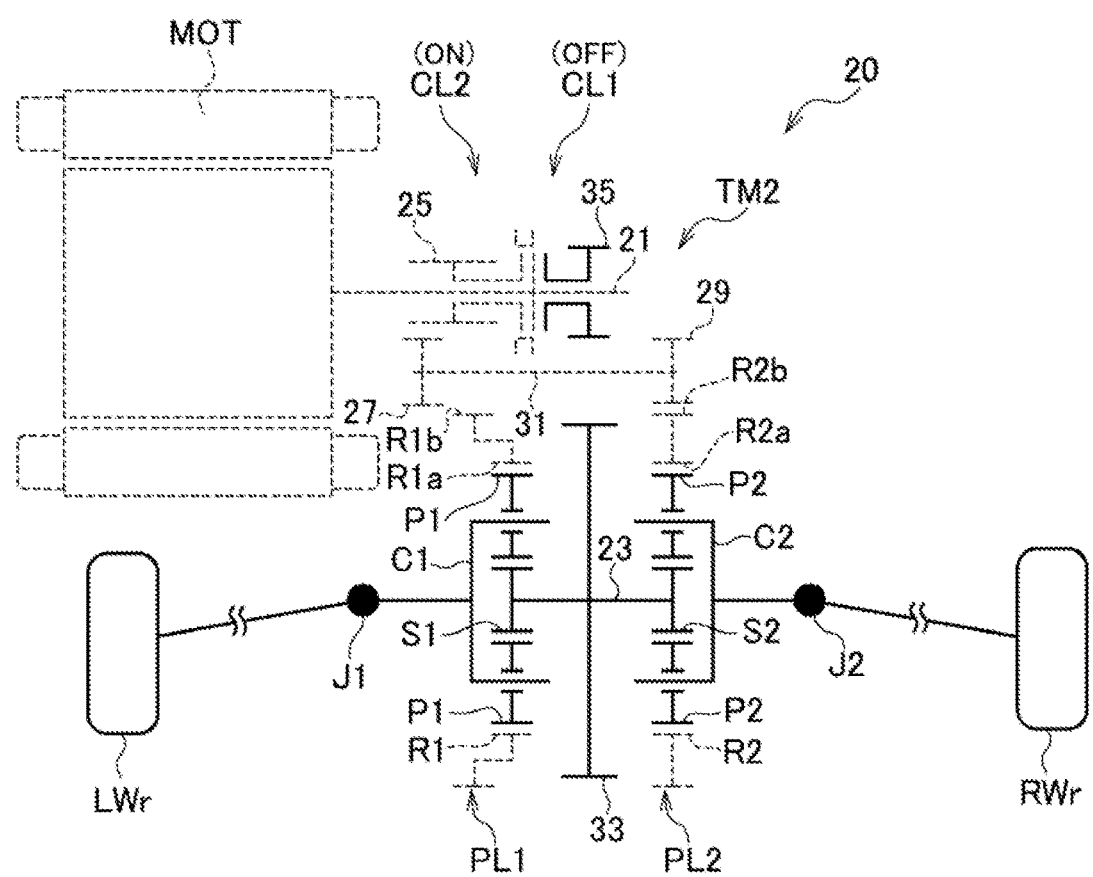
FIG. 5C is a skeleton diagram showing rotating elements in the rear wheel driving system shown in FIG. 5A when the wheeled vehicle travels straight ahead by torque vectoring drive (TV).
Figure 5D:
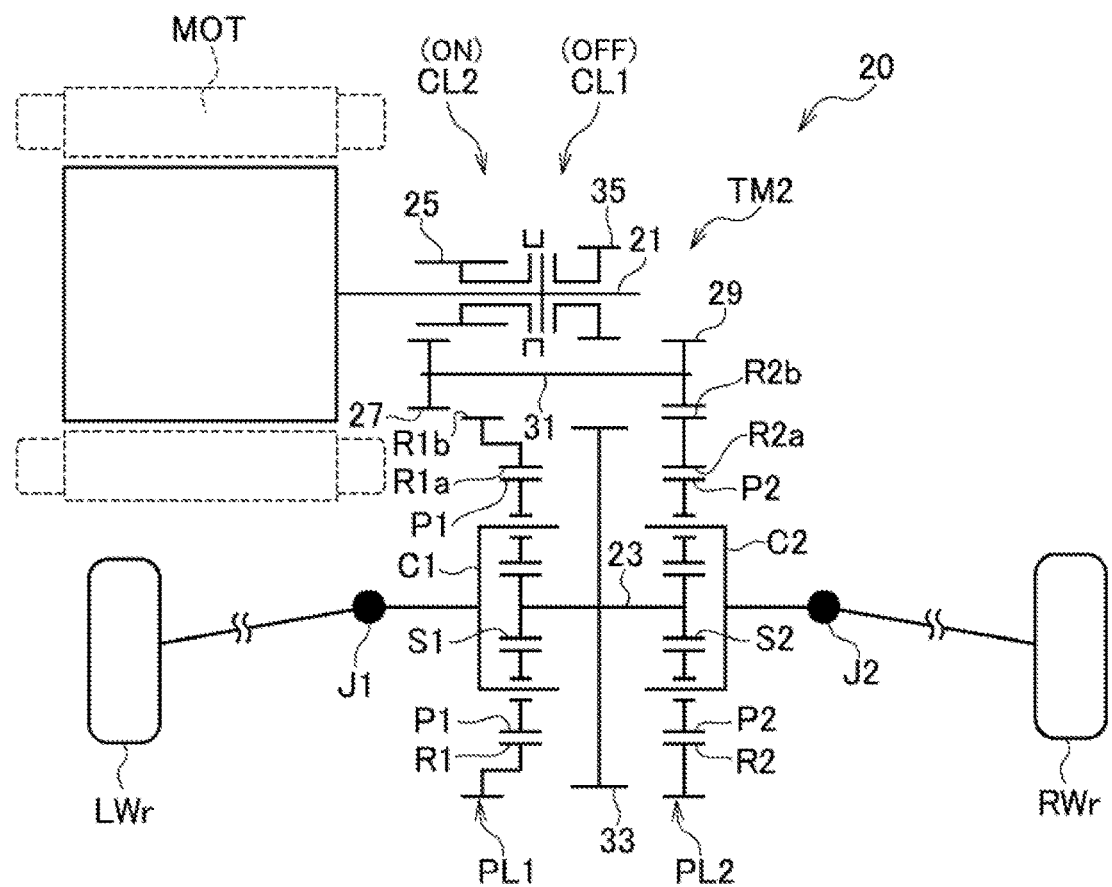
FIG. 5D is a skeleton diagram showing rotating elements in the rear wheel driving system shown in FIG. 5B when the wheeled vehicle turns by torque vectoring drive (TV).

In FIGS. 5A, 5B, arrows in a collinear chart indicate torque acting on the individual elements, and an arrow reaching the collinear chart from the motor MOT indicates a power transmission path of the motor MOT (this will be the same also in FIG. 12). In FIGS. 5C, 5D, the rotating elements of the power transmission mechanism TM2 are indicated by solid lines when the wheeled vehicle V runs by torque vectoring drive (TV).

When the wheeled vehicle V travels straight ahead with no difference in rotation speed between the left and right rear wheels LWr, RWr, as shown in FIG. 5A, the imaginary line L1 coincides with the zero rotation line L2, whereby the rotation speeds of the ring gears R1, R2 both become zero rotation. On the other hand, when the wheeled vehicle V turns with a difference in rotation speed between the left and right rear wheels LWr, RWr, as shown in FIG. 5B, the imaginary line L1 rotates about the fulcrum O on the collinear chart, and the ring gears R1, R2 rotate in the opposite directions to each other at the same rotation speed. In FIG. 5c, the rotating elements of the power transmission mechanism TM2 are shown by solid lines when the wheeled vehicle V travels straight ahead by torque vectoring drive (TV) with no difference in rotation speed between the left and right rear wheels LWr, RWr (FIG. 5A). In FIG. 5D, the rotating elements of the power transmission mechanism TM2 are shown by solid lines when the wheeled vehicle V turns by torque vectoring drive (TV) with a difference in rotation speed between the left and right rear wheels LWr, RWr (FIG. 5B).

In this way, the desired yaw moment can be generated by controlling the first and second clutches CL1, CL2 to be put in the second state (the first clutch CL1: released/the second clutch CL2: applied) and torque controlling the motor MOT by changing the rotation direction of the motor MOT according to the turning direction or lateral acceleration, whereby a turning assist can be performed. In addition, the turning can be limited by generating a yaw moment acting in an opposite direction to the turning direction.

Figure 10A:
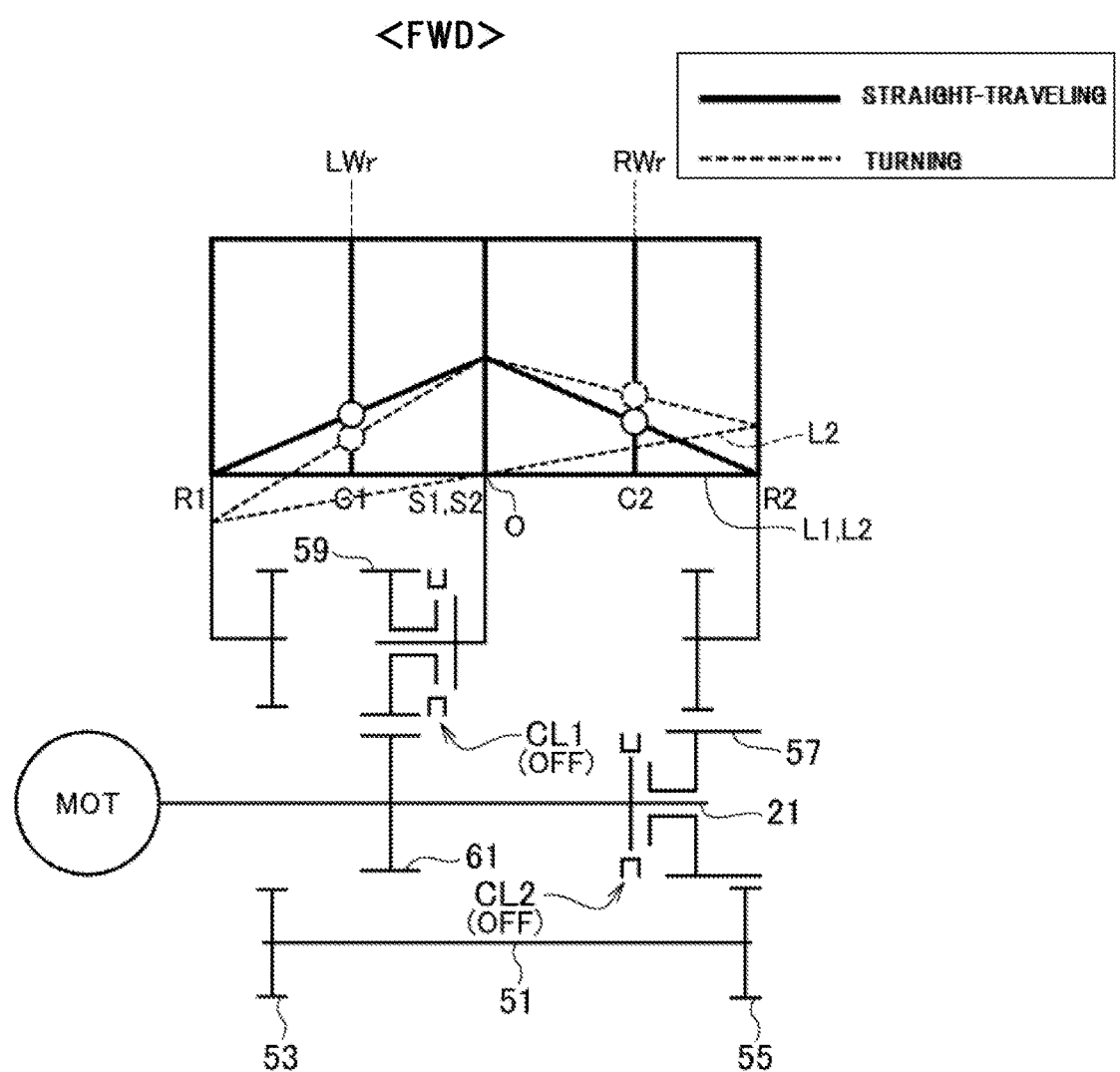
FIG. 10A is a diagram showing a power transmission path and a collinear chart in the rear wheel driving system of the third modified example of the first embodiment when the wheeled vehicle travels by front-wheel drive (FWD).

In FIGS. 3B, 4B, 5B, left turn in which the rotation speed of the right rear wheel RWr is faster than the rotation speed of the left rear wheel LWr is exemplified. However, right turn in which the rotation speed of the left rear wheel LWr is faster than the rotation speed of the right rear wheel RWr is similar to what has been described in those figures (this will be true also in FIGS. 10A, 11A, 12A).

Figure 6:
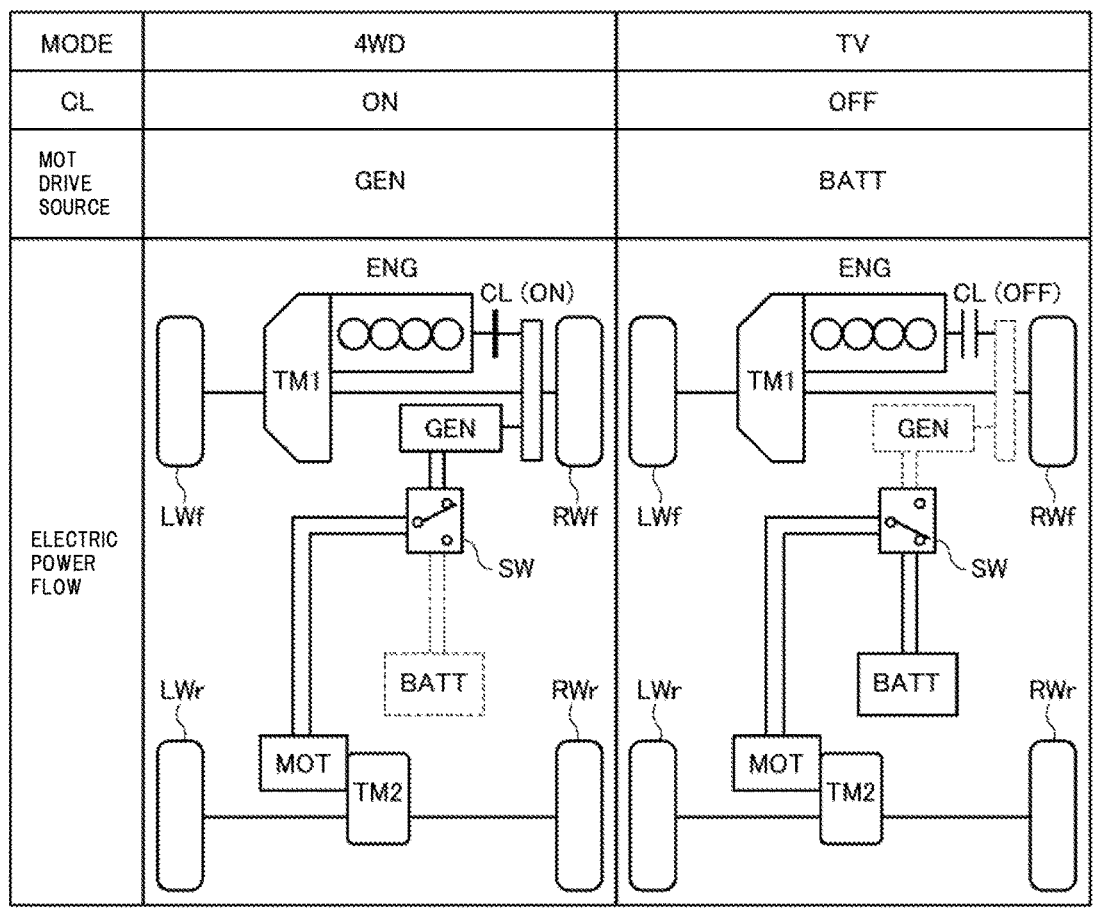
FIG. 6 is a diagram showing flows of electric power when the wheeled vehicle travels by 4WD drive and torque vectoring drive.

FIG. 6 is a diagram showing flows of electric power when the wheeled vehicle V travels by four-wheel drive (4WD) and torque vectoring drive (TV).

When the wheeled vehicle V runs by four-wheel drive (4WD), as an example, in such a state that the engine ENG is connected with the generator GEN with the clutch CL applied (ON), the left and right front wheels LWf, RWf are driven via the power transmission mechanism TM1 by means of torque of the engine ENG, and electricity is generated by the generator GEN by making use of the torque of the engine ENG. Additionally, the motor MOT is connected with the generator GEN via the switching mechanism SW, and the motor MOT is driven by means of electric power generated in the generator GEN. In this way, since large torque is needed when the wheeled vehicle V starts from rest, the motor MOT is driven by means of the electric power generated in the generator GEN that can be connected with the engine ENG; thereby making it possible to enhance the running performance of the wheeled vehicle V.

On the other hand, when the wheeled vehicle V runs by torque vectoring drive (TV), as an example, in such a state that the engine ENG is disconnected from the generator GEN by releasing the clutch CL (OFF), the left and right front wheels LWf, RWf are driven via the power transmission mechanism TM1 by the engine ENG; and the motor MOT is connected with the battery BATT via the switching mechanism SW, so that the motor MOT is driven by means of electric power from the battery BATT. For example, when the wheeled vehicle V is cruising at high speeds, the wheeled vehicle runs on the torque of the engine ENG while running by torque vectoring drive that requires not much torque using the electric power from the battery BATT, thereby making it possible to enhance the energy properties. The flows of electric power by torque vectoring drive and 4WD drive are not limited to those shown in FIG. 6, and hence, flows of electric power can be selected as required based on the efficiency or the SOC of the battery BATT.

The front-wheel drive (FWD), four-wheel drive (4WD) and torque vectoring drive (TV) can be switched over according to the speed of the wheeled vehicle V (hereinafter, referred to as a vehicle speed). The drive of the wheeled vehicle V may be switched to four-wheel drive (4WD) in which the motor MOT is connected with the sun gears S1, S2 of the first and second planetary gear mechanisms PL1, PL2 when the vehicle speed is slower than a predetermined speed, and on the other hand, the drive of the wheeled vehicle V may be switched to torque vectoring drive (TV) in which the motor MOT is connected with the ring gears R1, R2 of the first and second planetary gear mechanisms PL1, PL2 when the vehicle speed is equal to or faster than the predetermined speed. In addition, for example, the wheeled vehicle V may start from rest by four-wheel drive (4WD) and may run by front-wheel drive (FWD) or torque vectoring drive (TV) according to the vehicle speed and a yaw moment request.

Thus, as has been described heretofore, the output shaft 21 of the motor MOT is connected to the sun gears S1, S2 of the first and second planetary gear mechanisms PL1, PL2 and the ring gears R1, R2 of the first and second planetary gear mechanisms PL1, PL2 so as to switch therebetween selectively. Thus, with the single motor MOT, it becomes possible to output the front-rear torques acting in the same direction to the left and right rear wheels LWr, RWr or to output the torques acting in opposite directions to the left rear wheel LWr and the right rear wheel RWr without generating the front-rear torque. Further, the torque of the motor MOT is inputted to the different rotating elements of the first and second planetary gear mechanisms PL1, PL2 between when the front-rear torques acting in the same direction are outputted to the left and right rear wheels LWr, RWr and when the torques acting in the opposite directions are outputted to the left rear wheel LWr and the right rear wheel RWr without outputting the front-rear torque. Thus, by changing the gear ratios of the sun gears S1, S2, the ring gears R1, R2 and the carriers C1, C2, torque differences in magnitude can be induced in the front-rear assist and the turning assist.

Additionally, since the power transmission mechanism TM2 is made up of the two first and second planetary gear mechanisms PL1, PL2, a widthwise dimension can be reduced.

The power transmission mechanism TM2 includes the first and second clutches CL1, CL2 and is configured to switch to the first state and the second state selectively, and therefore, the power transmission mechanism TM2 can transmit power to either of the sun gears S1, S2 and the ring gears R1, R2 of the first and second planetary gear mechanisms PL1, PL2 in an ensured fashion.

Additionally, the motor MOT is disposed on one side or a left side of the first and second planetary gear mechanisms PL1, PL2 in relation to the axial direction. Thus, compared with a case where the motor MOT is disposed so as to be held by the first and second planetary gear wheels PL1, PL2 therebetween, the joints J1, J2 that make up connecting portions between the left and right rear wheels LWr, RWr and the carriers CL1, CL2 can be disposed further inwards in the vehicle's width direction, whereby angles from the joints J1, J2 towards the left and right rear wheels LWr, RWr can be restrained from being increased. This can enhance the degree of freedom in relation to the lateral arrangement when mounting the rear wheel driving system 20 on the wheeled vehicle V. It is noted that the motor MOT may be disposed on the other side or a right side of the first and second planetary gear mechanisms PL1, PL2.

In addition, since the motor MOT overlaps the first and second planetary gear mechanisms PL1, PL2 in a radial direction, a radial dimension can also be reduced. This can enhance the degree of freedom in relation to the front-rear mounting position on the wheeled vehicle V in mounting the rear wheel driving system 20 on the wheeled vehicle V.

The first and second clutches CL1, CL2 are the switching mechanisms that are made up of the synchromesh mechanisms that can be switched by the common actuator and can be switched on the same rotation axis as the output shaft 21 of the motor MOT. Thus, it is possible to avoid easily the risk of both the first and second clutches CL1, CL2 being applied together, and compared with a case where the first and second clutches CL1, CL2 are operable by separate actuators, the number of components involved can be reduced, thereby making it possible to suppress the production costs. Further, the output shaft 21 of the motor MOT is also disposed on the same axis as those of the first and second clutches CL1, CL2, and therefore, the switching mechanisms can be disposed while suppressing the radial dimension.

First Modified Example

Figure 7:
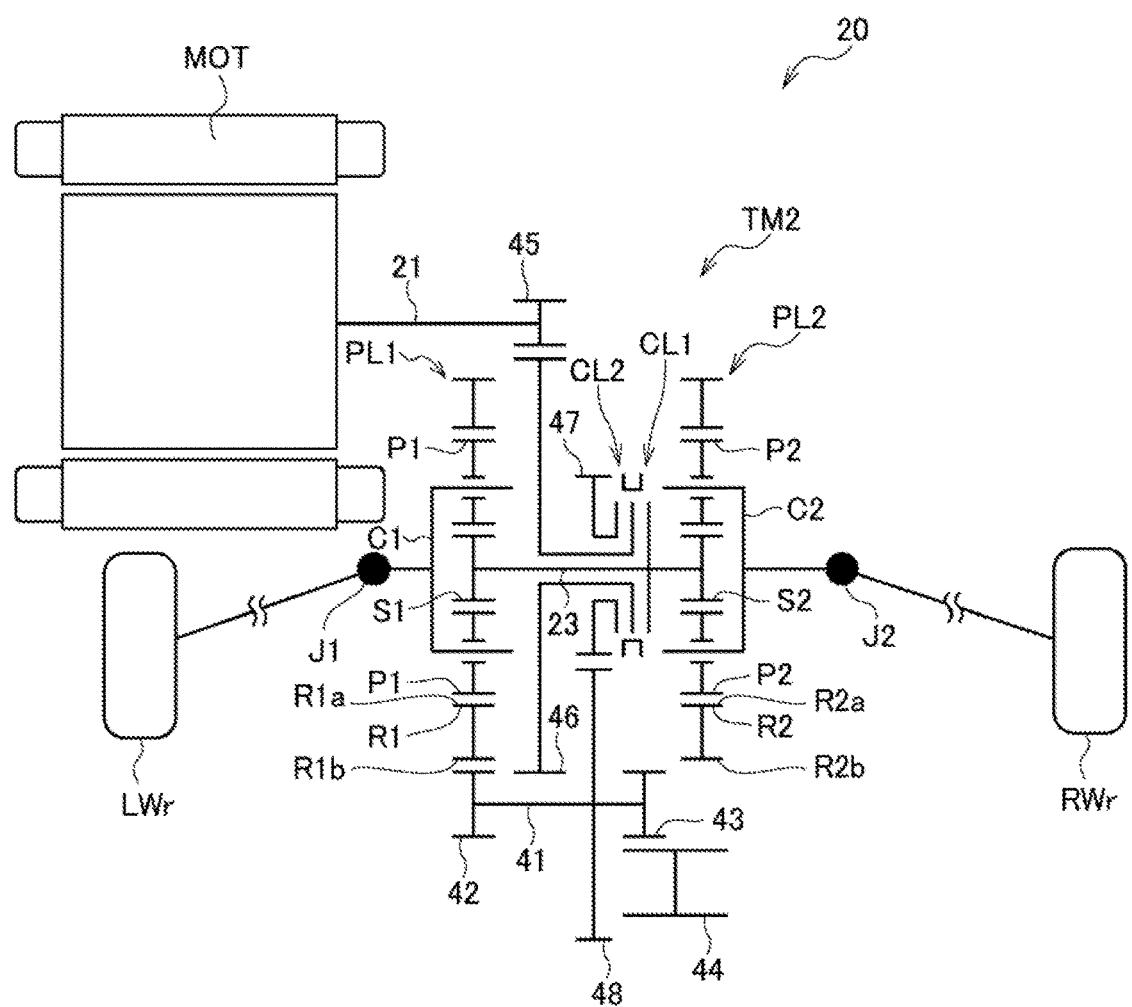
FIG. 7 is a skeleton diagram of a rear wheel driving system of a first modified example of the first embodiment.

Following to the first embodiment, referring to FIG. 7, a rear wheel driving system 20 of a first modified example thereof will be described.

This modified example is in common with the power transmission mechanism TM2 of the first embodiment in that a power transmission mechanism TM2 includes first and second clutches CL1, CL2 and two planetary gear mechanisms of first and second planetary gear mechanisms PL1, PL2. Thus, in the following description, different features will mainly be described.

In a ring gear R1 of the first planetary gear mechanism PL1, external teeth R1b mesh with a first input gear 42 that is provided so as to rotate integrally with an idle shaft 41. In a ring gear R2 of the second planetary gear mechanism PL2, external teeth R2b mesh with a second input gear 44 that meshes with an idle gear 43 that is provided coaxially with the first input gear 42 so as to rotate integrally. Namely, the ring gears R1, R2 of the first and second planetary gear mechanisms PL1, PL2 are connected together through three times of meshing including the meshing of the external teeth R1b of the ring gear R1 with the first input gear 42, the meshing of the idle gear 43 with the second input gear 44, and the meshing of the second input gear 44 with the external teeth R2b of the ring gear R2.

The two ring gears R1, R2 operate so as to rotate in opposite directions to each other as a result of the ring gears R1, R2 of the first and second planetary gear mechanisms PL1, PL2 being connected together through the odd number of times of meshing in the way described above. Namely, a rotation of the ring gear R1 in one direction causes the first input gear 42 to rotate in the other direction through the meshing of the external teeth R1b of the ring gear R1 with the first input shaft 42. Since the first input shaft 42 and the idle gear 43 rotate integrally via the idle shaft 41, the idle gear 43 also rotates in the other direction. The second input gear 44 rotates in the one direction as a result of the idle gear 43 meshing with the second input gear 44. Further, as a result of the second input gear 44 meshing with the external teeth R2b of the ring gear R2, a rotation of the second input gear 44 in the one direction acts so as to cause the ring gear R2 to rotate in the other direction.

Additionally, a gear ratio resulting from the meshing of the external teeth R1b of the ring gear R1 with the first input gear 42 and a gear ratio resulting from the meshing of the idle gear 43 with the second input gear 44 and the meshing of the second input gear 44 with the external teeth R2b of the ring gear R2 are set so that absolute values thereof become equal to each other. Consequently, torque of a motor MOT is always transmitted to the ring gears R1, R2 as torques having the equal absolute values and acting in the opposite directions.

A hollow third input gear 46 is provided on a connecting shaft 23 of the sun gears S1, S2 so as to surround an outer circumference of the connecting shaft 23, and the hollow third input gear 46 is configured to rotate integrally with or rotate relatively to the connecting shaft 23 by being switched by the first clutch CL1. Namely, the first clutch CL1 connects or disconnects a power transmission between the third input gear 46 and the connecting shaft 23 by being applied or released. In addition, a hollow first intermediate gear 47 is provided on an outer circumferential side of the third input gear 46, and the first intermediate gear 47 rotates together with or relative to the third input gear 46 by being switched by the second clutch CL2. Namely, the second clutch CL2 connects or disconnects a power transmission between the third input gear 46 and the first intermediate gear 47 by being applied or released. The first and second clutches CL1, CL2 are each made up of a synchromesh mechanism that can be switched over by a common actuator and can be switched over on the same rotation axis, that is, the same rotation axis as the sun gears S1, S2. The first intermediate shaft 47 meshes with a second intermediate gear 48 that is provided so as to rotate integrally with the idle shaft 41.

The first and second clutches CL1, CL2 are allowed to take selectively one of a state in which the first and second clutches CL1, CL2 are both released, a first state in which the first clutch CL1 is applied while the second clutch CL2 is released, and a second state in which the first clutch CL1 is released while the second clutch CL2 is applied.

In the state in which both the first and second clutches CL1, CL2 are released, the third input gear 46 is connected with neither the connecting shaft 23 nor the first intermediate gear 47, whereby a power transmission path between the output shaft 21 of the motor MOT and the first and second planetary gear mechanisms PL1, PL2 becomes a disconnected state. When the first and second clutches CL1, CL2 take the state in which the clutches CL1, CL2 are both released, no torque is transmitted from the motor MOT to the left and right rear wheels LWr, RWr, whereby neither a left-right driving force sum nor a left-right driving force difference is generated from the rear wheel driving system 20, this enabling the front-wheel drive (FWD).

In the first state in which the first clutch CL1 is applied while the second clutch CL2 is released, the third input gear 46 is connected to the connecting shaft 23, whereby a power transmission path between the output shaft 21 of the motor MOT and the sun gears S1, S2 of the first and second planetary gear mechanisms PL1, PL2 becomes a connected state via an output gear 45 and the third input gear 46. When the first and second clutches CL1, CL2 take the first state, torques of the same magnitude are transmitted from the motor MOT to the left and right rear wheels LWr, RWr in the same direction in the front-rear direction, whereby a desired left-right driving force sum is generated from the rear wheel driving system 20 while no left-right driving force difference is generated therefrom, this enabling the four-wheel drive (4WD).

In the second state in which the first clutch CL1 is released while the second clutch CL2 is applied, the third input gear 46 is connected to the first intermediate gear 47, whereby a power transmission path between the output shaft 21 of the motor MOT and the ring gears R1, R2 of the first and second planetary gear mechanisms PL1, PL2 becomes a connected state via the output gear 45, the third input gear 46, the first intermediate gear 47, the second intermediate gear 48, the first input gear 42, the idle gear 43 and the second input gear 44. When the first and second clutches CL1, CL2 take the second state, torques of the same magnitude are transmitted from the motor MOT to the left and right rear wheels LWr, RWr in opposite directions in the front-rear direction, whereby a desired left-right driving force difference is generated from the rear wheel driving system 20 while no left-right driving force sum is generated therefrom, this enabling the torque vectoring drive (TV). The front-wheel drive (FWD), the four-wheel drive (4WD) and the torque vectoring drive (TV) are the same as those of the first embodiment, and the detailed description thereof will be omitted here.

According to the first modified example, the first and second clutches CL1, CL2 are each made up of a synchromesh mechanism that can be switched over by a common actuator and can be switched over on the same rotation axis, that is, the same rotation axis as those of the sun gears S1, S2. Thus, compared with a case where the first and second clutches CL1, CL2 are operated by separate actuators, the number of components involved can be reduced, thereby making it possible to suppress the production costs. Further, the first and second clutches CL1, CL2 can be disposed by making effective use of the dead space defined between the planetary gear mechanisms.

Further, in addition to the advantage of the first embodiment, the torque of the motor MOT is transmitted to the ring gears R1, R2 via the output gear 45 and the third input gear 46 even when the wheeled vehicle V runs by torque vectoring drive (TV), thereby making it possible to secure a large gear ratio. In addition, compared with the first embodiment, the number of components that rotate integrally with the sun gears S1, S2 when the wheeled vehicle V travels straight ahead by torque vectoring drive (TV) is reduced. Therefore, not only can the inertial force be reduced while the sun gears S1, S2 are rotating, but also a scooping loss of lubricant can be reduced.

Second Modified Example

Figure 8:
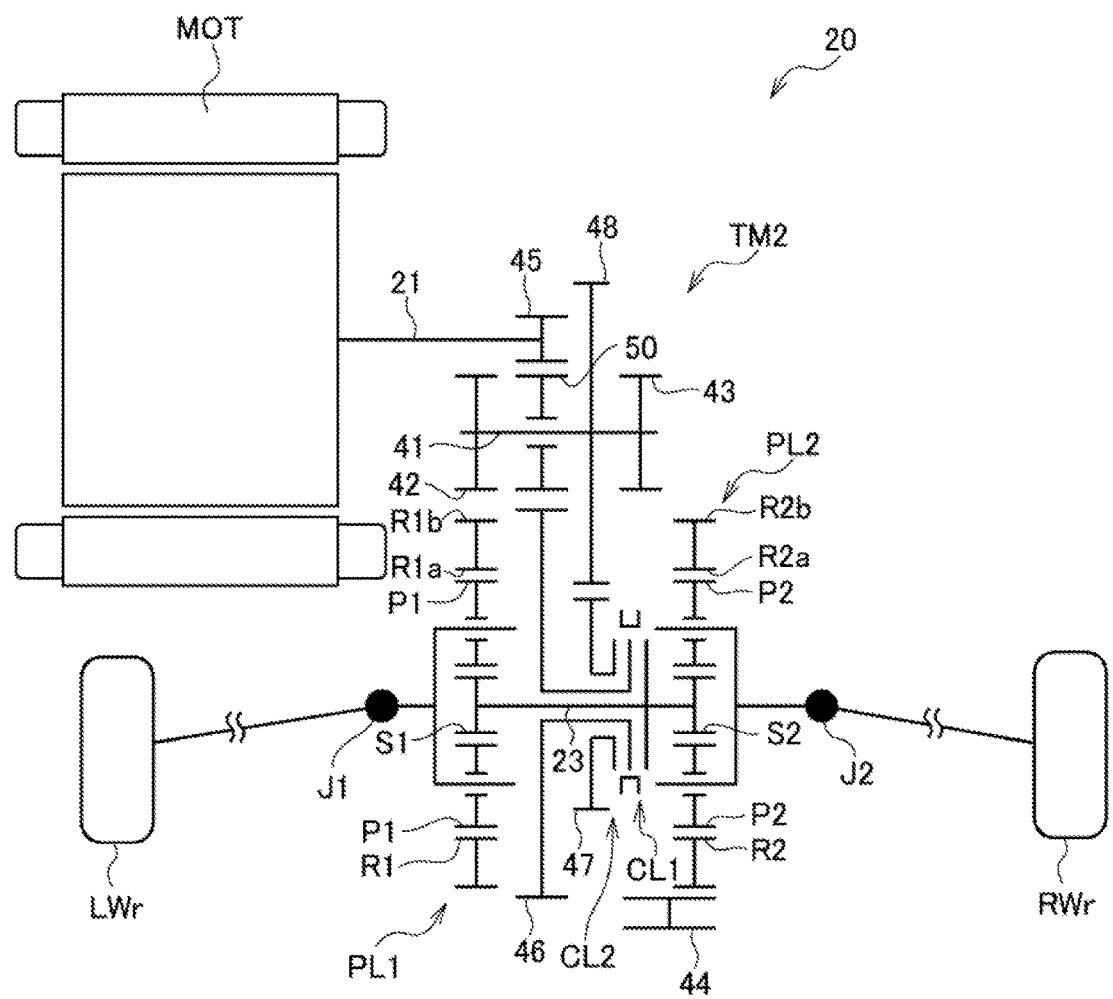
FIG. 8 is a skeleton diagram of a rear wheel driving system of a second modified example of the first embodiment.

Following to the first modified example, referring to FIG. 8, a rear wheel driving system 20 of a second modified example of the first embodiment will be described.

This modified example has the same configurations as those of the first modified example except that a power transmission mechanism TM2 has a third intermediate gear 50 that is provided additionally on the idle shaft 41 of the power transmission mechanism TM2 of the first modified example so as to rotate relative to the idle shaft 41. Thus, like reference numerals will be given to like constituent portions to those of the first modified example so as to omit the description thereof, and only different features will be described.

The third intermediate gear 50 always meshes with an output gear 45 and a third input gear 46. Owing to this, in a first state in which a first clutch CL1 is applied while a second clutch CL2 is released, the third input gear 46 is connected to a connecting shaft 23, whereby a power transmission path between an output shaft 21 of a motor MOT and sun gears S1, S2 of first and second planetary gear mechanisms PL1, PL2 becomes a connected state via the output gear 45, the third intermediate gear 50 and the third input gear 46. On the other hand, in a second state in which the first clutch CL1 is released while the second clutch CL2 is applied, the third input gear 46 is connected to a first intermediate gear 47, whereby a power transmission path between the output shaft 21 of the motor MOT and ring gears R1, R2 of the first and second planetary gear mechanisms PL1, PL2 becomes a connected state via the output gear 45, the third middle gear 50, the third input gear 46, the first intermediate gear 47, a second intermediate gear 48, a first input gear 42, an idle gear 43 and a second input gear 44.

Consequently, according to this modified example, in addition to the advantage of the first modified example of the first embodiment, the torque of the motor MOT is transmitted via the third intermediate gear 50 even when the wheeled vehicle V runs by four-wheel drive (4WD) or by torque vectoring drive (TV). Therefore, a larger gear ratio can be ensured which becomes larger by such an extent that the third intermediate gear 50 is added. It should be noted that rotation directions of carriers C1, C2 become opposite to those of the carriers C1, C2 of the first modified example.

Third Modified Example

Next, referring to FIG. 9, a rear wheel driving system 20 of a third modified example of the first embodiment will be described.

Figure 9:
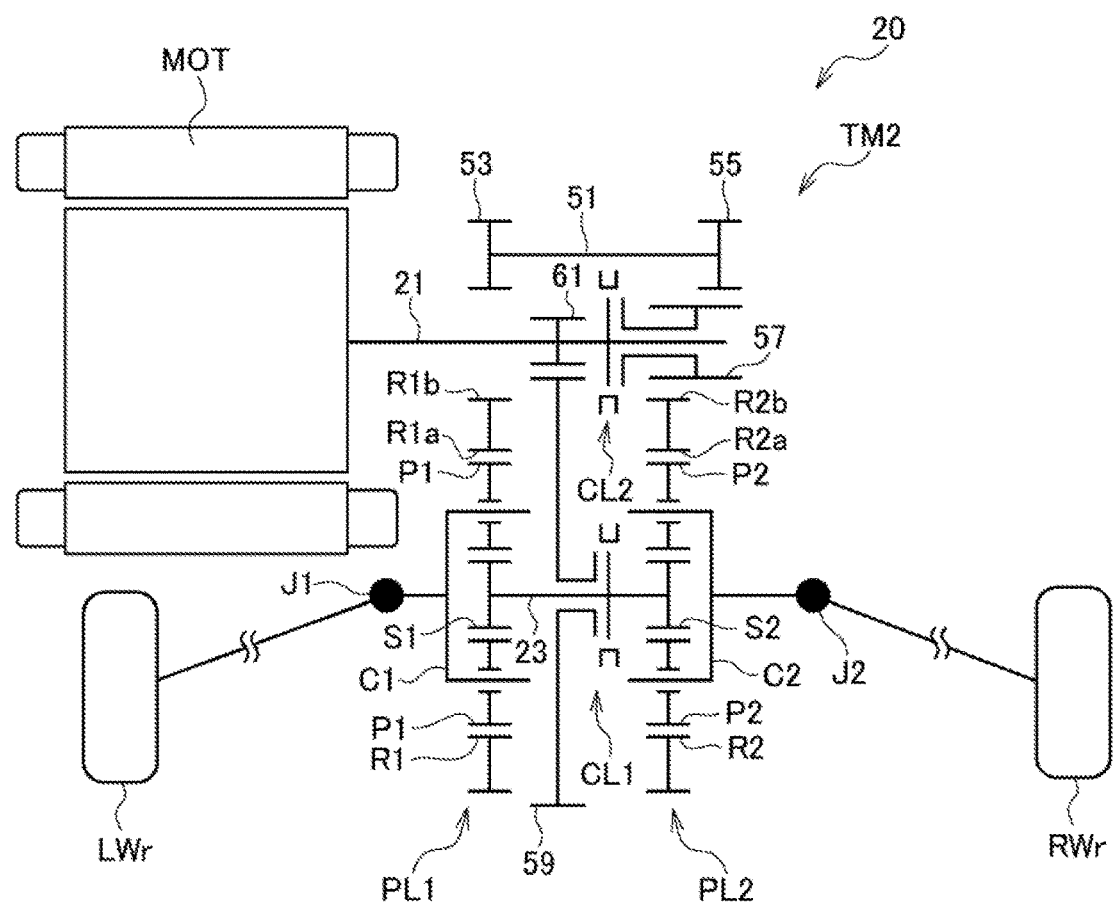
FIG. 9 is a skeleton diagram of a rear wheel driving system of a third modified example of the first embodiment.

The rear wheel driving system 20 includes, as shown in FIG. 9, a motor MOT and a power transmission mechanism TM2. Then, the power transmission mechanism TM2 includes first and second clutches CL1, CL2 which are provided on separate shafts and two planetary gear mechanisms of first and second planetary gear mechanisms PL1, PL2. The first and second planetary gear mechanisms PL1, PL2 are each made up of a so-called single pinion planetary gear mechanism and include, respectively, sun gears S1, S2, ring gears R1, R2 and carriers C1, C2 which support pinions P1, P2 which mesh, respectively, with the sun gears S1, S2 and the ring gears R1, R2 in such a way that the pinions P1, P2 rotate on their own axes and revolve or walk around the sun gears S1, S2. Then, the sun gears S1, S2 of the first and second planetary gear mechanisms PL1, PL2 are connected to each other so as to rotate integrally via a connecting shaft 23. The carriers C1, C2 of the first and second planetary gear mechanisms PL1, PL2 are connected to the left and right rear wheels LWr, RWr via joints J1, J2, respectively.

The first and second planetary gear mechanisms PL1, PL2 have equal gear ratios and are disposed close to each other. The motor MOT is disposed so as to be offset to the left in relation to an axial direction relative to the first and second planetary gear mechanisms PL1, PL2. In addition, the motor MOT overlaps the first and second planetary gear mechanisms PL1, PL2 in a radial direction.

The ring gears R1, R2 of the first and second planetary gear mechanisms PL1, PL2 have external teeth R1$b$, R2$b$ that are formed on outer circumferential surfaces thereof in addition to internal teeth R1$a$, R2$a$ that are formed on inner circumferential surfaces thereof so as to mesh with the pinions P1, P2, respectively. The external teeth R1$b$ of the ring gear R1 of the first planetary gear mechanism PL1 mesh with a first input gear 53 that is provided so as to rotate integrally with an idle shaft 51. The external teeth R2b of the ring gear R2 of the second planetary gear mechanism PL2 mesh with a first output gear 57 that meshes with an idle gear 55 that is provided coaxially with the first input gear 53 so as to rotate integrally. Namely, the ring gears R1, R2 of the first and second planetary gear mechanisms PL1, PL2 are connected together through three times of meshing including the meshing of the external teeth R1b of the ring gear R1 with the first input gear 53, the meshing of the idle gear 55 with the first output gear 57, and the meshing of the first output gear 57 with the external teeth R2b of the ring gear R2.

The two ring gears R1, R2 operate so as to rotate in opposite directions to each other as a result of the ring gears R1, R2 of the first and second planetary gear mechanisms PL1, PL2 being connected together through the odd number of times of meshing in the way described above. Namely, a rotation of the ring gear R1 in one direction causes the first input gear 53 to rotate in the other direction through the meshing of the external teeth R1b of the ring gear R1 with the first input shaft 53. Since the first input shaft 53 and the idle gear 55 rotate integrally via the idle shaft 51, the idle gear 55 also rotates in the other direction. Additionally, the first output gear 57 rotates in the other direction as a result of the idle gear 55 meshing with the first output gear 57. Further, as a result of the first output gear 57 with the external teeth R2b of the ring gear R2, a rotation of the first output gear 57 in the one direction acts so as to cause the ring gear R2 to rotate in the other direction.

Additionally, a gear ratio resulting from the meshing of the external teeth R1b of the ring gear R1 with the first input gear 53 and the meshing of the idle gear 55 with the first output gear 57 and a gear ratio resulting from the meshing of the first output gear 57 with the external teeth R2b of the ring gear R2 are set so that absolute values thereof become equal to each other. Consequently, torque of a motor MOT is always transmitted to the ring gears R1, R2 as torques having the equal absolute values and acting in the opposite directions.

A hollow second input gear 59 is provided on the connecting shaft 23 that connects the sun gears S1, S2 together so as to surround an outer circumference of the connecting shaft 23, and the hollow second input gear 59 is configured to rotate integrally with or rotate relatively to the connecting shaft 23 by being switched by the first clutch CL1. Namely, the first clutch CL1 connects or disconnects a power transmission between the second input gear 59 and the connecting shaft 23 by being applied or released. This second input gear 59 meshes with a second output gear 61 that is provided so as to rotate integrally with the output shaft 21 of the motor MOT.

The second clutch CL2 is provided on the output shaft 21 of the motor MOT in a position that overlaps the first clutch CL1 in an axial direction. Then, the first output gear 57 is configured so as to rotate integrally with or relatively to the output shaft 21 through switching by the second clutch CL2. Namely, the second clutch CL2 connects or disconnects a power transmission between the output shaft 21 of the motor MOT and the first output gear 57 by being applied or released.

The first and second clutches CL1, CL2 are allowed to take selectively one of a state in which the first and second clutches CL1, CL2 are both released, a first state in which the first clutch CL1 is applied while the second clutch CL2 is released, and a second state in which the first clutch CL1 is released while the second clutch CL2 is applied.

In the state in which both the first and second clutches CL1, CL2 are released, the output shaft 21 of the motor MOT is not connected to the first output gear 57, and the second input gear 59 is also not brought into connection with the connecting shaft 23, whereby a power transmission path between the output shaft 21 of the motor MOT and the first and second planetary gear mechanisms PL1, PL2 becomes a disconnected state. When the first and second clutches CL1, CL2 take the state in which the clutches CL1, CL2 are both released, no torque is transmitted from the motor MOT to the left and right rear wheels LWr, RWr, whereby neither a left-right driving force sum nor a left-right driving force difference is generated from the rear wheel driving system 20, this enabling a front-wheel drive (FWD), which will be described later.

In the first state in which the first clutch CL1 is applied while the second clutch CL2 is released, the second input gear 59 is connected to the connecting shaft 23, whereby a power transmission path between the output shaft 21 of the motor MOT and the sun gears S1, S2 of the first and second planetary gear mechanisms PL1, PL2 becomes a connected state via the second output gear 61 and the second input gear 59. When the first and second clutches CL1, CL2 take the first state, torques of the same magnitude are transmitted from the motor MOT to the left and right rear wheels LWr, RWr in the same direction in the front-rear direction, whereby a desired left-right driving force sum is generated from the rear wheel driving system 20 while no left-right driving force difference is generated therefrom, this enabling a four-wheel drive (4WD), which will be described later.

In the second state in which the first clutch CL1 is released while the second clutch CL2 is applied, the output shaft 21 of the motor MOT is connected to the first output gear 57, whereby a power transmission path between the output shaft 21 of the motor MOT and the ring gears R1, R2 of the first and second planetary gear mechanisms PL1, PL2 becomes a connected state via the first output gear 57, the idle gear 55 and the first input gear 53. When the first and second clutches CL1, CL2 take the second state, torques of the same magnitude are transmitted from the motor MOT to the left and right rear wheels LWr, RWr in opposite directions in the front-rear direction, whereby a desired left-right driving force difference is generated from the rear wheel driving system 20 while no left-right driving force sum is generated therefrom, this enabling a torque vectoring drive (TV), which will be described later.

Namely, the output shaft 21 of the motor MOT can selectively be switched for connection with the sun gears S1, S2 of the first and second planetary gear mechanisms PL1, PL2 and the ring gears R1, R2 of the first and second planetary gear mechanisms PL1, PL2. With the rear wheel driving system 20 that is configured as described above, too, the ring gears R1, R2 of the first and second planetary gear mechanisms PL1, PL2 are connected together through the odd number of times of meshing. Therefore, the rotation speeds of the two ring gears R1, R2 are controlled under a relationship in which an imaginary line L1 that connects the two ring gears R1, R2 rotate on a point of intersection where the imaginary line L1 intersects a zero rotation line L2 that indicates zero rotation as a fulcrum O on a collinear chart.

Consequently, when the wheeled vehicle V travels straight ahead with no difference in rotation speed between the left and right rear wheels LWr, RWr, the rotation speeds of the carriers C1, C2 that are connected to the left and right rear wheels LWr, RWr become equal to each other, and the imaginary line L1 that connects the two ring gears R1, R2 coincides with the zero rotation line L2, whereby the rotation speeds of the ring gears R1, R2 both become zero rotation. On the other hand, when the wheeled vehicle V turns with a difference in rotation speed between the left and right rear wheels LWr, RWr, a difference in rotation speed is generated on the carriers C1, C2 that are connected to the left and right rear wheels LWr, RWr, and the imaginary line L1 that connects the two ring gears R1, R2 rotates about the fulcrum O, whereby the ring gears R1, R2 rotate in the opposite directions at the same rotation speed.

Hereinafter, the front-wheel drive (FWD), the four-wheel drive (4WD) and the torque vectoring drive (TV) will be described in detail.

—Front-Wheel Drive (FWD)—

Figure 10B:
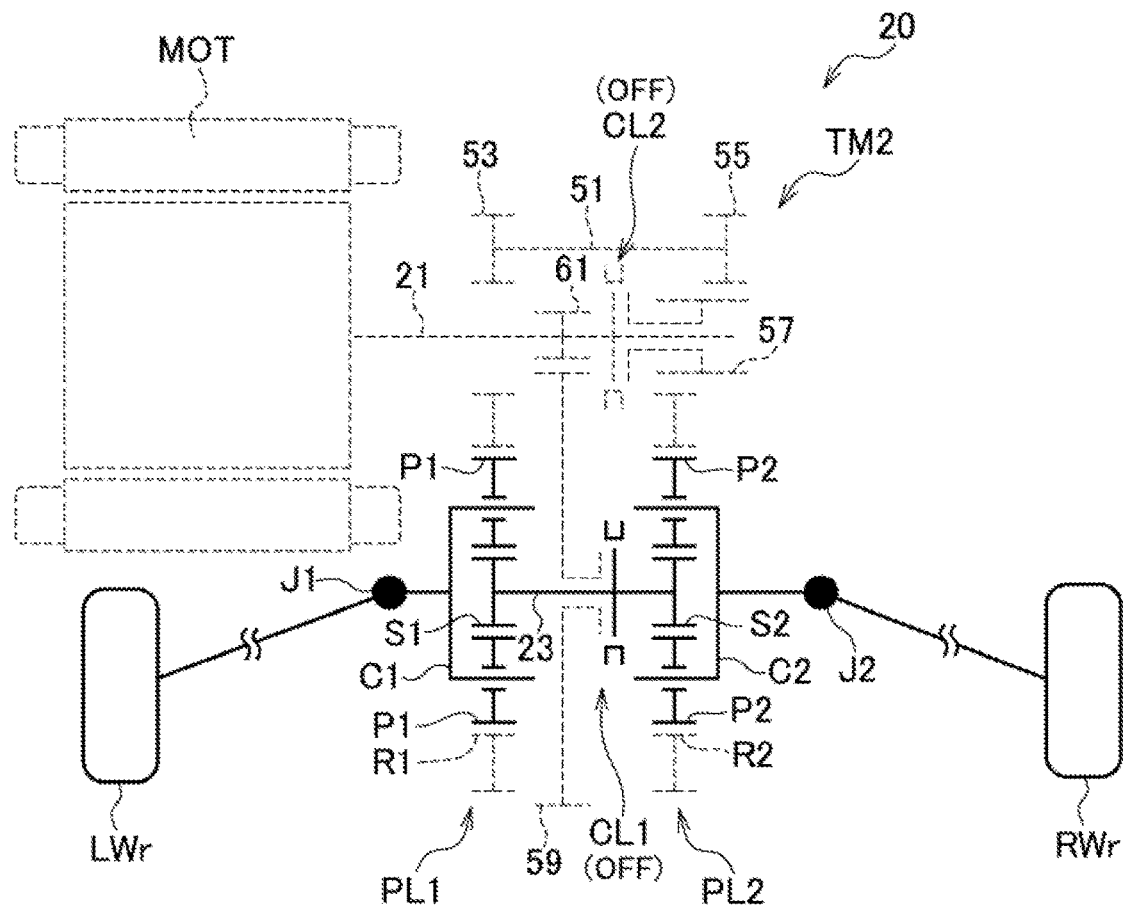
FIG. 10B is a skeleton diagram showing rotating elements in the rear wheel driving system of the third modified example of the first embodiment when the wheeled vehicle travels straight ahead by front-wheel drive (FWD).

When the state results in which both the first and second clutches CL1, CL2 are released (the first clutch CL1: released/the second clutch CL2: released), the power transmission path between the motor MOT and the first and second planetary gear mechanisms PL1, PL2 becomes a disconnected state, and hence, no torque is transmitted from the motor MOT to the left and right rear wheels LWr, RWr, whereby neither a left-right driving force sum nor a left-right driving force difference is generated from the rear wheel driving system 20. When the wheeled vehicle V travels straight ahead with no difference in rotation speed between the left and right rear wheels LWr, RWr, as shown by solid lines in FIG. 10A, the imaginary line L1 coincides with the zero rotation line L2, whereby the rotation speeds of the ring gears R1, R2 both become zero rotation. On the other hand, when the wheeled vehicle V turns with a difference in rotation speed between the left and right rear wheels LWr, RWr, as shown by broken lines in FIG. 10A, the imaginary line L1 rotates about the fulcrum O on the collinear chart, and the ring gears R1, R2 rotate in the opposite directions to each other at the same rotation speed. In FIG. 10B, the rotating elements of the power transmission mechanism TM2 are shown by solid lines when the wheeled vehicle V travels straight ahead by front-wheel drive (FWD) with no difference in rotation speed between the left and right rear wheels LWr, RWr. Compared with the straight ahead traveling by front-wheel drive (FWD) in the first embodiment (FIG. 3C), since the second input gear 59 is disconnected, in the power transmission mechanism TM2 of the third modified example, the inertial force when the wheeled vehicle V runs by front-wheel drive (FWD) can be reduced.

—Four-Wheel Drive (4WD)—

When the first and second clutches CL1, CL2 are in the first state (the first clutch CL1: applied/the second clutch CL2: released), the power transmission path between the motor MOT and the sun gears S1, S2 of the first and second planetary gear mechanisms PL1, PL2 becomes a connected state by way of the second output gear 61 and the second input gear 59, and motor torque M in a forward direction is inputted from the motor MOT into the sun gears S1, S2. In normal first and second planetary gear mechanisms PL1, PL2, in the event that forward torque is inputted into sun gears S1, S2, torque attempting to increase rotation speeds is transmitted to carriers C1, C2 and ring gears R1, R2. However, in the first and second planetary gear mechanisms PL1, PL2 of this embodiment, as has been described above, the ring gears R1, R2 are controlled so as to rotate only in the opposite directions to each other at the same rotation speed, and therefore, with the ring gears R1, R2 acting as fulcrums, the forward motor torque M that is inputted into the sun gears S1, S2 that act as points of application of force is transmitted to the carriers C1, C2 that act as points of action as forward left and right rear wheel torques T1, T2 that result from multiplying motor torques M1, M2 by the gear ratios of the first and second planetary gear mechanisms PL1, PL2. Since the gear ratios of the first and second planetary gear mechanisms PL1, PL2 are equal, the left and right rear wheel torques T1, T2 become torques having equal absolute values and acting in the same direction, and this generates a left-right driving force sum that corresponds to a sum of the left and right rear wheel torques T1, T2 (T1+T2), whereby a forward driving force is given to the wheeled vehicle V stably. A difference between the left and right rear wheel torques T1, T2 (T1−T2) becomes zero, and with the first and second clutch CL1, CL2 staying in the first state, there is no such situation that a left-right driving force difference is generated from the rear wheel driving system 20 due to the generation of torque of the motor MOT, whereby no yaw moment is given to the wheeled vehicle V. In the case of giving torque in a reverse direction to the wheeled vehicle V, namely, when the wheeled vehicle V is reversed, the motor MOT should be torque controlled so as to generate torque acting in an opposite direction to the direction in which the torque acts when the wheeled vehicle V travels forwards.

Figure 11A:
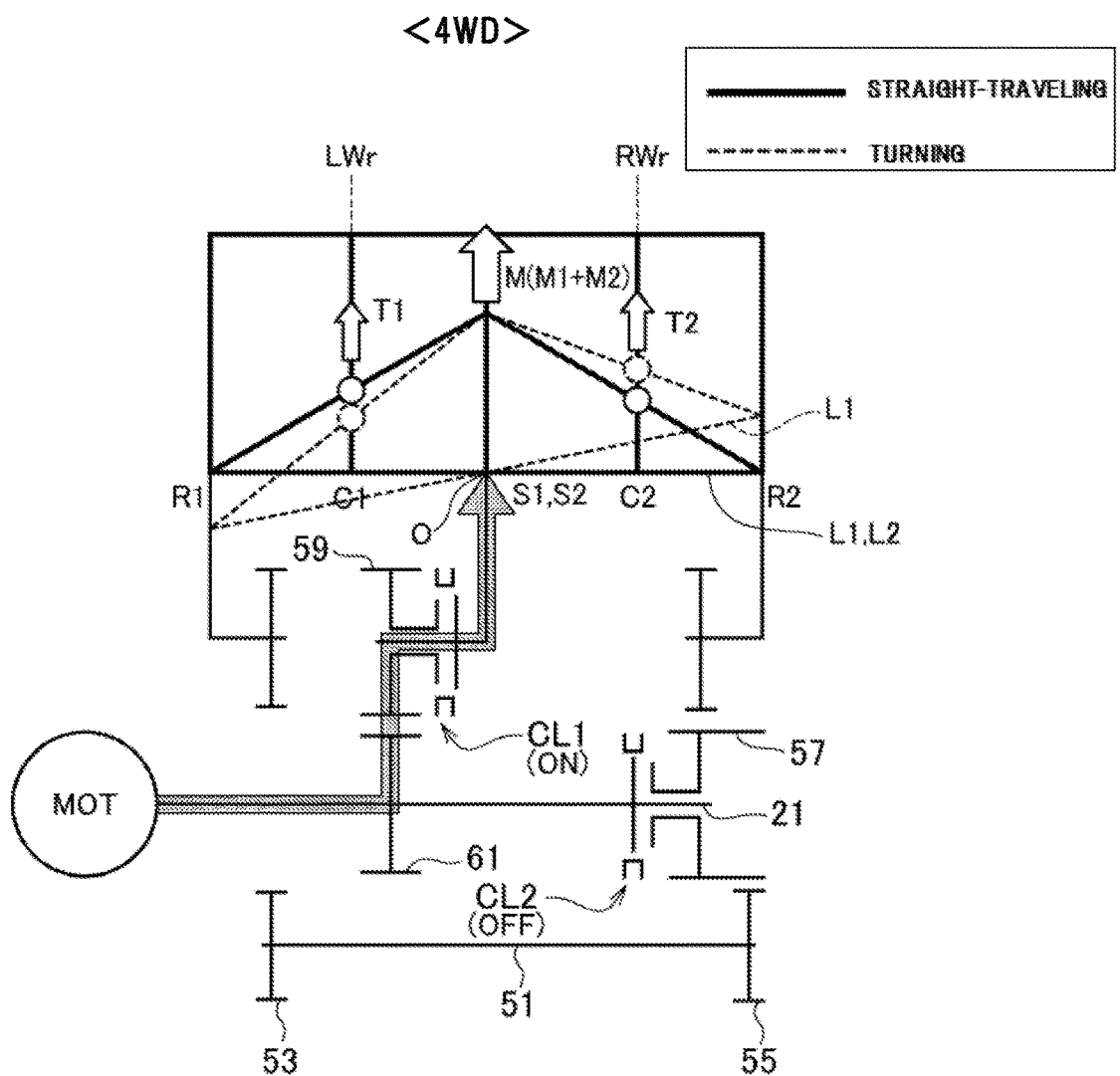
FIG. 11A is a diagram showing a power transmission path and a collinear chart in the rear wheel driving system of the third modified example of the first embodiment when the wheeled vehicle travels by four-wheel drive (4WD).
Figure 11B:
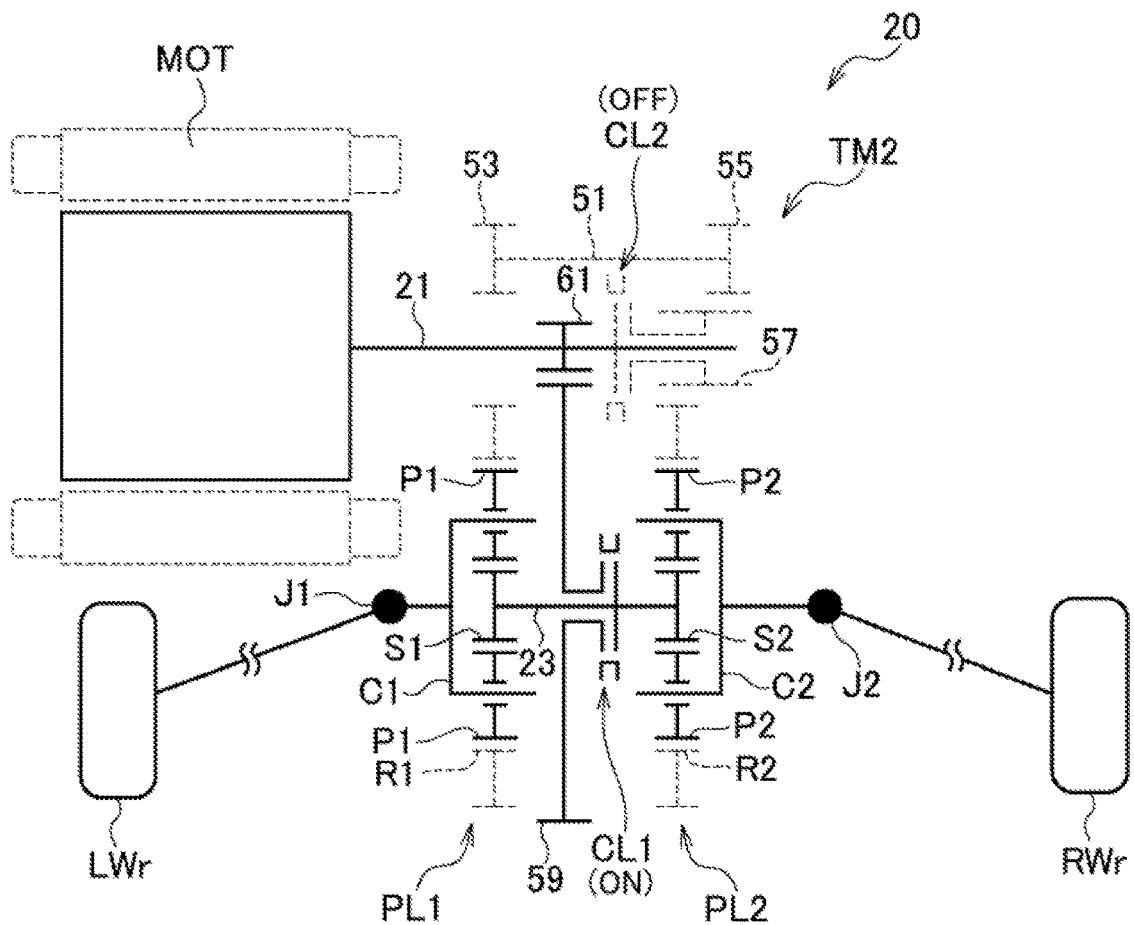
FIG. 11B is a skeleton diagram showing rotating elements in the rear wheel driving system of the third modified example of the first embodiment when the wheeled vehicle travels straight ahead by four-wheel drive (4WD).

When the wheeled vehicle V travels straight ahead with no difference in rotation speed between the left and right rear wheels LWr, RWr, as shown by solid lines in FIG. 11A, the imaginary line L1 coincides with the zero rotation line L2, whereby the rotation speeds of the ring gears R1, R2 both become zero rotation. On the other hand, when the wheeled vehicle V turns with a difference in rotation speed between the left and right rear wheels LWr, RWr, as shown by broken lines in FIG. 11A, the imaginary line L1 rotates about the fulcrum O on the collinear chart, and the ring gears R1, R2 rotate in the opposite directions to each other at the same rotation speed. In FIG. 11B, the rotating elements of the power transmission mechanism TM2 with no difference in rotation speed between the left and right wheels LWr, RWr are shown by solid lines when the wheeled vehicle V travels straight ahead by four-wheel drive (4WD) with no difference in rotation speed between the left and right rear wheels LWr, RWr.

In this way, the desired front-rear driving force can be generated in the left and right rear wheels LWr, RWr by controlling the first and second clutches CL1, CL2 to be put in the first state (the first clutch CL1: applied/the second clutch CL2: released) and torque controlling the motor MOT by changing the rotation direction of the motor MOT according to whether the wheeled vehicle V travels forwards or rearwards, whereby a front-rear running assist can be performed. This four-wheel drive (4WD) may be used as a starting assist when the wheeled vehicle V starts from rest or may be switched from the front wheel-drive (FWD) while the wheeled vehicle V is running. In switching from the front-wheel drive (FWD) to the four-wheel drive (4WD) while the wheeled vehicle V is running, the rotation speed of the motor MOT is increased to a rotation speed at which a rotation speed of the second input gear 59 becomes the same rotation speed as that of the connecting shaft 23 with the first and second clutches CL1, CL2 in FIG. 10B both left released, whereafter the first clutch CL1 is applied, whereby the drive can be shifted to the four-wheel drive (4WD) while suppressing the generation of shift shock.

—Torque Vectoring Drive (TV)—

Figure 12A:
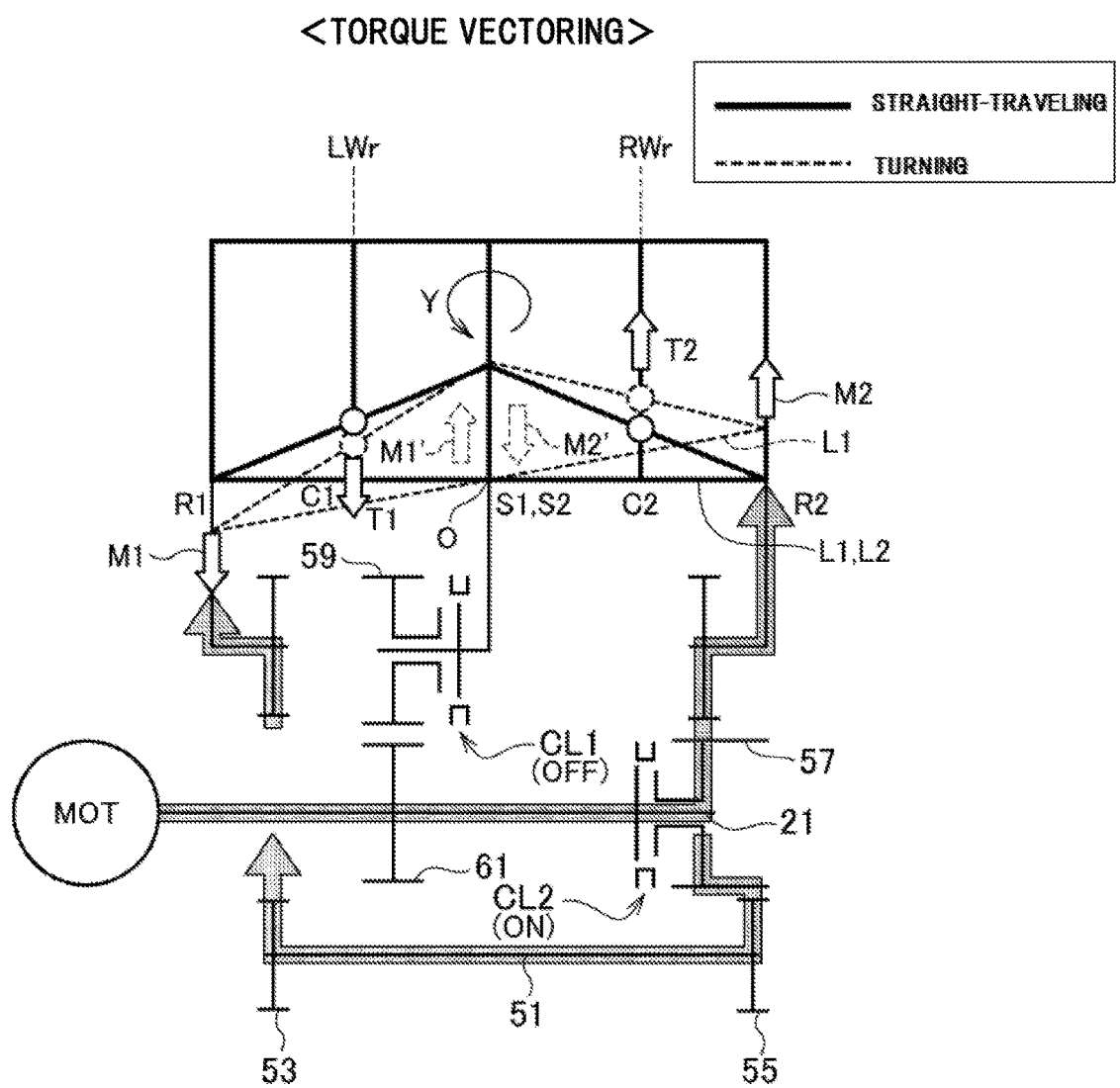
FIG. 12A is a diagram showing a power transmission path and a collinear chart in the rear wheel driving system of the third modified example of the first embodiment when the wheeled vehicle travels by torque vectoring drive (TV).

As shown in FIG. 12A, when the first and second clutches CL1, CL2 are in the second state (the first clutch CL1: released/the second clutch CL2: applied), the power transmission path between the motor MOT and the ring gears R1, R2 of the first and second planetary gear mechanisms PL1, PL2 becomes a connected state by way of the first output gear 57, the idle gear 55 and the first input gear 53, and motor torques having equal absolute values and acting in opposite directions are inputted from the motor MOT into the ring gears R1, R2.

Namely, the torque of the motor MOT gives a first motor torque M1 that acts in the reverse direction that is the same as the direction of the torque of the motor MOT to the ring gear R1 as a result of the first output gear 57 meshing with the idle gear 55 and the first input gear 53 meshing with the external teeth R1*b* of the ring gear R1. As this occurs, the forward torque (not shown) attempting to cause the wheeled vehicle V to travel forwards is being applied to the carrier C1 from the left rear wheel LWr. Thus, in the first planetary gear mechanism PL1, as a result of the first motor torque M1 acting in the reverse direction being applied to the ring gear R1 that acts as the point of application of force with the carrier C1 acting as the fulcrum, a first motor torque distribution forth M1' acting in the forward direction is applied to the sun gears S1, S2 that act as the points of action.

Additionally, the torque of the motor MOT gives a second motor torque M2 in a forward direction that is the same as the direction of the torque of the motor MOT to the ring gear R2 as a result of the first output gear 57 meshing with the external teeth R2*b* of the ring gear R2. As this occurs, the forward torque (not shown) attempting to cause the wheeled vehicle V to travel forwards is being applied to the carrier C2 from the right rear wheel RWr. Thus, in the second planetary gear mechanism PL2, as a result of the second motor torque M2 acting in the forward direction being applied to the ring gear R2 that acts as the point of application of force with the carrier C2 acting as the fulcrum, a second motor torque distribution forth M2' acting in the reverse direction is applied to the sun gears S1, S2 that act as the points of action.

Here, the first motor torque M1 and the second motor torque M2 are the torques having the equal absolute values and acting in the opposite directions. Thus, the first motor torque distribution force M1' acting in the forward direction and the second motor torque distribution force M2' acting in the reverse direction to the sun gears S1, S2 cancel (offset) each other. Due to this offsetting of the first and second motor torque distribution forces M1', M2', with the sun gear S1 acting as the fulcrum, the reverse first motor torque M1 that is inputted into the ring gear R1 that acts as the point of application of force is transmitted to the carrier C1 that acts as the point of action as a reverse left rear wheel torque T1 that results from being multiplied by the gear ratio of the first planetary gear mechanism PL1. Then, with the sun gear S2 acting as the fulcrum, the forward second motor torque M2 that is inputted into the ring gear R2 that acts as the point of application of force is transmitted to the carrier C2 that acts as the point of action as a forward right rear wheel torque T2 that results from being multiplied by the gear ratio of the second planetary gear mechanism PL2.

Since the gear ratios of the first and second planetary gear mechanisms PL1, PL2 are equal, the left and right rear wheel torques T1, T2 become torques having equal absolute values and acting in opposite directions, and this generates a left-right driving force difference that corresponds to a difference between the left and right rear wheel torques T1, T2 (T1−T2), whereby a counterclockwise yaw moment Y is given to the wheeled vehicle V stably. With the sum of the left and right rear wheel torques T1, T2 (T1+T2) becomes zero and the first and second clutches CL1, CL2 staying in the second state, a left-right driving force sum is not generated from the rear wheel driving system 20 by the generation of torque of the motor MOT, and no front-rear torque is given to the wheeled vehicle V. In the case of giving yaw moment acting in a clockwise direction to the wheeled vehicle V, the motor MOT should be torque controlled so as to generate torque acting in an opposite direction to the direction described above.

Figure 12B:
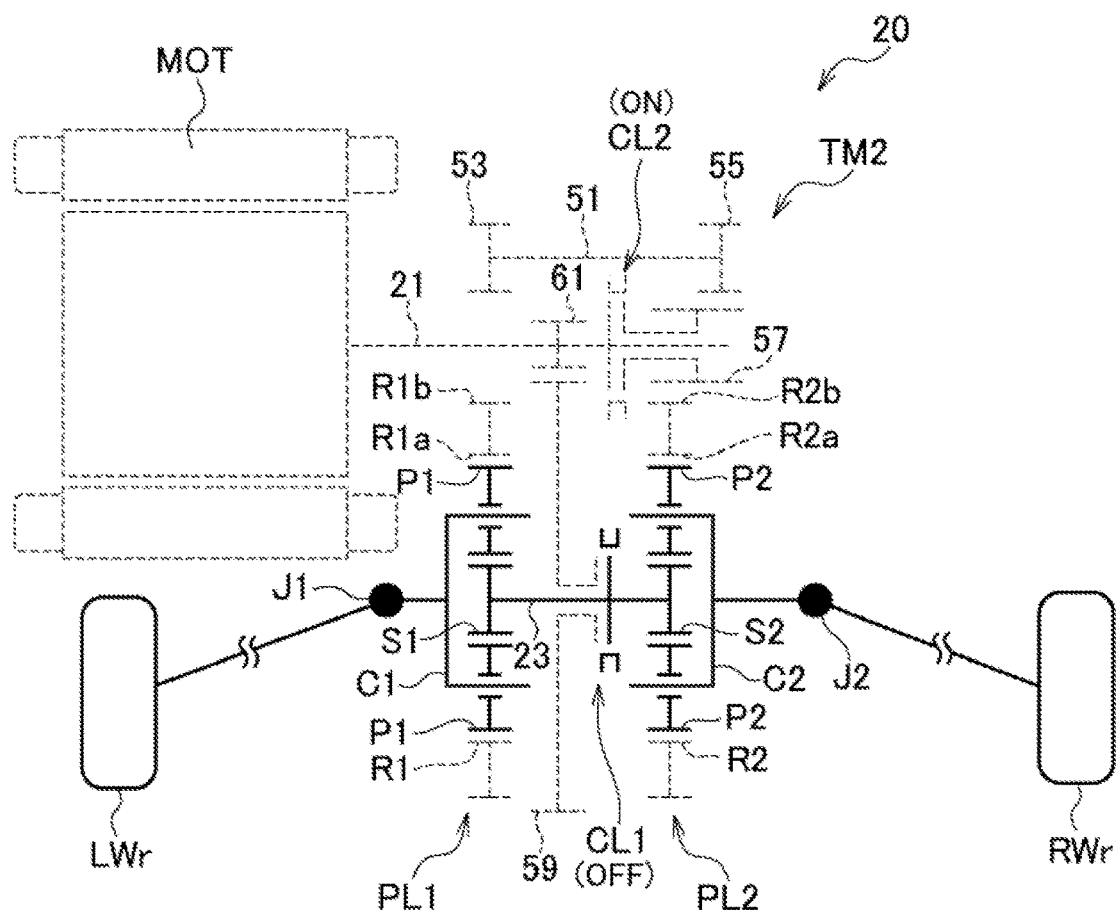
FIG. 12B is a skeleton diagram showing rotating elements in the rear wheel driving system of the third modified example of the first embodiment when the wheeled vehicle travels straight ahead by torque vectoring drive (TV).

When the wheeled vehicle V travels straight ahead with no difference in rotation speed between the left and right rear wheels LWr, RWr, as shown by solid lines in FIG. 12A, the imaginary line L1 coincides with the zero rotation line L2, whereby the rotation speeds of the ring gears R1, R2 both become zero rotation. On the other hand, when the wheeled vehicle V turns with a difference in rotation speed between the left and right rear wheels LWr, RWr, as shown by broken lines in FIG. 12A, the imaginary line L1 rotates about the fulcrum O on the collinear chart, and the ring gears R1, R2 rotate in the opposite directions to each other at the same rotation speed. In FIG. 12B, the rotating elements of the power transmission mechanism TM2 are shown by solid lines when the wheeled vehicle V travels straight ahead by torque vectoring drive (TV) with no difference in rotation speed between the left and right rear wheels LWr, RWr by torque vectoring drive (TV).

In this way, the desired yaw moment can be generated by controlling the first and second clutches CL1, CL2 to be put in the second state (the first clutch CL1: released/the second clutch CL2: applied) and torque controlling the motor MOT by changing the rotation direction of the motor MOT according to the turning direction or lateral acceleration, whereby a turning assist can be performed. In addition, the turning can be limited by generating a yaw moment acting in an opposite direction to the turning direction.

Flows of electric power on the four-wheel drive (4WD) and the torque vectoring drive (TV) are the same as those of the first embodiment, and the description thereof will be omitted here. In addition, the front-wheel drive (FWD), four-wheel drive (4WD) and torque vectoring drive (TV) can be switched over according to the vehicle speed as done in the first embodiment.

Thus, as has been described heretofore, the output shaft 21 of the motor MOT is connected to the sun gears S1, S2 of the first and second planetary gear mechanisms PL1, PL2 and the ring gears R1, R2 of the first and second planetary gear mechanisms PL1, PL2 so as to switch therebetween selectively. Thus, with the single motor MOT, it becomes possible to output the front-rear torques acting in the same direction to the left and right rear wheels LWr, RWr or to output the torques acting in opposite directions to the left rear wheel LWr and the right rear wheel RWr without generating the front-rear torque. Further, the torque of the motor MOT is inputted to the different rotating elements of the first and second planetary gear mechanisms PL1, PL2 between when the front-rear torques acting in the same direction are outputted to the left and right rear wheels LWr, RWr and when the torques acting in the opposite directions are outputted to the left rear wheel LWr and the right rear wheel RWr without outputting the front-rear torque. Thus, by changing the gear ratios of the sun gears S1, S2, the ring gears R1, R2 and the carriers C1, C2, torque differences in magnitude can be induced in the front-rear assist and the turning assist.

Additionally, since the power transmission mechanism TM2 is made up of the two first and second planetary gear mechanisms PL1, PL2, a widthwise dimension can be reduced.

The power transmission mechanism TM2 includes the first and second clutches CL1, CL2 and is configured to switch to the first state and the second state selectively, and therefore, the power transmission mechanism TM2 can transmit power to either of the sun gears S1, S2 and the ring gears R1, R2 of the first and second planetary gear mechanisms PL1, PL2 in an ensured fashion.

Additionally, the motor MOT is disposed on one side or a left side of the first and second planetary gear mechanisms PL1, PL2 in relation to the axial direction. Thus, compared with a case where the motor MOT is disposed so as to be held by the first and second planetary gear wheels PL1, PL2 therebetween, the joints J1, J2 that make up connecting portions between the left and right rear wheels LWr, RWr and the carriers CL1, CL2 can be disposed further inwards in the vehicle's width direction, whereby angles from the joints J1, J2 towards the left and right rear wheels LWr, RWr can be restrained from being increased. This can enhance the degree of freedom in relation to the lateral arrangement when mounting the rear wheel driving system 20 on the wheeled vehicle V. It is noted that the motor MOT may be disposed on the other side or a right side of the first and second planetary gear mechanisms PL1, PL2.

In addition, since the motor MOT overlaps the first and second planetary gear mechanisms PL1, PL2 in a radial direction, a radial dimension can also be reduced. This can enhance the degree of freedom in relation to the front-rear mounting position on the wheeled vehicle V in mounting the rear wheel driving system 20 on the wheeled vehicle V.

Additionally, the first clutch CL1 and the second clutch CL2 are disposed in positions that are offset in a radial direction and are disposed in positions that overlap in an axial direction. This can restrain an axial dimension of the power transmission mechanism TM2 from being increased. Further, the first and second clutches CL1, CL2 may be configured so as to switch between the first state and the second state by the use of a common actuator.

In addition, since the first clutch CL1 is allowed to switch on the same rotation axis as those of the sun gears S1, S2, the first and second clutches can be disposed by making effective use of the dead space defined between the planetary gear mechanisms.

In addition, compared with the first embodiment, the number of components that rotate integrally with the sun gears S1, S2 when the wheeled vehicle V travels straight ahead by torque vectoring drive (TV) is reduced. Therefore, not only can the inertial force be reduced while the sun gears S1, S2 are rotating, but also a scooping loss of lubricant can be reduced.

Fourth Modified Example

Figure 13:
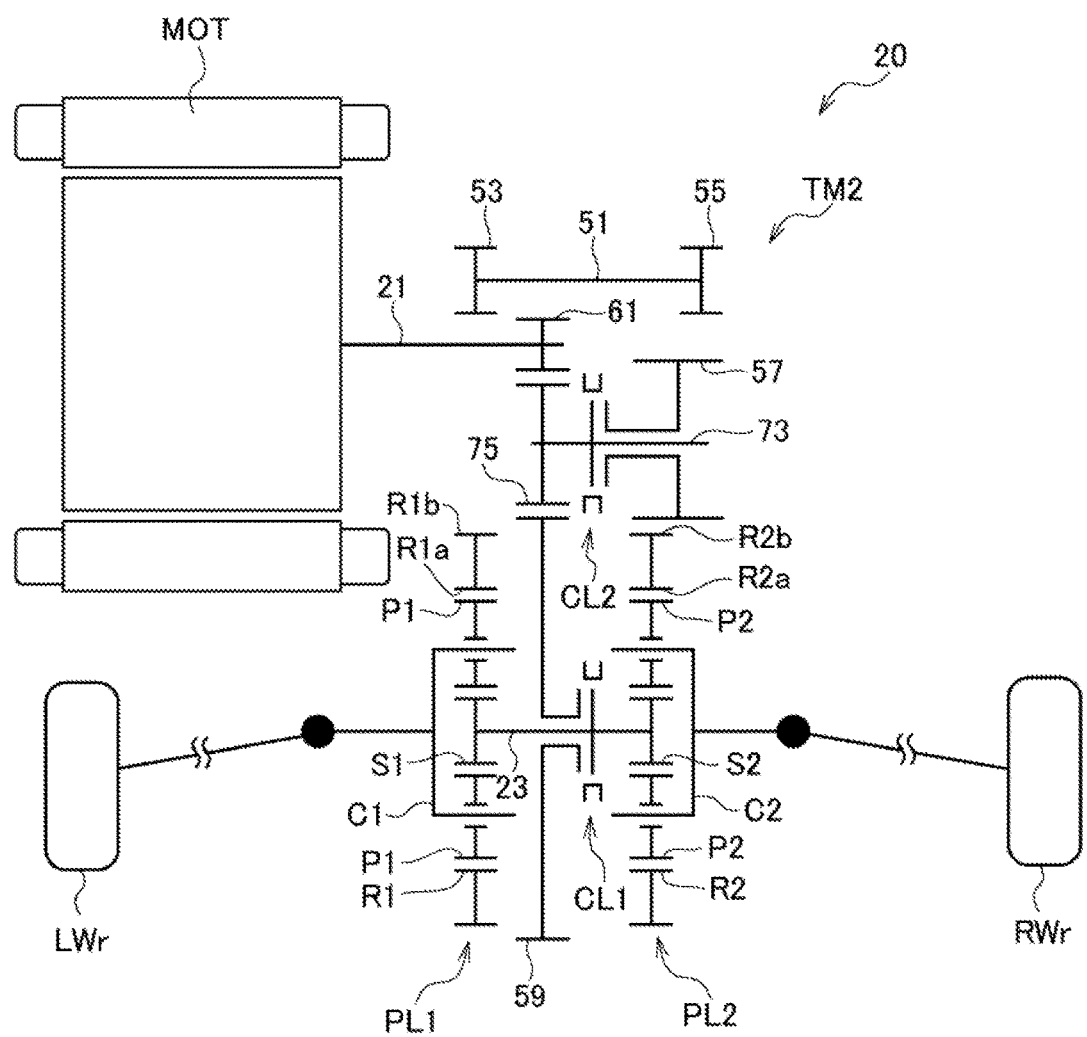
FIG. 13 is a skeleton diagram of a rear wheel driving system of a fourth modified example of the first embodiment.

Following to the third modified example, referring to FIG. 13, a rear wheel driving system 20 of a fourth modified example of the first embodiment will be described.

This modified example has the same configurations as those of the power transmission TM2 of the third modified example except that a second idle shaft 73 is provided additionally on the power transmission mechanism TM2 of the third modified example and an intermediate gear 75, a first output gear 57 and a second clutch CL2 are provided on the second idle shaft 73. Thus, like reference numerals will be given to like constituent portions to those of the third modified example so as to omit the description thereof, and only different features will be described.

The intermediate gear 75 is provided so as to rotate integrally with the second idle shaft 73 and meshes with a second output gear 61 and a second input gear 59 at all times. In addition, the first output gear 57 is provided on the second idle shaft 73, so as to rotate integrally with or relative to the second idle shaft 73 through switching by the second clutch CL2. Owing to this, in a first state in which a first clutch CL1 is applied while the second clutch CL2 is released, the second input gear 59 is connected to a connecting shaft 23, whereby a power transmission path between an output shaft 21 of a motor MOT and sun gears S1, S2 of first and second planetary gear mechanisms PL1, PL2 becomes connected state by way of the second output gear 61, the intermediate gear 75 and the second input gear 59. On the other hand, in a second state in which the first clutch CL1 is released while the second clutch CL2 is applied, the first output gear 57 is connected to the second idle shaft 73, whereby a power transmission path between the output shaft 21 of the motor MOT and ring gears R1, R2 of the first and second planetary gear mechanisms PL1, PL2 becomes a connected state by way of the second output gear 61, the intermediate gear 75, the first output gear 57, the idle gear 55 and the first input gear 53.

Consequently, according to this modified example, in addition to the advantage of the third modified example, the torque of the motor MOT is transmitted via the intermediate gear 75 even when the wheeled vehicle V runs by four-wheel drive (4WD) or by torque vectoring drive (TV). Therefore, a larger gear ratio can be ensured which becomes larger by such an extent that the intermediate gear 75 is added. It should be noted that rotation directions of carriers C1, C2 become opposite to those of the carriers C1, C2 of the third modified example.

Further, according to this modified example, adding the second idle shaft 73 can ensure a distance between the output shaft 21 of the motor MOT and the connecting shaft 23, and therefore, even though the size of the motor MOT is enlarged, it is possible to avoid the interference thereof with axles.

Fifth Modified Example

Figure 14:
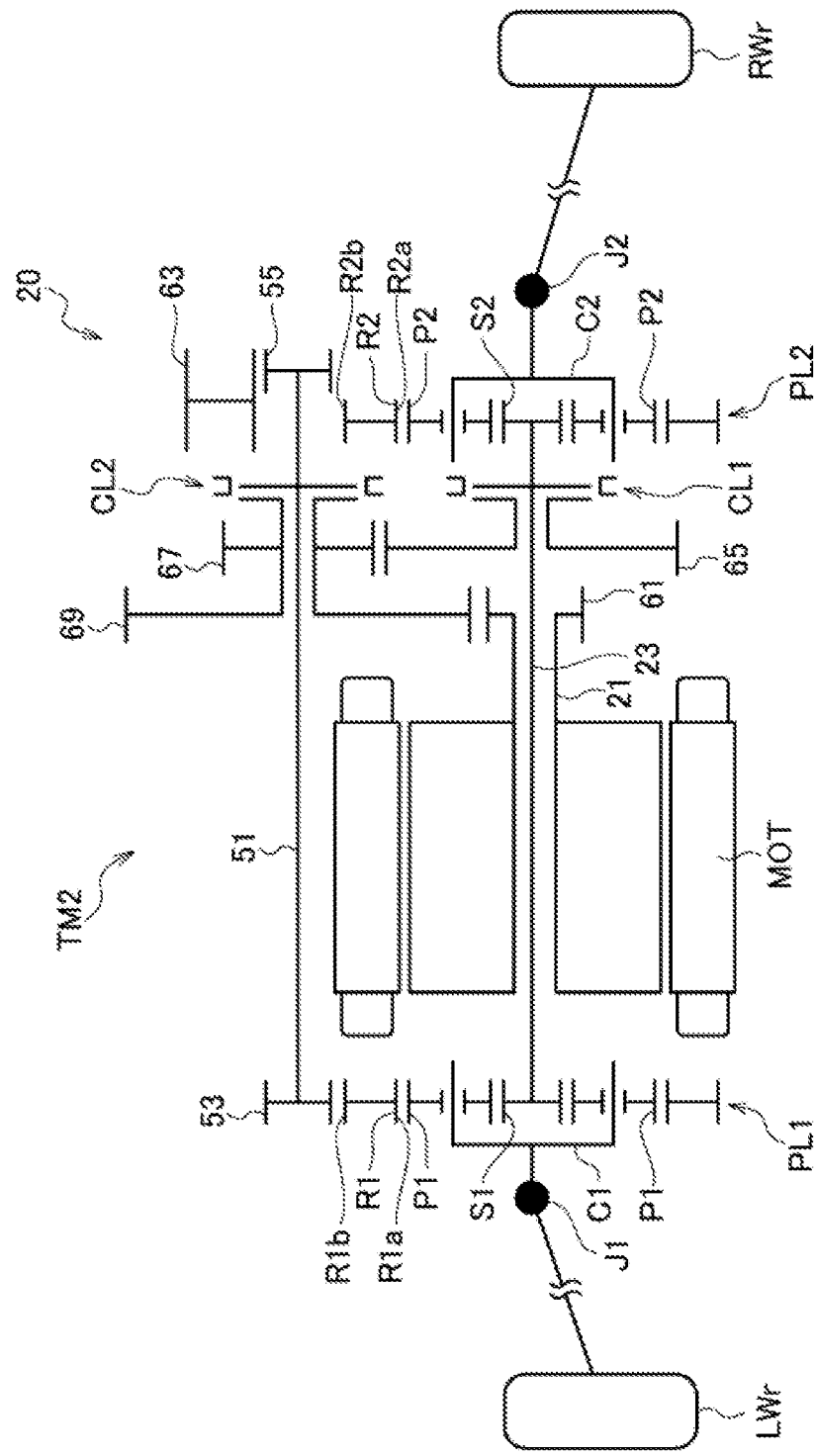
FIG. 14 is a skeleton diagram of a rear wheel driving system of a fifth modified example of the first embodiment.

Following to the fourth modified example, referring to FIG. 14, a rear wheel driving system 20 of a fifth modified example of the first embodiment will be described.

In this modified example, a motor MOT is incorporated in a power transmission mechanism TM2. The power transmission mechanism TM2 includes the motor MOT, first and second clutches CL1, CL2 and two planetary gear mechanisms of first and second planetary gear mechanisms PL1, PL2. The first and second planetary gear mechanisms PL1, PL2 are each made up of a so-called single pinion planetary gear mechanism and include, respectively, sun gears S1, S2, ring gears R1, R2 and carriers C1, C2 which support pinions P1, P2 which mesh, respectively, with the sun gears S1, S2 and the ring gears R1, R2 in such a way that the pinions P1, P2 rotate on their own axes and revolve or walk around the sun gears S1, S2. Then, the sun gears S1, S2 of the first and second planetary gear mechanisms PL1, PL2 are connected to each other so as to rotate integrally via a connecting shaft 23. The carriers C1, C2 of the first and second planetary gear mechanisms PL1, PL2 are connected to left and right rear wheels LWr, RWr via joints J1, J2, respectively.

The first and second planetary gear mechanisms PL1, PL2 have equal gear ratios and are disposed so as to hold the motor MOT therebetween.

In the ring gear R1 of the first planetary gear mechanism PL1, external teeth R1$b$ mesh with a first input gear 53 that is provided so as to rotate integrally with an idle shaft 51. In the ring gear R2 of the second planetary gear mechanism PL2, external teeth R2$b$ mesh with a second input gear 63 that meshes with an idle gear 55 that is provided coaxially with the first input gear 53 so as to rotate integrally. Namely, the ring gears R1, R2 of the first and second planetary gear mechanisms PL1, PL2 are connected together through three times of meshing including the meshing of the external teeth R1b of the ring gear R1 with the first input gear 53, the meshing of the idle gear 55 with the second input gear 63, and the meshing of the second input gear 63 with the external teeth R2b of the ring gear R2.

The two ring gears R1, R2 operate so as to rotate in opposite directions to each other as a result of the ring gears R1, R2 of the first and second planetary gear mechanisms PL1, PL2 being connected together through the odd number of times of meshing in the way described above. Namely, a rotation of the ring gear R1 in one direction causes the first input gear 53 to rotate in the other direction through the meshing of the external teeth R1b of the ring gear R1 with the first input shaft 53. Since the first input shaft 53 and the idle gear 55 rotate integrally via the idle shaft 55, the idle gear 55 also rotates in the other direction. The second input gear 63 rotates in the one direction as a result of the idle gear 55 meshing with the second input gear 63. Further, as a result of the second input gear 63 meshing with the external teeth R2b of the ring gear R2, a rotation of the second input gear 63 in the one direction acts so as to cause the ring gear R2 to rotate in the other direction.

Additionally, a gear ratio resulting from the meshing of the external teeth R1b of the ring gear R1 with the first input gear 53 and a gear ratio resulting from the meshing of the idle gear 55 with the second input gear 63 and the meshing of the second input gear 63 with the external teeth R2b of the ring gear R2 are set so that absolute values thereof become equal to each other. Consequently, torque of a motor MOT is always transmitted to the ring gears R1, R2 as torques having the equal absolute values and acting in the opposite directions.

A hollow third input gear 65 is provided on a connecting shaft 23 that connects together the sun gears S1, S2 so as to surround an outer circumference of the connecting shaft 23, and the hollow third input gear 65 is configured to rotate integrally with or rotate relatively to the connecting shaft 23 through switching by the first clutch CL1. Namely, the first clutch CL1 connects or disconnects a power transmission between the third input gear 65 and the connecting shaft 23 by being applied or released.

In addition, the motor MOT is provided between the third input gear 65 and the sun gear S1 so as to surround the outer circumference of the connecting shaft 23, and a hollow output shaft 21 of the motor MOT is provided so as to extend towards a third input gear 65 so as to rotate relative to the connecting shaft 23.

A second output gear 61 is provided on the output shaft 21 of the motor MOT so as to rotate integrally with the output shaft 21, and the second output gear 61 meshes with a fourth input gear 69 that is provided so as to rotate integrally with or rotate relatively to the idle shaft 51 through switching by the second clutch CL2. A second output gear 67 is provided on the fourth input gear 69 so as to rotate integrally with the fourth input gear 69, and the second output gear 67 meshes with the third input gear 65 that is provided on the connecting shaft 23. Namely, the second clutch CL2 connects or disconnects a power transmission between the idle shaft 51 and the fourth input gear 69 and the second output shaft 67 by being applied or released.

The first and second clutches CL1, CL2 are allowed to take selectively one of a state in which the first and second clutches CL1, CL2 are both released, a first state in which the first clutch CL1 is applied while the second clutch CL2 is released, and a second state in which the first clutch CL1 is released while the second clutch CL2 is applied.

In the state in which both the first and second clutches CL1, CL2 are released, the fourth input gear 69 and the second output gear 67 are not connected to the idle shaft 51 and the third input gear 65 is not connected to the connecting shaft 23, either, whereby a power transmission path between the output shaft 21 of the motor MOT and the first and second planetary gear mechanisms PL1, PL2 becomes a disconnected state. When the first and second clutches CL1, CL2 take the state in which the clutches CL1, CL2 are both released, no torque is transmitted from the motor MOT to the left and right rear wheels LWr, RWr, whereby neither a left-right driving force sum nor a left-right driving force difference is generated from the rear wheel driving system 20, this enabling a front-wheel drive (FWD).

In the first state in which a first clutch CL1 is applied while the second clutch CL2 is released, the third input gear 65 is connected to the connecting shaft 23, whereby the power transmission path between the output shaft 21 of the motor MOT and the sun gears S1, S2 of the first and second planetary gear mechanisms PL1, PL2 becomes a connected state by way of the second output gear 61, the fourth input gear 69, the second output gear 67 and the third input gear 65. When the first and second clutches CL1, CL2 take the first state, torques of the same magnitude are transmitted from the motor MOT to the left and right rear wheels LWr, RWr in the same direction in the front-rear direction, whereby a desired left-right driving force sum is generated from the rear wheel driving system 20 while no left-right driving force difference is generated therefrom, this enabling a four-wheel drive (4WD).

In the second state in which the first clutch CL1 is released while the second clutch CL2 is applied, the fourth input gear 69 and the second output gear 67 are connected to the idle shaft 51, whereby a power transmission path between the output shaft 21 of the motor MOT and the ring gears R1, R2 of the first and second planetary gear mechanisms PL1, PL2 becomes a connected state by way of the second output gear 61, the fourth input gear 69 (the second output gear 67), the first input gear 53, the idle gear 55 and the second input gear 63. When the first and second clutches CL1, CL2 take the second state, torques of the same magnitude are transmitted from the motor MOT to the left and right rear wheels LWr, RWr in opposite directions in the front-rear direction, whereby a desired left-right driving force difference is generated from the rear wheel driving system 20 while no left-right driving force sum is generated therefrom, this enabling a torque vectoring drive (TV). The front-wheel drive (FWD), the four-wheel drive (4WD) and the torque vectoring drive (TV) are the same as those of the third modified example, and the detailed description thereof will be omitted here.

According to this modified example, since the motor MOT is disposed on the same rotation axis as those of the sun gears S1, S2, a radial dimension can be reduced.

In addition to the advantage of the third modified example, the torque of the motor MOT is transmitted to the ring gears R1, R2 via the second output gear 61 and the fourth input gear 69 even when the wheeled vehicle V runs by torque vectoring drive (TV), thereby making it possible to secure a large gear ratio.

Second Embodiment

Figure 15A:
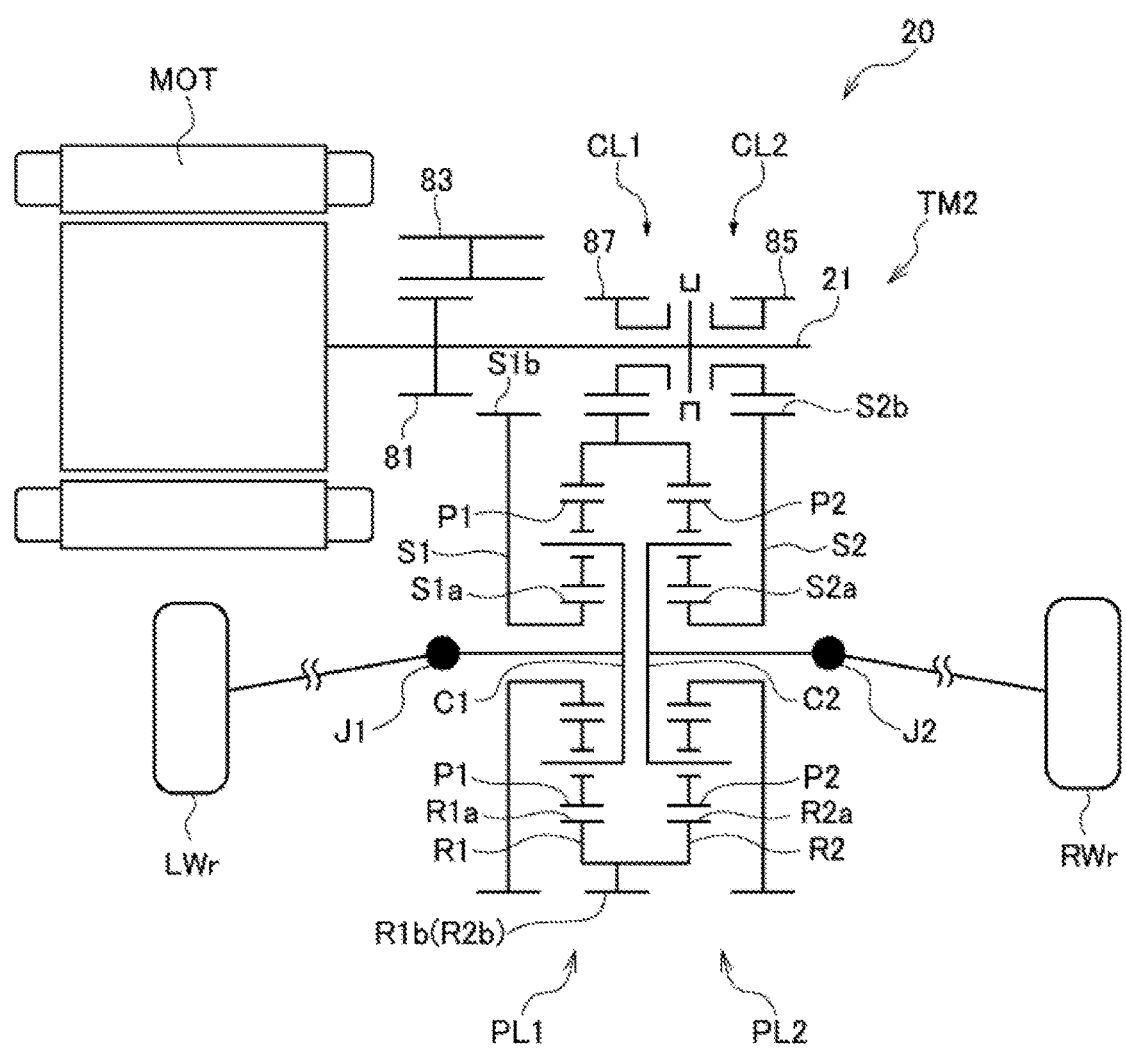
FIG. 15A is a skeleton diagram of a rear wheel driving system of a second embodiment.

Next, referring to FIG. 15A, a rear wheel driving system 20 of a second embodiment will be described.

In this embodiment, a power transmission mechanism TM2 includes first and second clutches CL1, CL2 and two planetary gear mechanisms, which are first and second planetary gear mechanisms PL1, PL2. The first and second planetary gear mechanisms PL1, PL2 are each made up of a so-called single pinion planetary gear mechanism and include, respectively, sun gears S1, S2, ring gears R1, R2 and carriers C1, C2 which support pinions P1, P2 which mesh, respectively, with the sun gears S1, S2 and the ring gears R1, R2 in such a way that the pinions P1, P2 rotate on their own axes and revolve or walk around the sun gears S1, S2. Then, in this embodiment, the ring gears R1, R2 of the first and second planetary gear mechanisms PL1, PL2 make up first rotating elements of first and second differential mechanisms, the carriers C1, C2 of the first and second planetary gear mechanisms PL1, PL2 make up second rotating elements of the first and second differential mechanisms, and the sun gears S1, S2 of the first and second planetary gear mechanisms PL1, PL2 make up third rotating elements of the first and second differential mechanisms. The ring gears R1, R2 of the first and second planetary gear mechanisms PL1, PL2 are connected to each other so as to rotate integrally. The carriers C1, C2 of the first and second planetary gear mechanisms PL1, PL2 are connected to left and right rear wheels LWr, RWr via joints J1, J2, respectively.

In the sun gear S1 of the first planetary gear mechanism PL1, large-diameter external teeth S1$b$ that are formed integrally with small-diameter external teeth S1$a$ that are formed on an outer circumferential surface thereof so as to mesh with the pinions P1 meshes with an idle gear 83 that meshes with a first output gear 81 that is provided so as to rotate integrally with an output shaft 21. In the sun gear S2 of the second planetary gear mechanism PL2, large-diameter external teeth S2$b$ that are formed integrally with small-diameter external teeth S2$a$ that are formed on an outer circumferential surface thereof so as to mesh with the pinions P2 meshes with a hollow second output gear 85 that covers an outer circumference of the output shaft 21 of a motor MOT. The second output gear 85 is provided on the output shaft 21 of the motor MOT so as to rotate relatively thereto and is configured so as to rotate integrally with or relative to the output shaft 21 through switching by the second clutch CL2.

Namely, the sun gears S1, S2 of the first and second planetary gear mechanisms PL1, PL2 are connected together through three times of meshing including the meshing of the large-diameter external teeth S1$b$ with the idle gear 83, the meshing of the idle gear 83 with the first output gear 81, and the meshing of the second output gear 85 with the large-diameter external teeth S2$b$ of the sun gear S2. The two sun gears S1, S2 of the first and second planetary gear mechanisms PL1, PL2 operate so as to rotate in opposite directions to each other as a result of the sun gears S1, S2 being connected together through the odd number of times of meshing in the way described above.

Additionally, a gear ratio resulting from the meshing of the large-diameter external teeth S1$b$ of the sun gear S1 with the idle gear 83 and the meshing of the idle gear 83 with the first output gear 81 and a gear ratio resulting from the meshing of the large-diameter external teeth S2$b$ of the sun gear S2 with the second output gear 85 are set so that absolute values thereof become equal to each other. Consequently, the torque of the motor MOT is always transmitted to the sun gears S1, S2 as torques having the equal absolute values and acting in the opposite directions.

The ring gears R1, R2 of the first and second planetary gear mechanisms PL1, PL2 have common external teeth R1$b$ (R2$b$) that are formed on outer circumferential surfaces thereof in addition to internal teeth R1$a$, R2$a$ that are formed on inner circumferential surfaces thereof so as to mesh with the pinions P1, P2.

A hollow third output gear 87 is provided on the output shaft 21 of the motor MOT so as to surround an outer circumference of the output shaft 21, and the third output gear 87 meshes with the external teeth R1$b$ (R2$b$) of the ring gears R1, R2 that are formed integrally of the first and second planetary gear mechanisms PL1, PL2. The third output gear 87 is configured so as to rotate integrally with or relative to the output shaft 21 through switching by the first clutch CL1. Namely, the first clutch CL1 connects or disconnects a power transmission between the third output gear 87 and the output shaft 21 by being applied or released. In addition, the second clutch CL2 connects or disconnects a power transmission between the second output gear 85 and the output shaft 21 by being applied or released. The first and second clutches CL1, CL2 are each made up of a synchro-mesh mechanism that can be switched over by a common actuator and can be switched over on the same rotation axis, that is, the same rotation axis as the output shaft 21.

The first and second clutches CL1, CL2 are allowed to take selectively one of a state in which the first and second clutches CL1, CL2 are both released, a first state in which the first clutch CL1 is applied while the second clutch CL2 is released, and a second state in which the first clutch CL1 is released while the second clutch CL2 is applied.

In the state in which both the first and second clutches CL1, CL2 are released, the output shaft 21 is not brought into connection with either of the second output gear 85 and the third output gear 87, whereby a power transmission path between the output shaft 21 of the motor MOT and the first and second planetary gear mechanisms PL1, PL2 becomes disconnected state. When the first and second clutches CL1, CL2 take the state in which the clutches CL1, CL2 are both released, no torque is transmitted from the motor MOT to the left and right rear wheels LWr, RWr, whereby neither a left-right driving force sum nor a left-right driving force difference is generated from the rear wheel driving system 20, this enabling a front-wheel drive (FWD).

In the first state in which the first clutch CL1 is applied while the second clutch CL2 is released, the output shaft 21 is connected to the third output gear 87, whereby a power transmission path between the output shaft 21 of the motor MOT and the ring gears R1, R2 of the first and second planetary gear mechanisms PL1, PL2 becomes a connected state. When the first and second clutches CL1, CL2 take the first state, torques of the same magnitude are transmitted from the motor MOT to the left and right rear wheels LWr, RWr in the same direction in the front-rear direction, whereby a desired left-right driving force sum is generated from the rear wheel driving system 20 while no left-right driving force difference is generated therefrom, this enabling a four-wheel drive (4WD).

In the second state in which the first clutch CL1 is released while the second clutch CL2 is applied, the second output gear 85 is connected to the output shaft 21 of the motor MOT, whereby a power transmission path between the output shaft 21 and the sun gears S1, S2 of the first and second planetary gear mechanisms PL1, PL2 becomes a connected state. When the first and second clutches CL1, CL2 take the second state, torques of the same magnitude are transmitted from the motor MOT to the left and right rear wheels LWr, RWr in opposite directions in the front-rear direction, whereby a desired left-right driving force difference is generated from the rear wheel driving system 20 while no left-right driving force sum is generated therefrom, this enabling a torque vectoring drive (TV).

In the rear wheel driving system 20 that is configured in the way described heretofore, since the first and second planetary gear mechanisms PL1, PL2 are configured in the way described above, the sun gear S1, the carrier C1 and the ring gear R1 can transmit power to one another, and rotation speeds thereof are in a collinear relationship. Then, the sun gear S2, the carrier C2 and the ring gear R2 can transmit power to one another, and rotation speeds thereof are in a collinear relationship.

Since the ring gear R1 and the ring gear R2 are connected so as to rotate integrally, rotation speeds of the ring gear R1 and the ring gear R2 become equal to each other. The two sun gears S1, S2 of the first and second planetary gear mechanisms PL1, PL2 operate so as to rotate in opposite directions to each other at the same rotation speed as a result of the sun gears S1, S2 being connected together through the odd number of times of meshing. This means that to describe using a collinear chart in FIG. 15B, the rotation speeds of the two sun gears S1, S2 are controlled under a relationship in which an imaginary line L1 that connects the two sun gears S1, S2 rotate on a point of intersection where the imaginary line L1 intersects a zero rotation line L2 as a fulcrum O.

Figure 15B:
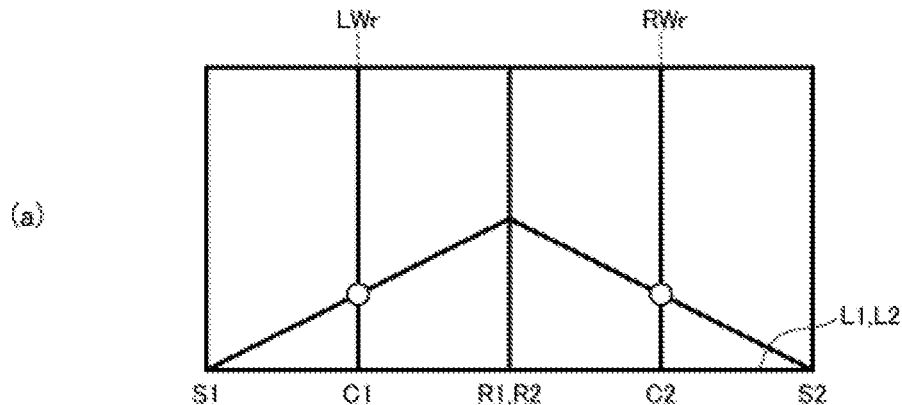
FIG. 15B shows collinear charts of the rear wheel driving system of the second embodiment.
Figure 15B:
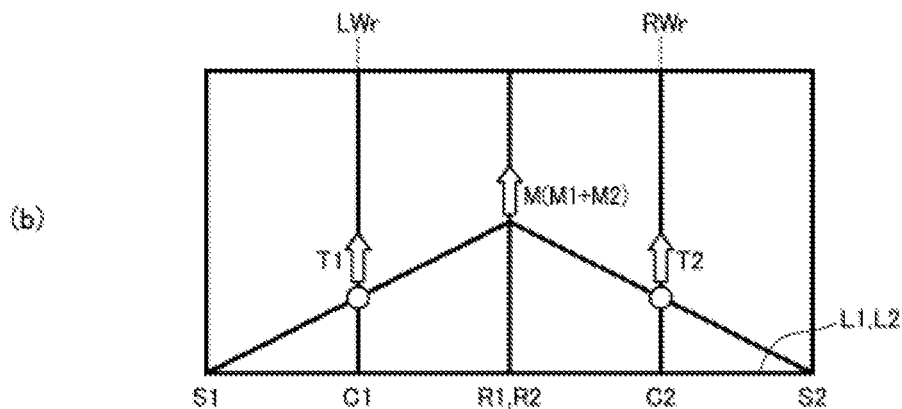
Figure 15B:
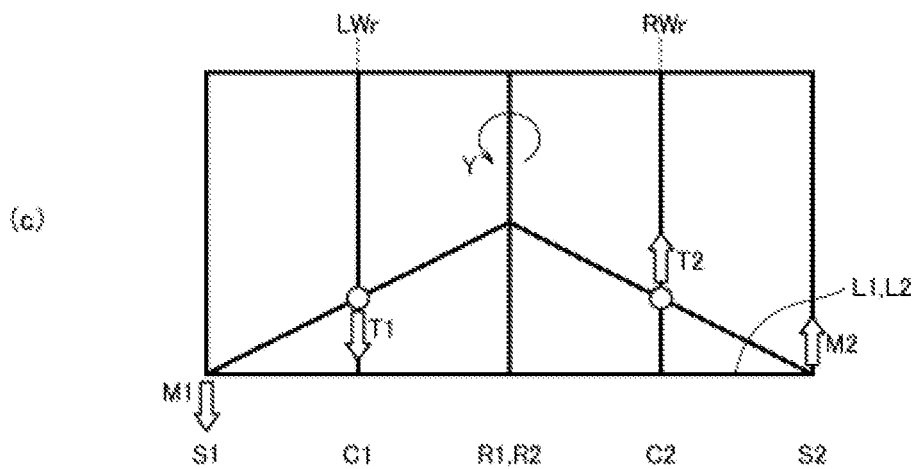

FIG. 15B(a) is a collinear chart of when the rear wheel driving system 20 of the second embodiment operates in such a way that the wheeled vehicle V travels straight ahead by front-wheel drive (FWD). FIG. 15B(b) is a collinear chart of when the rear wheel driving system 20 of the second embodiment operates in such a way that the wheeled vehicle V travels straight ahead by four-wheel drive (4WD), and arrows in the collinear chart indicate torques acting on the elements. FIG. 15B(c) is a collinear chart of when the rear wheel driving system 20 of the second embodiment operates in such a way that the wheeled vehicle V travels straight ahead by torque vectoring drive (TV), and arrows in the collinear chart indicate torques acting on the elements. In this embodiment and embodiments that will be described later, the illustration of collinear charts of when the wheeled vehicle V turns with a difference in rotation speed between the left and right rear wheels LWr, RWr will be omitted.

As shown in FIG. 15B(a), when the wheeled vehicle V is running by front-wheel drive (FWD) with both the first and second clutches CL1, CL2 left released, a power transmission path between the motor MOT and the first and second planetary gear mechanisms PL1, PL2 becomes a disconnected state, and hence, no torque is transmitted from the motor MOT to the left and right rear wheels LWr, RWr, whereby neither a left-right driving force sum nor a left-right driving force difference is generated from the rear wheel driving system 20.

As shown in FIG. 15B(b), when the wheeled vehicle V is running by four-wheel drive (4WD) with the first and second clutches CL1, CL2 put in the first state, a power transmission path between the motor MOT and the ring gears R1, R2 of the first and second planetary gear mechanisms PL1, PL2 becomes a connected state via the third output gear 87, whereby forward motor torque M is inputted from the motor MOT into the ring gears R1, R2. In normal first and second planetary gear mechanisms PL1, PL2, in the event that forward torque is inputted into ring gears R1, R2, torque attempting to increase rotation speeds is transmitted to sun gears S1, S2 and carriers C1, C2. However, in the first and second planetary gear mechanisms PL1, PL2 of this embodiment, as has been described above, the sun gears S1, S2 are controlled so as to rotate only in the opposite directions to each other at the same rotation speed, and therefore, with the sun gears S1, S2 acting as fulcrums, the forward motor torque M that is inputted into the ring gears R1, R2 that act as points of application of force is transmitted to the carriers C1, C2 that act as points of action as forward left and right rear wheel torques T1, T2 that result from multiplying motor torques M1, M2 by the gear ratios of the first and second planetary gear mechanisms PL1, PL2. Since the gear ratios of the first and second planetary gear mechanisms PL1, PL2 are equal, the left and right rear wheel torques T1, T2 become torques having equal absolute values and acting in the same direction, and this generates a left-right driving force sum that corresponds to a sum of the left and right rear wheel torques T1, T2 (T1+T2), whereby a forward driving force is given to the wheeled vehicle V stably. A difference between the left and right rear wheel torques T1, T2 (T1−T2) becomes zero, and with the first and second clutch CL1, CL2 staying in the first state, there is no such situation that a left-right driving force difference is generated from the rear wheel driving system 20 due to the generation of torque of the motor MOT, whereby no yaw moment is given to the wheeled vehicle V.

As shown in FIG. 15B(c), when the wheeled vehicle V is running by torque vectoring drive (TV) with the first and second clutches CL1, CL2 put in the second state, a power transmission path between the motor MOT and the sun gears S1, S2 of the first and second planetary gear mechanisms PL1, PL2 becomes a connected state, whereby the motor torques M1, M2 having equal absolute values and acting in the opposite directions are inputted from the motor MOT into the sun gears S1, S2. Since in the ring gears R1, R2, motor torque distribution forces cancel (offset) each other, the left and right rear wheel torques T1, T2 having equal absolute values and acting in the opposite directions are generated in the carriers C1, C2, whereby a left-right driving force difference corresponding a difference (T1−T2) between the left and right rear wheels torques T1, T2 is generated, and a counterclockwise yaw moment Y is given to the wheeled vehicle V in a stable fashion. With the sum of the left and right rear wheel torques T1, T2 (T1+T2) becomes zero and the first and second clutches CL1, CL2 staying in the second state, a left-right driving force sum is not generated from the rear wheel driving system 20 by the generation of torque of the motor MOT, and no front-rear torque is given to the wheeled vehicle V.

Thus, with this embodiment, too, as has been described heretofore, the output shaft 21 of the motor MOT is connected to the sun gears S1, S2 of the first and second planetary gear mechanisms PL1, PL2 and the ring gears R1, R2 of the first and second planetary gear mechanisms PL1, PL2 so as to switch therebetween selectively. Thus, with the single motor MOT, it becomes possible to output the front-rear torques acting in the same direction to the left and right rear wheels LWr, RWr or to output the torques acting in opposite directions to the left rear wheel LWr and the right rear wheel RWr without generating the front-rear torque. Further, the torque of the motor MOT is inputted to the different rotating elements of the first and second planetary gear mechanisms PL1, PL2 between when the front-rear torques acting in the same direction are outputted to the left and right rear wheels LWr, RWr and when the torques acting in the opposite directions are outputted to the left rear wheel LWr and the right rear wheel RWr without outputting the front-rear torque. Thus, by changing the gear ratios of the sun gears S1, S2, the ring gears R1, R2 and the carriers C1, C2, torque differences in magnitude can be induced in the front-rear assist and the turning assist.

Third Embodiment

Figure 16A:
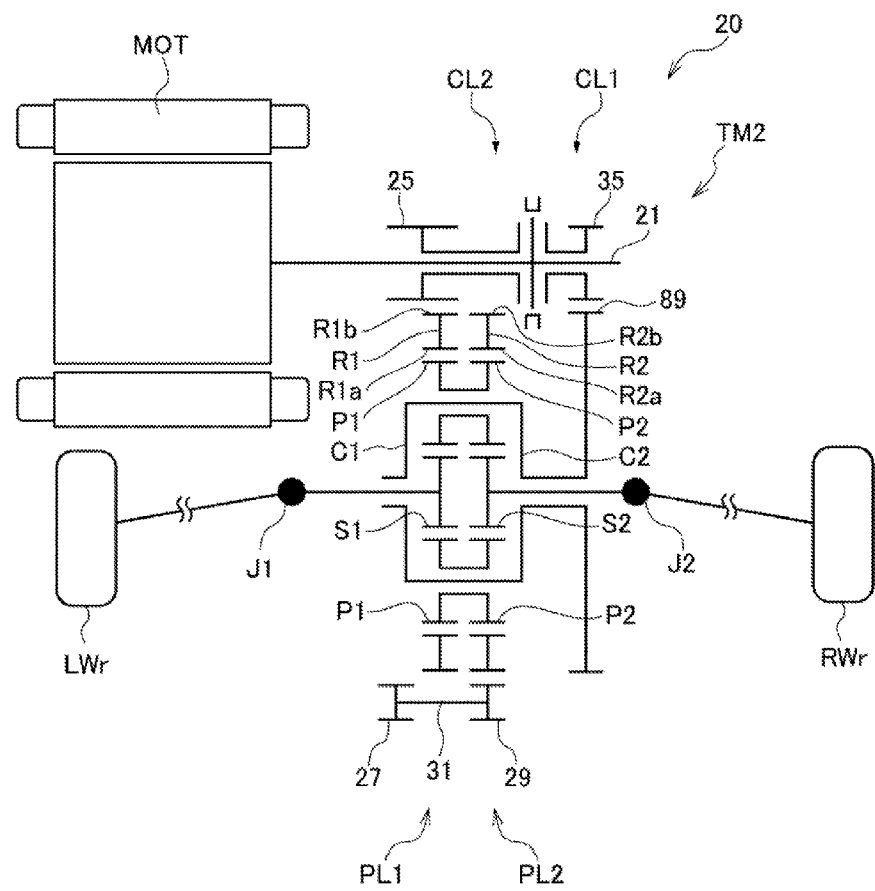
FIG. 16A is a skeleton diagram of a rear wheel driving system of a third embodiment.

Next, referring to FIG. 16A, a rear wheel driving system 20 of a third embodiment will be described.

In this embodiment, a power transmission mechanism TM2 includes first and second clutches CL1, CL2 and two planetary gear mechanisms, which are first and second planetary gear mechanisms PL1, PL2. The first and second planetary gear mechanisms PL1, PL2 are each made up of a so-called single pinion planetary gear mechanism and include, respectively, sun gears S1, S2, ring gears R1, R2 and carriers C1, C2 which support pinions P1, P2 which mesh, respectively, with the sun gears S1, S2 and the ring gears R1, R2 in such a way that the pinions P1, P2 rotate on their own axes and revolve or walk around the sun gears S1, S2. Then, in this embodiment, the carriers C1, C2 of the first and second planetary gear mechanisms PL1, PL2 make up first rotating elements of first and second differential mechanisms, the sun gears S1, S2 of the first and second planetary gear mechanisms PL1, PL2 make up second rotating elements of the first and second differential mechanisms, and the ring gears R1, R2 of the first and second planetary gear mechanisms PL1, PL2 make up third rotating elements of the first and second differential mechanisms. The carriers C1, C2 of the first and second planetary gear mechanisms PL1, PL2 are connected to each other so as to rotate integrally and have a common second input gear 89. This second input gear 89 meshes with a hollow second output gear 35 that surrounds an outer circumference of an output shaft 21 of a motor MOT. The second output gear 35 is provided on the output shaft 21 of the motor MOT so as to rotate relatively thereto and is configured so as to rotate integrally with or relative to the output shaft 21 through switching by the first clutch CL1. In addition, the sun gears S1, S2 are connected to the left and right rear wheels LWr, RWr via joints J1, J2, respectively.

In the ring gear R1 of the first planetary gear mechanism PL, external teeth R1b that are formed integrally with internal teeth R1a that are formed on an inner circumferential surface so as to mesh with the pinions P1 meshes with a hollow first output gear 25 that surrounds an outer circumference of the output shaft 21 of the motor MOT. In the ring gear R2 of the second planetary gear mechanism PL2, external teeth R2b that are formed integrally with internal teeth R2a that are formed on an inner circumferential surface so as to mesh with the pinions P2 meshes with a first input gear 29 that is provided on an idle shaft 31 of an idle gear 27 that meshes with the first output gear 25 so as to rotate integrally.

Namely, the ring gears R1, R2 of the first and second planetary gear mechanisms PL1, PL2 are connected together through three times of meshing including the meshing of the external teeth R1b of the ring gear R1 with the first output gear 25, the meshing of the first output gear 25 with the idle gear 27, and the meshing of the first input gear 29 with the external teeth R2b of the ring gear R2. The two ring gears R1, R2 operate so as to rotate in opposite directions to each other as a result of the ring gears R1, R2 of the first and second planetary gear mechanisms PL1, PL2 being connected together through the odd number of times of meshing in the way described above.

Additionally, a gear ratio resulting from the meshing of the external teeth R1b of the ring gear R1 with the first output gear 25 and a gear ratio resulting from the meshing of the first output gear 25 with the idle gear 27 and the meshing of the first input gear 29 with the external teeth R2b of the ring gear R2 are set so that absolute values thereof become equal to each other. Consequently, torque of a motor MOT is always transmitted to the ring gears R1, R2 as torques having the equal absolute values and acting in the opposite directions.

A second output gear 35 provided on the output shaft 21 of the motor MOT and the first output gear 25 are disposed so as not only to rotate relatively but also to face each other in the axial direction. The second output gear 35 and the first output gear 25 are made to rotate integrally with or rotate relatively to the output shaft 21 through switching by the first and second clutches CL1, CL2. Namely, when applied or released, the first clutch CL1 connects or disconnects a power transmission between the output shaft 21 of the motor MOT and the second output gear 35. When applied or released, the second clutch CL2 connects or disconnects a power transmission between the output shaft 21 of the motor MOT and the first output gear 25. The first and second clutches CL1, CL2 are each made up of a synchromesh mechanism that can be switched over by a common actuator and can be switched over on the same rotation axis, that is, the same rotation axis as the output shaft 21 of the motor MOT.

The first and second clutches CL1, CL2 are allowed to take selectively one of a state in which the first and second clutches CL1, CL2 are both released, a first state in which the first clutch CL1 is applied while the second clutch CL2 is released, and a second state in which the first clutch CL1 is released while the second clutch CL2 is applied.

In the state in which both the first and second clutches CL1, CL2 are released, the first output gear 25 and the second output gear 35 are not brought into connection with the output shaft 21, whereby a power transmission path between the output shaft 21 of the motor MOT and the first and second planetary gear mechanisms PL1, PL2 becomes a disconnected state. When the first and second clutches CL1, CL2 take the state in which the clutches CL1, CL2 are both released, no torque is transmitted from the motor MOT to the left and right rear wheels LWr, RWr, whereby neither a left-right driving force sum nor a left-right driving force difference is generated from the rear wheel driving system 20, this enabling a front-wheel drive (FWD).

In the first state in which the first clutch CL1 is applied while the second clutch CL2 is released, the second output gear 35 is connected to the output shaft 21 of the motor MOT, whereby a power transmission path between the output shaft 21 and the carriers C1, C2 of the first and second planetary gear mechanisms PL1, PL2 becomes a connected state. When the first and second clutches CL1, CL2 take the first state, torques of the same magnitude are transmitted from the motor MOT to the left and right rear wheels LWr, RWr in the same direction in the front-rear direction, whereby a desired left-right driving force sum is generated from the rear wheel driving system 20 while no left-right driving force difference is generated therefrom, this enabling a four-wheel drive (4WD).

In the second state in which the first clutch CL1 is released while the second clutch CL2 is applied, the first output gear 25 is connected to the output shaft 21 of the motor MOT, whereby a power transmission path between the output shaft 21 and the ring gears R1, R2 of the first and second planetary gear mechanisms PL1, PL2 becomes a connected state via the first output gear 25, the idle gear 27 and the first input gear 29. When the first and second clutches CL1, CL2 take the second state, torques of the same magnitude are transmitted from the motor MOT to the left and right rear wheels LWr, RWr in opposite directions in the front-rear direction, whereby a desired left-right driving force difference is generated from the rear wheel driving system 20 while no left-right driving force sum is generated therefrom, this enabling a torque vectoring drive (TV).

In the rear wheel driving system 20 that is configured in the way described heretofore, since the first and second planetary gear mechanisms PL1, PL2 are configured in the way described above, the sun gear S1, the carrier C1 and the ring gear R1 can transmit power to one another, and rotation speeds thereof are in a collinear relationship. Then, the sun gear S2, the carrier C2 and the ring gear R2 can transmit power to one another, and rotation speeds thereof are in a collinear relationship.

Additionally, since the carrier C1 and the carrier C2 are connected so as to rotate integrally, rotation speeds of the carrier C1 and the carrier C2 become equal to each other. Further, the two ring gears R1, R2 operate so as to rotate in the opposite directions to each other at the same rotation speed as a result of the ring gears R1, R2 of the first and second planetary gear mechanisms PL1, PL2 being connected together through the odd number of times of meshing. This means that to describe using a collinear chart in FIG. 16B, the rotation speeds of the two ring gears R1, R2 are controlled under a relationship in which an imaginary line L1 that connects the two ring gears R1, R2 rotate on a point of intersection where the imaginary line L1 intersects a zero rotation line L2 as a fulcrum O.

Figure 16B:
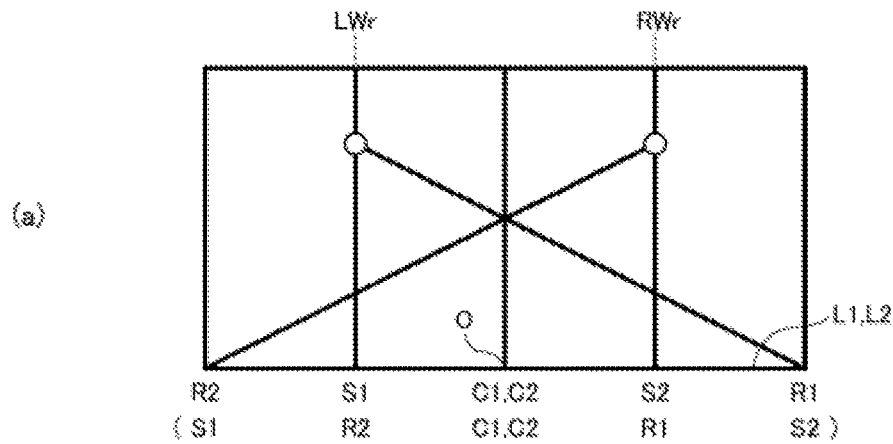
FIG. 16B shows collinear charts of the rear wheel driving system of the third embodiment.
Figure 16B:
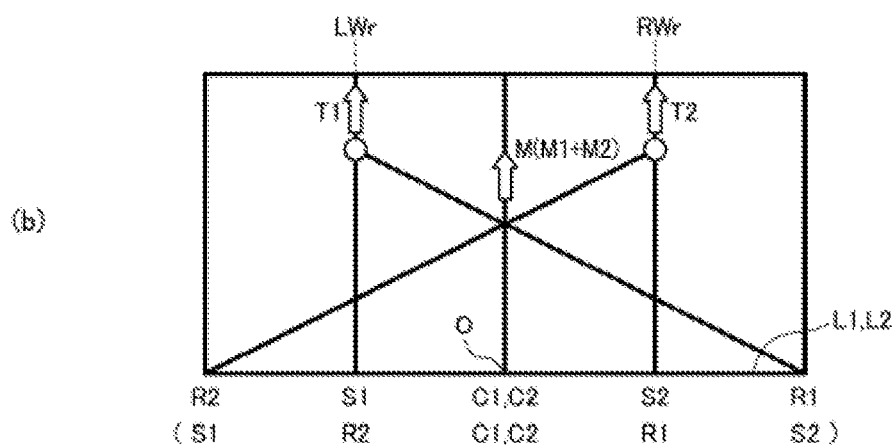
Figure 16B:
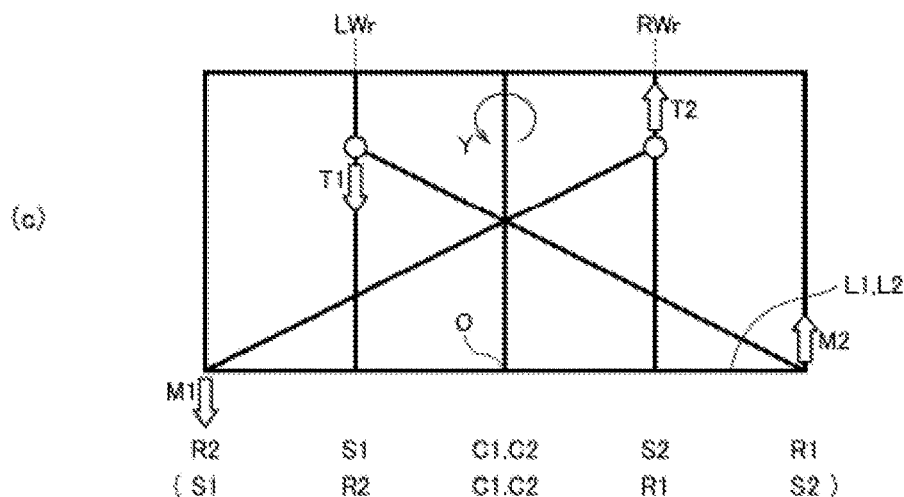

FIG. 16B(a) is a collinear chart of when the rear wheel driving system 20 of the third embodiment operates in such a way that the wheeled vehicle V travels straight ahead by front-wheel drive (FWD). FIG. 16B(b) is a collinear chart of when the rear wheel driving system 20 of the third embodiment operates in such a way that the wheeled vehicle V travels straight ahead by four-wheel drive (4WD), and arrows in the collinear chart indicate torques acting on the elements. FIG. 16B(c) is a collinear chart of when the rear wheel driving system 20 of the third embodiment operates in such a way that the wheeled vehicle V travels straight ahead by torque vectoring drive (TV), and arrows in the collinear chart indicate torques acting on the elements.

As shown in FIG. 16B(a), when the wheeled vehicle V is running by front-wheel drive (FWD) with both the first and second clutches CL1, CL2 left released, a power transmission path between the motor MOT and the first and second planetary gear mechanisms PL1, PL2 becomes a disconnected state, and hence, no torque is transmitted from the motor MOT to the left and right rear wheels LWr, RWr, whereby neither a left-right driving force sum nor a left-right driving force difference is generated from the rear wheel driving system 20.

As shown in FIG. 16B(b), when the wheeled vehicle V is running by four-wheel drive (4WD) with the first and second clutches CL1, CL2 put in the first state, a power transmission path between the motor MOT and the carriers C1, C2 of the first and second planetary gear mechanisms PL1, PL2 becomes a connected state via the second output gear 35 and the second input gear 89, whereby forward motor torque M is inputted from the motor MOT into the carriers C1, C2. In normal first and second planetary gear mechanisms PL1, PL2, in the event that forward torque is inputted into carriers C1, C2, torque attempting to increase rotation speeds is transmitted to sun gears S1, S2 and ring gears R1, R2.

However, in the first and second planetary gear mechanisms PL1, PL2 of this embodiment, as has been described above, the ring gears R1, R2 are controlled so as to rotate only in the opposite directions to each other at the same rotation speed, and therefore, with the ring gears R1, R2 acting as fulcrums, the forward motor torque M that is inputted into the carriers C1, C2 that act as points of application of force is transmitted to the sun gears S1, S2 that act as points of action as forward left and right rear wheel torques T1, T2 that result from multiplying motor torques M1, M2 by the gear ratios of the first and second planetary gear mechanisms PL1, PL2. Since the gear ratios of the first and second planetary gear mechanisms PL1, PL2 are equal, the left and right rear wheel torques T1, T2 become torques having equal absolute values and acting in the same direction, and this generates a left-right driving force sum that corresponds to a sum of the left and right rear wheel torques T1, T2 (T1+T2), whereby a forward driving force is given to the wheeled vehicle V stably. A difference between the left and right rear wheel torques T1, T2 (T1−T2) becomes zero, and with the first and second clutch CL1, CL2 staying in the first state, there is no such situation that a left-right driving force difference is generated from the rear wheel driving system 20 due to the generation of torque of the motor MOT, whereby no yaw moment is given to the wheeled vehicle.

As shown in FIG. 16B(c), when the wheeled vehicle V is running by torque vectoring drive (TV) with the first and second clutches CL1, CL2 put in the second state, a power transmission path between the motor MOT and the ring gears R1, R2 of the first and second planetary gear mechanisms PL1, PL2 becomes a connected state, whereby the motor torques M1, M2 having equal absolute values and acting in the opposite directions are inputted from the motor MOT into the ring gears R1, R2. Since in the carriers C1, C2, motor torque distribution forces cancel (offset) each other, the left and right rear wheel torques T1, T2 having equal absolute values and acting in the opposite directions are generated in the sun gears S1, S2, whereby a left-right driving force difference corresponding a difference (T1−T2) between the left and right rear wheels torques T1, T2 is generated, and a counterclockwise yaw moment Y is given to the wheeled vehicle V in a stable fashion. With the sum of the left and right rear wheel torques T1, T2 (T1+T2) becomes zero and the first and second clutches CL1, CL2 staying in the second state, a left-right driving force sum is not generated from the rear wheel driving system 20 by the generation of torque of the motor MOT, and no front-rear torque is given to the wheeled vehicle V.

Thus, with this embodiment, as has been described heretofore, the output shaft 21 of the motor MOT is connected to the carriers C1, C2 of the first and second planetary gear mechanisms PL1, PL2 and the ring gears R1, R2 of the first and second planetary gear mechanisms PL1, PL2 so as to switch therebetween selectively. Thus, with the single motor MOT, it becomes possible to output the front-rear torques acting in the same direction to the left and right rear wheels LWr, RWr or to output the torques acting in opposite directions to the left rear wheel LWr and the right rear wheel RWr without generating the front-rear torque. Further, the torque of the motor MOT is inputted to the different rotating elements of the first and second planetary gear mechanisms PL1, PL2 between when the front-rear torques acting in the same direction are outputted to the left and right rear wheels LWr, RWr and when the torques acting in the opposite directions are outputted to the left rear wheel LWr and the right rear wheel RWr without outputting the front-rear torque. Thus, by changing the gear ratios of the sun gears S1, S2, the ring gears R1, R2 and the carriers C1, C2, torque differences in magnitude can be induced in the front-rear assist and the turning assist.

Fourth Embodiment

Figure 17:
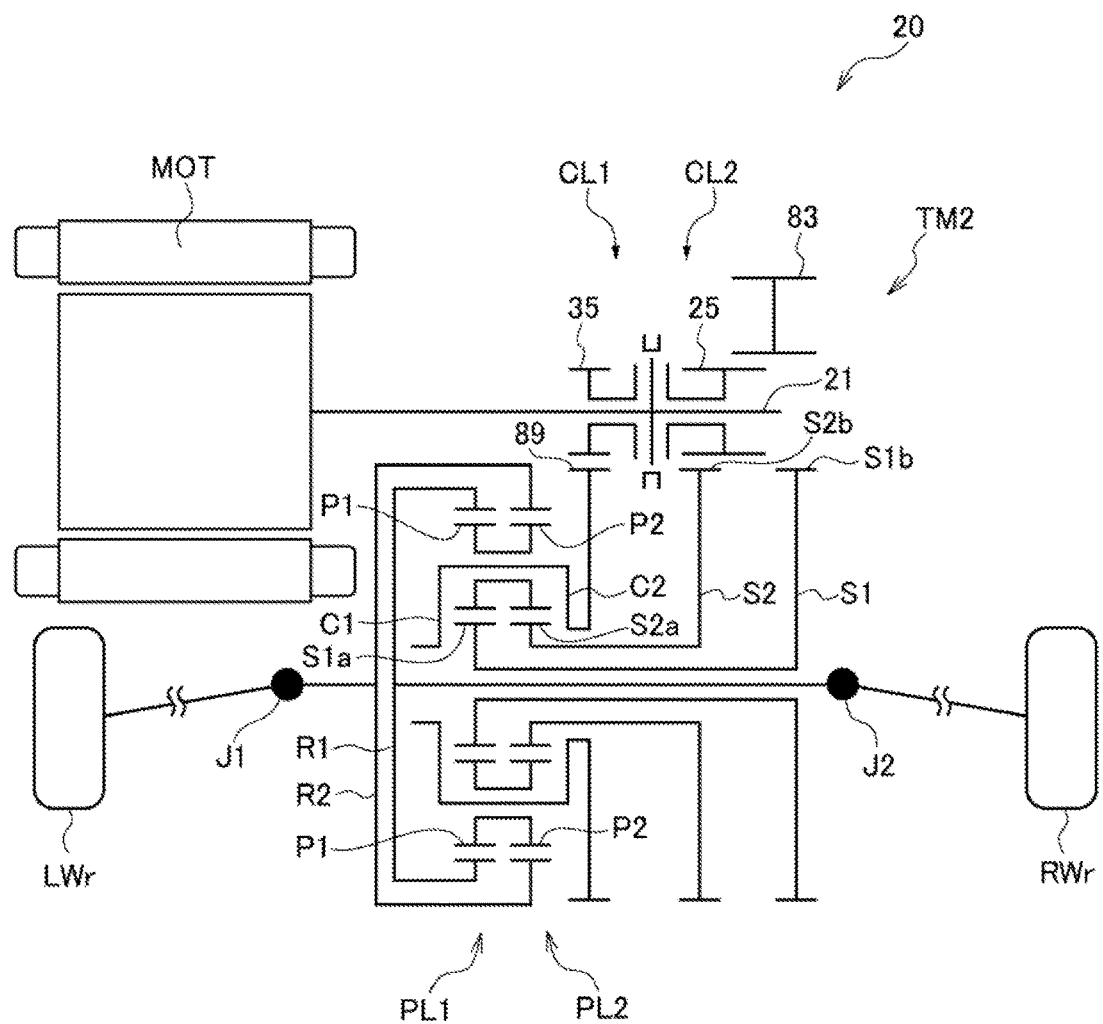
FIG. 17 is a skeleton diagram of a rear wheel driving system of a fourth embodiment.

Next, referring to FIG. 17, a rear wheel driving system 20 of a fourth embodiment will be described.

In this embodiment, a power transmission mechanism TM2 includes first and second clutches CL1, CL2 and two planetary gear mechanisms, which are first and second planetary gear mechanisms PL1, PL2. The first and second planetary gear mechanisms PL1, PL2 are each made up of a so-called single pinion planetary gear mechanism and include, respectively, sun gears S1, S2, ring gears R1, R2 and carriers C1, C2 which support pinions P1, P2 which mesh, respectively, with the sun gears S1, S2 and the ring gears R1, R2 in such a way that the pinions P1, P2 rotate on their own axes and revolve or walk around the sun gears S1, S2. Then, in this embodiment, the carriers C1, C2 of the first and second planetary gear mechanisms PL1, PL2 make up first rotating elements of first and second differential mechanisms, the ring gears R1, R2 of the first and second planetary gear mechanisms PL1, PL2 make up second rotating elements of the first and second differential mechanisms, and the sun gears S1, S2 of the first and second planetary gear mechanisms PL1, PL2 make up third rotating elements of the first and second differential mechanisms. The carriers C1, C2 of the first and second planetary gear mechanisms PL1, PL2 are connected to each other so as to rotate integrally and have a common second input gear 89. This second input gear 89 meshes with a hollow second output gear 35 that surrounds an outer circumference of an output shaft 21 of a motor MOT. The second output gear 35 is provided on the output shaft 21 of the motor MOT so as to rotate relatively thereto and is configured so as to rotate integrally with or relative to the output shaft 21 through switching by the first clutch CL1. In addition, the ring gears R2, R1 are connected to left and right rear wheels LWr, RWr via joints J1, J2, respectively.

In the sun gear S1 of the first planetary gear mechanism PL1, large-diameter external teeth S1$b$ that are formed integrally with small-diameter external teeth S1$a$ that are formed on an outer circumferential surface thereof so as to mesh with the pinions P1 meshes with an idle gear 83 that meshes with a hollow first output gear 25 that surrounds an outer circumference of the output shaft 21 of the motor MOT. In the sun gear S2 of the second planetary gear mechanism PL2, large-diameter external teeth S2$b$ that are formed integrally with small-diameter external teeth S2$a$ that are formed on an outer circumferential surface thereof so as to mesh with the pinions P2 meshes with the first output gear 25. The first output gear 25 is provided on the output shaft 21 of the motor MOT so as to rotate relatively thereto and is configured so as to rotate integrally with or relative to the output shaft 21 through switching by the second clutch CL2.

Namely, the sun gears S1, S2 of the first and second planetary gear mechanisms PL1, PL2 are connected together through three times of meshing including the meshing of the large-diameter external teeth S1$b$ with the idle gear 83, the meshing of the idle gear 83 with the first output gear 25, and the meshing of the first output gear 25 with the large-diameter external teeth S2$b$ of the sun gear S2. The two sun gears S1, S2 of the first and second planetary gear mechanisms PL1, PL2 operate so as to rotate in opposite directions to each other as a result of the sun gears S1, S2 being connected together through the odd number of times of meshing in the way described above.

Additionally, a gear ratio resulting from the meshing of the large-diameter external teeth S1$b$ of the sun gear S1 with the idle gear 83 and the meshing of the idle gear 83 with the first output gear 25 and a gear ratio resulting from the meshing of the large-diameter external teeth S2$b$ of the sun gear S2 with the first output gear 25 are set so that absolute values thereof become equal to each other. Consequently, the torque of the motor MOT is always transmitted to the sun gears S1, S2 as torques having the equal absolute values and acting in the opposite directions.

A second output gear 35 provided on the output shaft 21 of the motor MOT and the first output gear 25 are disposed so as not only to rotate relatively but also to face each other in the axial direction. The second output gear 35 and the first output gear 25 are made to rotate integrally with or rotate relatively to the output shaft 21 through switching by the first and second clutches CL1, CL2. Namely, when applied or released, the first clutch CL1 connects or disconnects a power transmission between the output shaft 21 of the motor MOT and the second output gear 35. When applied or released, the second clutch CL2 connects or disconnects a power transmission between the output shaft 21 of the motor MOT and the first output gear 25. The first and second clutches CL1, CL2 are each made up of a synchromesh mechanism that can be switched over by a common actuator and can be switched over on the same rotation axis, that is, the same rotation axis as the output shaft 21.

The first and second clutches CL1, CL2 are allowed to take selectively one of a state in which the first and second clutches CL1, CL2 are both released, a first state in which the first clutch CL1 is applied while the second clutch CL2 is released, and a second state in which the first clutch CL1 is released while the second clutch CL2 is applied.

In the state in which both the first and second clutches CL1, CL2 are released, the first output gear 25 and the second output gear 35 are not brought into connection with the output shaft 21, whereby a power transmission path between the output shaft 21 of the motor MOT and the first and second planetary gear mechanisms PL1, PL2 becomes a disconnected state. When the first and second clutches CL1, CL2 take the state in which the clutches CL1, CL2 are both released, no torque is transmitted from the motor MOT to the left and right rear wheels LWr, RWr, whereby neither a left-right driving force sum nor a left-right driving force difference is generated from the rear wheel driving system 20, this enabling a front-wheel drive (FWD).

In the first state in which the first clutch CL1 is applied while the second clutch CL2 is released, the second output gear 35 is connected to the output shaft 21 of the motor MOT, whereby a power transmission path between the output shaft 21 and the carriers C1, C2 of the first and second planetary gear mechanisms PL1, PL2 becomes a connected state. When the first and second clutches CL1, CL2 take the first state, torques of the same magnitude are transmitted from the motor MOT to the left and right rear wheels LWr, RWr in the same direction in the front-rear direction, whereby a desired left-right driving force sum is generated from the rear wheel driving system 20 while no left-right driving force difference is generated therefrom, this enabling a four-wheel drive (4WD).

In the second state in which the first clutch CL1 is released while the second clutch CL2 is applied, the first output gear 25 is connected to the output shaft 21, whereby a power transmission path between the output shaft 21 of the motor MOT and the sun gears S1, S2 of the first and second planetary gear mechanisms PL1, PL2 becomes a connected state by way of the first output gear 25 and the idle gear 83. When the first and second clutches CL1, CL2 take the second state, torques of the same magnitude are transmitted from the motor MOT to the left and right rear wheels LWr, RWr in opposite directions in the front-rear direction, whereby a desired left-right driving force difference is generated from the rear wheel driving system 20 while no left-right driving force sum is generated therefrom, this enabling a torque vectoring drive (TV).

A collinear chart of the rear wheel driving system 20 of this embodiment is represented by replacing the ring gears R1, R2 with the sun gears S1, S2, respectively, and sun gears S1, S2 with the ring gears R1, R2, respectively, in FIG. 16B. The other functions and advantages of this embodiment are similar to those of the rear wheel driving system 20 of the third embodiment.

Thus, according to this embodiment, as has been described heretofore, the output shaft 21 of the motor MOT is connected to the carriers C1, C2 of the first and second planetary gear mechanisms PL1, PL2 and the sun gears S1, S2 of the first and second planetary gear mechanisms PL1, PL2 so as to switch therebetween selectively. Thus, with the single motor MOT, it becomes possible to output the front-rear torques acting in the same direction to the left and right rear wheels LWr, RWr or to output the torques acting in opposite directions to the left rear wheel LWr and the right rear wheel RWr without generating the front-rear torque. Further, the torque of the motor MOT is inputted to the different rotating elements of the first and second planetary gear mechanisms PL1, PL2 between when the front-rear torques acting in the same direction are outputted to the left and right rear wheels LWr, RWr and when the torques acting in the opposite directions are outputted to the left rear wheel LWr and the right rear wheel RWr without outputting the front-rear torque. Thus, by changing the gear ratios of the sun gears S1, S2, the ring gears R1, R2 and the carriers C1, C2, torque differences in magnitude can be induced in the front-rear assist and the turning assist.

Fifth Embodiment

Figure 18A:
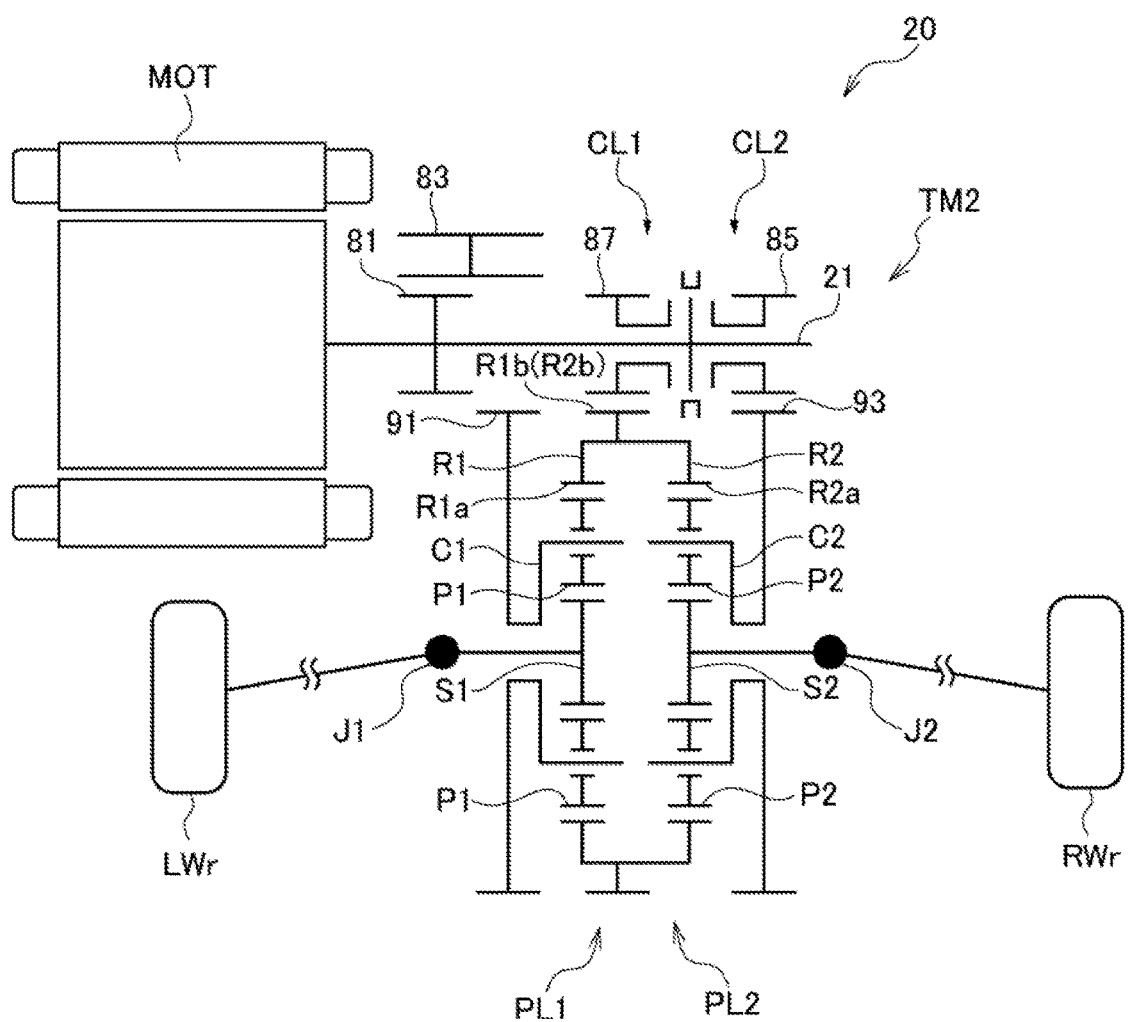
FIG. 18A is a skeleton diagram of a rear wheel driving system of a fifth embodiment.

Next, referring to FIG. 18A, a rear wheel driving system 20 of a fifth embodiment will be described.

In this embodiment, a power transmission mechanism TM2 includes first and second clutches CL1, CL2 and two planetary gear mechanisms, which are first and second planetary gear mechanisms PL1, PL2. The first and second planetary gear mechanisms PL1, PL2 are each made up of a so-called single pinion planetary gear mechanism and include, respectively, sun gears S1, S2, ring gears R1, R2 and carriers C1, C2 which support pinions P1, P2 which mesh, respectively, with the sun gears S1, S2 and the ring gears R1, R2 in such a way that the pinions P1, P2 rotate on their own axes and revolve or walk around the sun gears S1, S2. Then, in this embodiment, the ring gears R1, R2 of the first and second planetary gear mechanisms PL1, PL2 make up first rotating elements of first and second differential mechanisms, the sun gears S1, S2 of the first and second planetary gear mechanisms PL1, PL2 make up second rotating elements of the first and second differential mechanisms, and the carriers C1, C2 of the first and second planetary gear mechanisms PL1, PL2 make up third rotating elements of the first and second differential mechanisms. The ring gears R1, R2 of the first and second planetary gear mechanisms PL1, PL2 are connected to each other so as to rotate integrally and have common external teeth R1$b$ (R2$b$), and these external teeth R1$b$ (R2$b$) mesh with a hollow third output gear 87 that surrounds an outer circumference of an output shaft 21 of a motor MOT. The third output gear 87 is provided on the output shaft 21 of the motor MOT so as to rotate relatively thereto and is configured so as to rotate integrally with or relative to the output shaft 21 through switching by the first clutch CL1. In addition, the sun gears S1, S2 are connected to left and right rear wheels LWr, RWr via joints J1, J2, respectively.

In the carrier C1 of the first planetary gear mechanism PL1, a first input gear 91 that is formed integrally meshes with an idle gear 83 that meshes with a first output gear 81 that is provided so as to rotate integrally with the output shaft 21. In the carrier C2 of the second planetary gear mechanism PL2, a second input gear 93 that is formed integrally meshes with a hollow second output gear 85 that surrounds an outer circumference of the output shaft 21 of the motor MOT. The second output gear 85 is provided on the output shaft 21 of the motor MOT so as to rotate relatively thereto and is configured so as to rotate integrally with or relative to the output shaft 21 through switching by the second clutch CL2.

Namely, the carriers C1, C2 of the first and second planetary gear mechanisms PL1, PL2 are connected together through three times of meshing including the meshing of the first input gear 91 with the idle gear 83, the meshing of the idle gear 83 with the first output gear 81 and the meshing of the second output gear 85 with the second input gear 93. The two carriers C1, C2 of the first and second planetary gear mechanisms PL1, PL2 operate so as to rotate in opposite directions to each other as a result of the carriers C1, C2 being connected together through the odd number of times of meshing in the way described above.

Additionally, a gear ratio resulting from the meshing of the first input gear 91 of the carrier C1 with the idle gear 83 and the meshing of the idle gear 83 with the first output gear 81 and a gear ratio resulting from the meshing of the second input gear 93 of the carrier C2 with the second output gear 85 are set so that absolute values thereof become equal to each other. Consequently, torque of the motor MOT is always transmitted to the carriers C1, C2 as torques having the equal absolute values and acting in the opposite directions.

The third output gear 87 and the second output gear 85 that are provided on the output shaft 21 of the motor MOT are disposed so as not only to rotate relatively but also to face each other in an axial direction. The third output gear 87 and the second output gear 85 are made to rotate integrally or rotate relatively through switching by the first and second clutches CL1, CL2. Namely, the first clutch CL1 connects or disconnects the power transmission between the output shaft 21 of the motor MOT and the third output gear 87 by being applied or released. The second clutch CL2 connects or disconnects the power transmission between the output shaft 21 of the motor MOT and the second output gear 85 by being applied or released. The first and second clutches CL1, CL2 are each made up of a synchromesh mechanism that can be switched over by a common actuator and can be switched over on the same rotation axis, that is, the same rotation axis as the output shaft 21.

The first and second clutches CL1, CL2 are allowed to take selectively one of a state in which the first and second clutches CL1, CL2 are both released, a first state in which the first clutch CL1 is applied while the second clutch CL2 is released, and a second state in which the first clutch CL1 is released while the second clutch CL2 is applied.

In the state in which both the first and second clutches CL1, CL2 are released, the output shaft 21 is not brought into connection with either of the second output gear 85 and the third output gear 87, whereby a power transmission path between the output shaft 21 of the motor MOT and the first and second planetary gear mechanisms PL1, PL2 becomes disconnected state. When the first and second clutches CL1, CL2 take the state in which the clutches CL1, CL2 are both released, no torque is transmitted from the motor MOT to the left and right rear wheels LWr, RWr, whereby neither a left-right driving force sum nor a left-right driving force difference is generated from the rear wheel driving system 20, this enabling a front-wheel drive (FWD).

In the first state in which the first clutch CL1 is applied while the second clutch CL2 is released, the output shaft 21 is connected to the third output gear 87, whereby a power transmission path between the output shaft 21 of the motor MOT and the ring gears R1, R2 of the first and second planetary gear mechanisms PL1, PL2 becomes a connected state. When the first and second clutches CL1, CL2 take the first state, torques of the same magnitude are transmitted from the motor MOT to the left and right rear wheels LWr, RWr in the same direction in the front-rear direction, whereby a desired left-right driving force sum is generated from the rear wheel driving system 20 while no left-right driving force difference is generated therefrom, this enabling a four-wheel drive (4WD).

In the second state in which the first clutch CL1 is released while the second clutch CL2 is applied, the second output gear 85 is connected to the output shaft 21 of the motor MOT, whereby a power transmission path between the output shaft 21 and the carriers C1, C2 of the first and second planetary gear mechanisms PL1, PL2 becomes a connected state. When the first and second clutches CL1, CL2 take the second state, torques of the same magnitude are transmitted from the motor MOT to the left and right rear wheels LWr, RWr in opposite directions in the front-rear direction, whereby a desired left-right driving force difference is generated from the rear wheel driving system 20 while no left-right driving force sum is generated therefrom, this enabling a torque vectoring drive (TV).

In the rear wheel driving system 20 that is configured in the way described heretofore, since the first and second planetary gear mechanisms PL1, PL2 are configured in the way described above, the sun gear S1, the carrier C1 and the ring gear R1 can transmit power to one another, and rotation speeds thereof are in a collinear relationship. Then, the sun gear S2, the carrier C2 and the ring gear R2 can transmit power to one another, and rotation speeds thereof are in a collinear relationship.

Since the ring gear R1 and the ring gear R2 are connected so as to rotate integrally, rotation speeds of the ring gear R1 and the ring gear R2 become equal to each other. The two carriers C1, C2 of the first and second planetary gear mechanisms PL1, PL2 operate so as to rotate in opposite directions to each other at the same rotation speed as a result of the carriers C1, C2 being connected together through the odd number of times of meshing. This means that to describe using a collinear chart in FIG. 18B, the rotation speeds of the two carriers C1, C2 are controlled under a relationship in which an imaginary line L1 that connects the two carriers C1, C2 rotate on a point of intersection where the imaginary line L1 intersects a zero rotation line L2 as a fulcrum O.

Figure 18B:
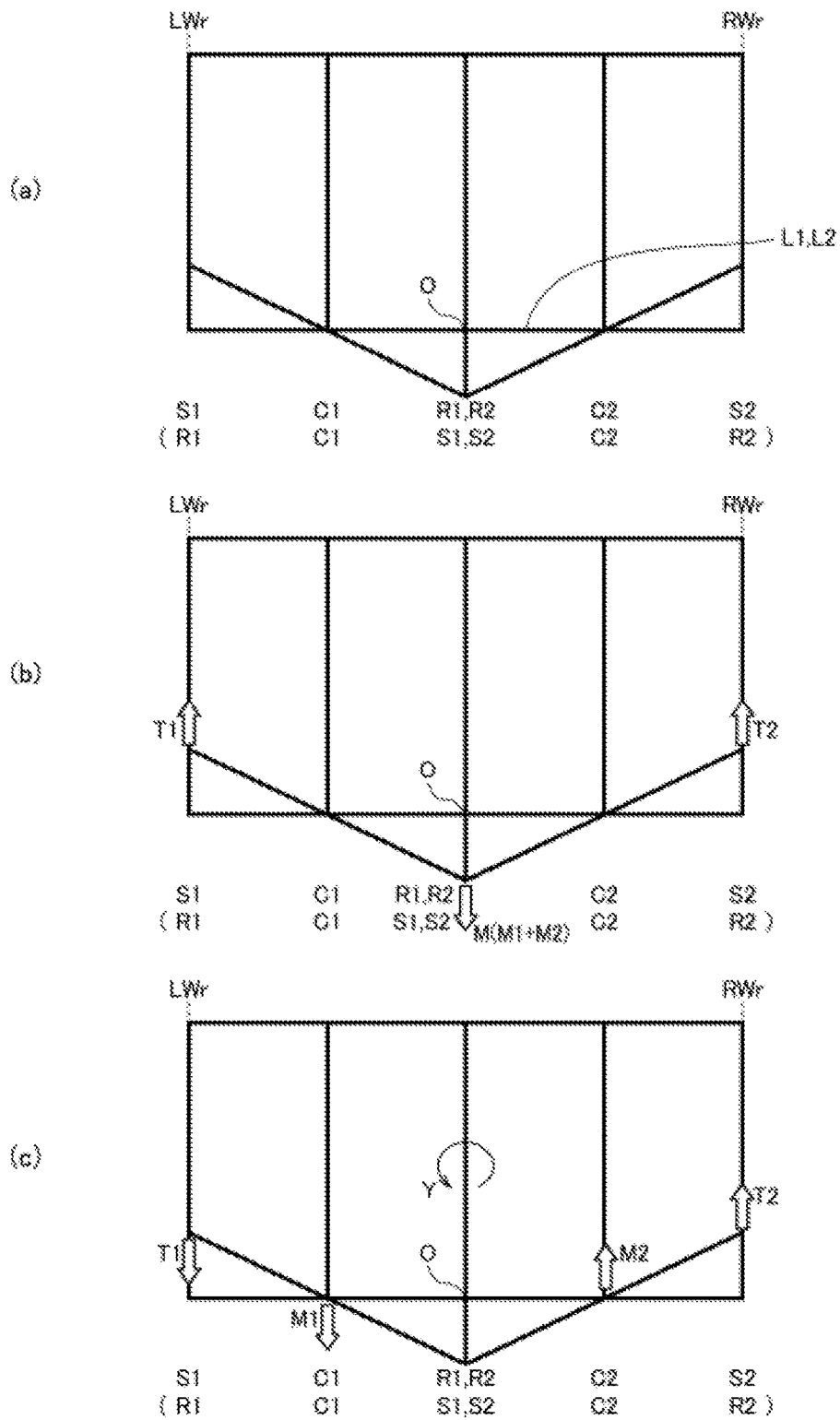
FIG. 18B shows collinear charts of the rear wheel driving system of the fifth embodiment.

FIG. 18B(a) is a collinear chart of when the rear wheel driving system 20 of the fifth embodiment operates in such a way that the wheeled vehicle V travels straight ahead by front-wheel drive (FWD). FIG. 18B(b) is a collinear chart of when the rear wheel driving system 20 of the fifth embodiment operates in such a way that the wheeled vehicle V travels straight ahead by four-wheel drive (4WD), and arrows in the collinear chart indicate torques acting on the elements. FIG. 18B(c) is a collinear chart of when the rear wheel driving system 20 of the fifth embodiment operates in such a way that the wheeled vehicle V travels straight ahead by torque vectoring drive (TV), and arrows in the collinear chart indicate torques acting on the elements.

As shown in FIG. 18B(a), when the wheeled vehicle V is running by front-wheel drive (FWD) with both the first and second clutches CL1, CL2 left released, a power transmission path between the motor MOT and the first and second planetary gear mechanisms PL1, PL2 becomes a disconnected state, and hence, no torque is transmitted from the motor MOT to the left and right rear wheels LWr, RWr, whereby neither a left-right driving force sum nor a left-right driving force difference is generated from the rear wheel driving system 20.

As shown in FIG. 18B(b), when the wheeled vehicle V is running by four-wheel drive (4WD) with the first and second clutches CL1, CL2 put in the first state, a power transmission path between the motor MOT and the ring gears R1, R2 of the first and second planetary gear mechanisms PL1, PL2 becomes a connected state via the third output gear 87, whereby reverse motor torque M is inputted from the motor MOT into the ring gears R1, R2. In normal first and second planetary gear mechanisms PL1, PL2, in the event that reverse torque is inputted into ring gears R1, R2, torque attempting to decrease rotation speeds is transmitted to sun gears S1, S2 and carriers C1, C2. However, in the first and second planetary gear mechanisms PL1, PL2 of this embodiment, as has been described above, the carriers C1, C2 are controlled so as to rotate only in the opposite directions to each other at the same rotation speed, and therefore, with the carriers C1, C2 acting as fulcrums, the reverse motor torque M that is inputted into the ring gears R1, R2 that act as points of application of force is transmitted to the sun gears S1, S2 that act as points of action as forward left and right rear wheel torques T1, T2 that result from multiplying motor torques M1, M2 by the gear ratios of the first and second planetary gear mechanisms PL1, PL2. Since the gear ratios of the first and second planetary gear mechanisms PL1, PL2 are equal, the left and right rear wheel torques T1, T2 become torques having equal absolute values and acting in the same direction, and this generates a left-right driving force sum that corresponds to a sum of the left and right rear wheel torques T1, T2 (T1+T2), whereby a forward driving force is given to the wheeled vehicle V stably. A difference between the left and right rear wheel torques T1, T2 (T1−T2) becomes zero, and with the first and second clutch CL1, CL2 staying in the first state, there is no such situation that a left-right driving force difference is generated from the rear wheel driving system 20 due to the generation of torque of the motor MOT, whereby no yaw moment is given to the wheeled vehicle V.

As shown in FIG. 18B(c), when the wheeled vehicle is running by torque vectoring drive (TV) with the first and second clutches CL1, CL2 put in the second state, a power transmission path between the motor MOT and the carriers C1, C2 of the first and second planetary gear mechanisms PL1, PL2 becomes a connected state, whereby the motor torques M1, M2 having equal absolute values and acting in the opposite directions are inputted from the motor MOT into the carriers C1, C2. Since in the ring gears R1, R2, motor torque distribution forces cancel (offset) each other, the left and right rear wheel torques T1, T2 having equal absolute values and acting in the opposite directions are generated in the sun gears S1, S2, whereby a left-right driving force difference corresponding a difference (T1−T2) between the left and right rear wheels torques T1, T2 is generated, and a counterclockwise yaw moment Y is given to the wheeled vehicle V in a stable fashion. With the sum of the left and right rear wheel torques T1, T2 (T1+T2) becomes zero and the first and second clutches CL1, CL2 staying in the second state, a left-right driving force sum is not generated from the rear wheel driving system 20 by the generation of torque of the motor MOT, and no front-rear torque is given to the wheeled vehicle V.

Thus, according to this embodiment, as has been described heretofore, the output shaft 21 of the motor MOT is connected to the ring gears R1, R2 of the first and second planetary gear mechanisms PL1, PL2 and the carriers C1, C2 of the first and second planetary gear mechanisms PL1, PL2 so as to switch therebetween selectively. Thus, with the single motor MOT, it becomes possible to output the front-rear torques acting in the same direction to the left and right rear wheels LWr, RWr or to output the torques acting in opposite directions to the left rear wheel LWr and the right rear wheel RWr without generating the front-rear torque. Further, the torque of the motor MOT is inputted to the different rotating elements of the first and second planetary gear mechanisms PL1, PL2 between when the front-rear torques acting in the same direction are outputted to the left and right rear wheels LWr, RWr and when the torques acting in the opposite directions are outputted to the left rear wheel LWr and the right rear wheel RWr without outputting the front-rear torque. Thus, by changing the gear ratios of the sun gears S1, S2, the ring gears R1, R2 and the carriers C1, C2, torque differences in magnitude can be induced in the front-rear assist and the turning assist.

Sixth Embodiment

Figure 19:
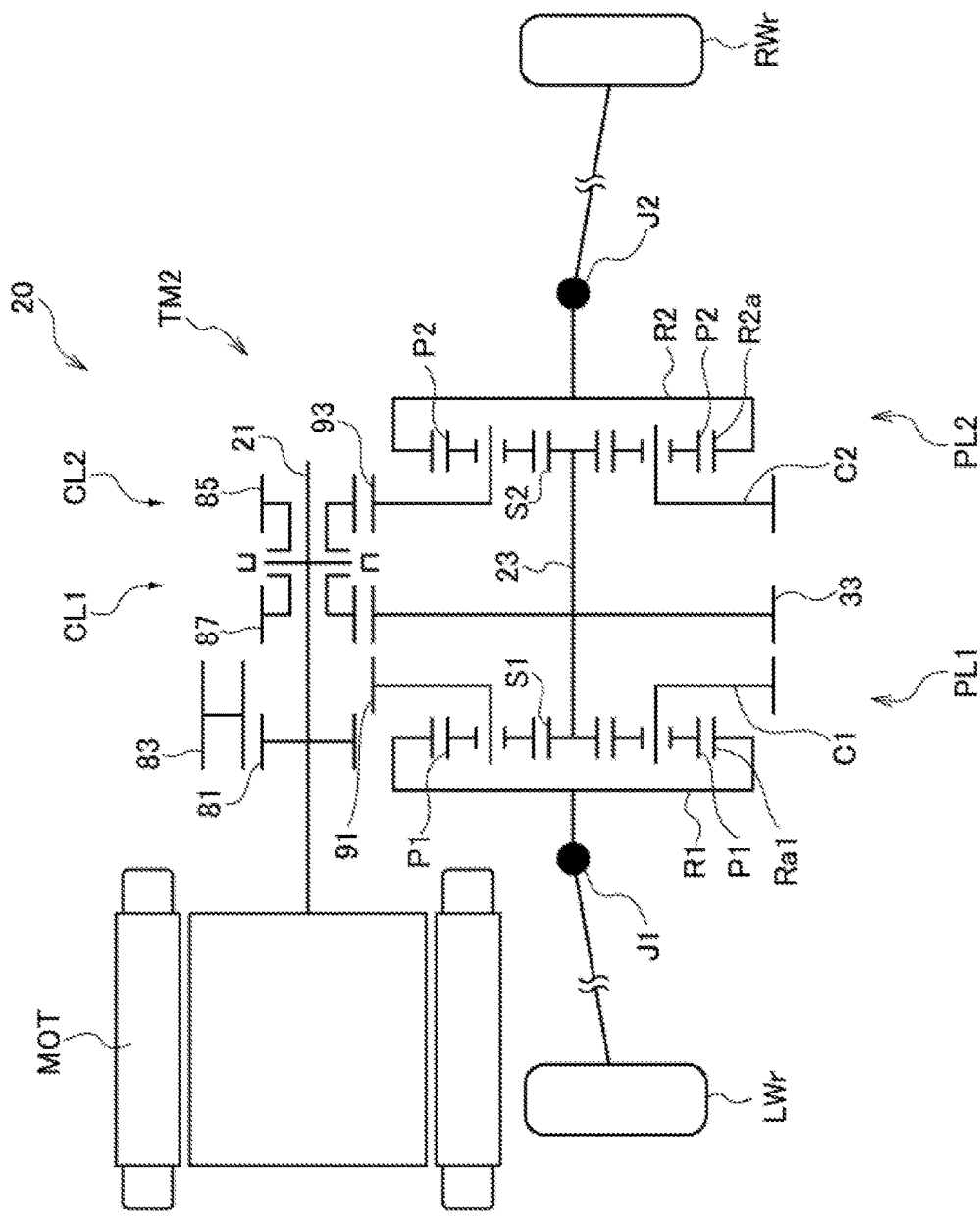
FIG. 19 is a skeleton diagram of a rear wheel driving system of a sixth embodiment.

Next, referring to FIG. 19, a rear wheel driving system 20 of a sixth embodiment will be described.

In this embodiment, a power transmission mechanism TM2 includes first and second clutches CL1, CL2 and two planetary gear mechanisms, which are first and second planetary gear mechanisms PL1, PL2. The first and second planetary gear mechanisms PL1, PL2 are each made up of a so-called single pinion planetary gear mechanism and include, respectively, sun gears S1, S2, ring gears R1, R2 and carriers C1, C2 which support pinions P1, P2 which mesh, respectively, with the sun gears S1, S2 and the ring gears R1, R2 in such a way that the pinions P1, P2 rotate on their own axes and revolve or walk around the sun gears S1, S2. Then, in this embodiment, the sun gears S1, S2 of the first and second planetary gear mechanisms PL1, PL2 make up first rotating elements of first and second differential mechanisms, the ring gears R1, R2 of the first and second planetary gear mechanisms PL1, PL2 make up second rotating elements of the first and second differential mechanisms, and the carriers C1, C2 of the first and second planetary gear mechanisms PL1, PL2 make up third rotating elements of the first and second differential mechanisms. Then, the sun gears S1, S2 of the first and second planetary gear mechanisms PL1, PL2 are connected to each other so as to rotate integrally via a connecting shaft 23. The ring gears R1, R2 of the first and second planetary gear mechanisms PL1, PL2 are connected to left and right rear wheels LWr, RWr via joints J1, J2, respectively.

A second input gear 33 is provided on the connecting shaft 23 that connects together the sun gears S1, S2 of the first and second planetary gear mechanisms PL1, PL2 equidistantly from the sun gears S1, S2 so as to rotate integrally with the sun gears S1, S2. Then, this second input gear 33 meshes with a hollow third output gear 87 that surrounds an outer circumference of the output shaft 21 of the motor MOT. The third output gear 87 is provided on the output shaft 21 of the motor MOT so as to rotate relatively thereto and is configured so as to rotate integrally with or relative to the output shaft 21 through switching by the first clutch CL1.

In the carrier C1 of the first planetary gear mechanism PL1, a first input gear 91 that is formed integrally meshes with an idle gear 83 that meshes with a first output gear 81 that is provided so as to rotate integrally with the output shaft 21. In the carrier C2 of the second planetary gear mechanism PL2, a second input gear 93 that is formed integrally meshes with a hollow second output gear 85 that surrounds an outer circumference of the output shaft 21 of the motor MOT. The second output gear 85 is provided on the output shaft 21 of the motor MOT so as to rotate relatively thereto and is configured so as to rotate integrally with or relative to the output shaft 21 through switching by the second clutch CL2.

Namely, the carriers C1, C2 of the first and second planetary gear mechanisms PL1, PL2 are connected together through three times of meshing including the meshing of the first input gear 91 with the idle gear 83, the meshing of the idle gear 83 with the first output gear 81 and the meshing of the second output gear 85 with the second input gear 93. The two carriers C1, C2 of the first and second planetary gear mechanisms PL1, PL2 operate so as to rotate in opposite directions to each other as a result of the carriers C1, C2 being connected together through the odd number of times of meshing in the way described above.

Additionally, a gear ratio resulting from the meshing of the first input gear 91 of the carrier C1 with the idle gear 83 and the meshing of the idle gear 83 with the first output gear 81 and a gear ratio resulting from the meshing of the second input gear 93 of the carrier C2 with the second output gear 85 are set so that absolute values thereof become equal to each other. Consequently, torque of the motor MOT is always transmitted to the carriers C1, C2 as torques having the equal absolute values and acting in the opposite directions.

The third output gear 87 and the second output gear 85 that are provided on an outer circumference of the output shaft 21 of the motor MOT are disposed so as not only to rotate relatively but also to face each other in an axial direction. The third output gear 87 and the second output gear 85 are made to rotate integrally or rotate relatively through switching by the first and second clutches CL1, CL2. Namely, the first clutch CL1 connects or disconnects the power transmission between the output shaft 21 of the motor MOT and the third output gear 87 by being applied or released. The second clutch CL2 connects or disconnects the power transmission between the output shaft 21 of the motor MOT and the second output gear 85 by being applied or released. The first and second clutches CL1, CL2 are each made up of a synchromesh mechanism that can be switched over by a common actuator and can be switched over on the same rotation axis, that is, the same rotation axis as the output shaft 21.

The first and second clutches CL1, CL2 are allowed to take selectively one of a state in which the first and second clutches CL1, CL2 are both released, a first state in which the first clutch CL1 is applied while the second clutch CL2 is released, and a second state in which the first clutch CL1 is released while the second clutch CL2 is applied.

In the state in which both the first and second clutches CL1, CL2 are released, the output shaft 21 is not brought into connection with either of the second output gear 85 and the third output gear 87, whereby a power transmission path between the output shaft 21 of the motor MOT and the first and second planetary gear mechanisms PL1, PL2 becomes disconnected state. When the first and second clutches CL1, CL2 take the state in which the clutches CL1, CL2 are both released, no torque is transmitted from the motor MOT to the left and right rear wheels LWr, RWr, whereby neither a left-right driving force sum nor a left-right driving force difference is generated from the rear wheel driving system 20, this enabling a front-wheel drive (FWD).

In the first state in which the first clutch CL1 is applied while the second clutch CL2 is released, the output shaft 21 is connected to the third output gear 87, whereby a power transmission path between the output shaft 21 of the motor MOT and the sun gears S1, S2 of the first and second planetary gear mechanisms PL1, PL2 becomes a connected state via a second input gear 33. When the first and second clutches CL1, CL2 take the first state, torques of the same magnitude are transmitted from the motor MOT to the left and right rear wheels LWr, RWr in the same direction in the front-rear direction, whereby a desired left-right driving force sum is generated from the rear wheel driving system 20 while no left-right driving force difference is generated therefrom, this enabling a four-wheel drive (4WD).

In the second state in which the first clutch CL1 is released while the second clutch CL2 is applied, the second output gear 85 is connected to the output shaft 21 of the motor MOT, whereby a power transmission path between the output shaft 21 and the carriers C1, C2 of the first and second planetary gear mechanisms PL1, PL2 becomes a connected state by way of the second output gear 85, the first output gear 81, and the idle gear 83. When the first and second clutches CL1, CL2 take the second state, torques of the same magnitude are transmitted from the motor MOT to the left and right rear wheels LWr, RWr in opposite directions in the front-rear direction, whereby a desired left-right driving force difference is generated from the rear wheel driving system 20 while no left-right driving force sum is generated therefrom, this enabling a torque vectoring drive (TV).

A collinear chart of the rear wheel driving system 20 of this embodiment is represented by replacing the sun gears S1, S2 with the ring gears R1, R, respectively, and the ring gears R1, R2 with the sun gears S1, S2, respectively, in FIG. 18B. The other functions and advantages of this embodiment are similar to those of the rear wheel driving system 20 of the fifth embodiment.

Thus, according to this embodiment, as has been described heretofore, the output shaft 21 of the motor MOT is connected to the sun gears S1, S2 of the first and second planetary gear mechanisms PL1, PL2 and the carriers C1, C2 of the first and second planetary gear mechanisms PL1, PL2 so as to switch therebetween selectively. Thus, with the single motor MOT, it becomes possible to output the front-rear torques acting in the same direction to the left and right rear wheels LWr, RWr or to output the torques acting in opposite directions to the left rear wheel LWr and the right rear wheel RWr without generating the front-rear torque. Further, the torque of the motor MOT is inputted to the different rotating elements of the first and second planetary gear mechanisms PL1, PL2 between when the front-rear torques acting in the same direction are outputted to the left and right rear wheels LWr, RWr and when the torques acting in the opposite directions are outputted to the left rear wheel LWr and the right rear wheel RWr without outputting the front-rear torque. Thus, by changing the gear ratios of the sun gears S1, S2, the ring gears R1, R2 and the carriers C1, C2, torque differences in magnitude can be induced in the front-rear assist and the turning assist.

The present invention is not limited to the embodiments and the modified examples which have been described heretofore and hence can be modified or improved as required.

Figure 20:
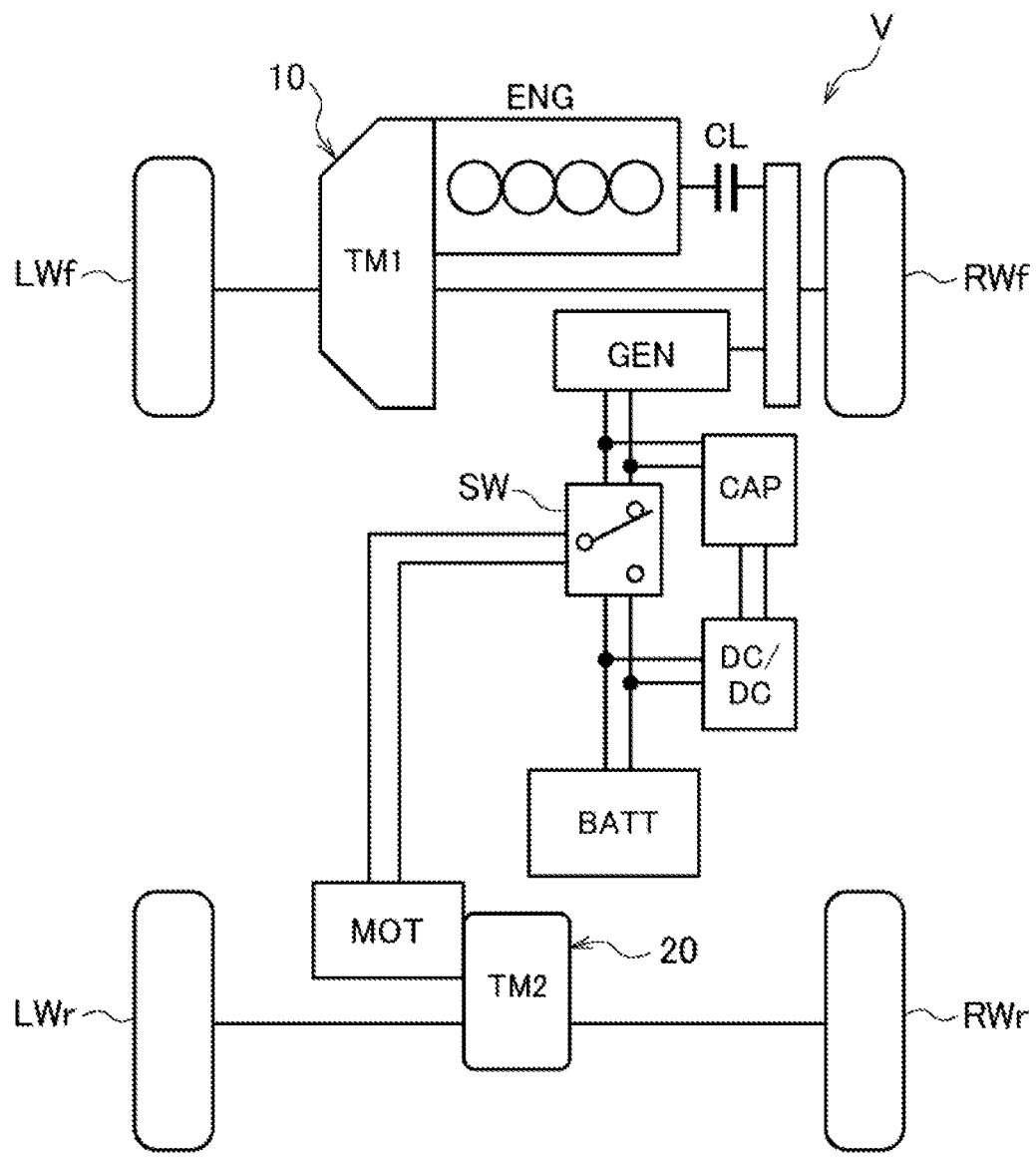
FIG. 20 is a schematic block diagram of a wheeled vehicle according to another embodiment on which the power transmission system of the invention can be mounted.
Figure 21:
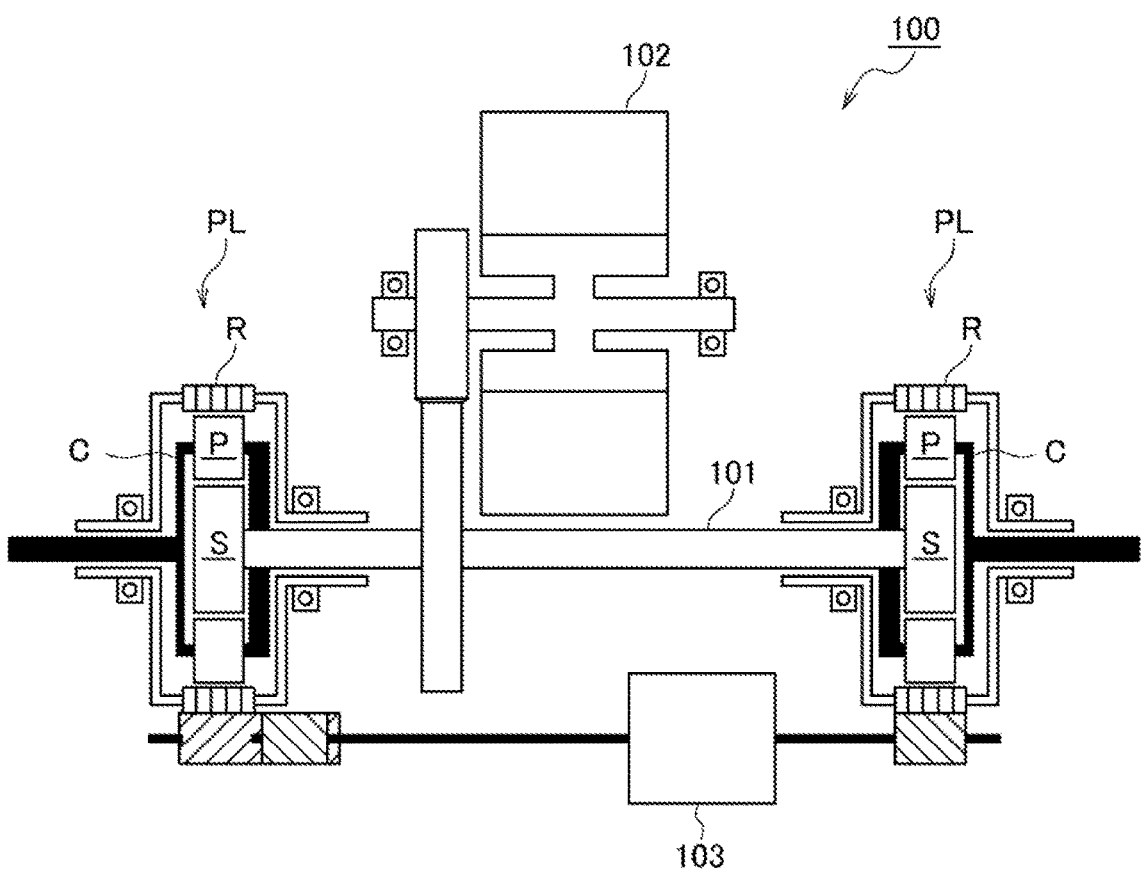
FIG. 21 is a schematic block diagram of a conventional driving force distribution system described in Patent Literature 1.

For example, in addition to the wheeled vehicle V depicted in FIG. 1, as shown in FIG. 20, a capacitor CAP is disposed on an electric power path between a switching mechanism SW and a generator GEN, and the capacitor CAP is connected to a battery BATT via a DC/DC converter. In this way, providing the capacitor CAP on the electric power path between the switching mechanism SW and the generator GEN enables the capacitor CAP to assist in supplying electric power that is insufficient in such a case that the generator GEN cannot generate sufficient electric power as when an engine ENG runs at low rotation speeds. In such a case, when the wheeled vehicle V starts, a front-rear running assist is made by means of the energy of the capacitor CAP, and thereafter, the capacitor CAP may be switched to the generator GEN. Another battery may be used in place of the capacitor CAP.

Additionally, a combination may be adopted in which a generated voltage of the generator GEN differs from a charged voltage of the battery BATT.

In addition, clutches of various configurations including a friction clutch, a synchronized clutch and a dog clutch can be adopted for the first and second clutches CL1, CL2.

Further, the driving system of the invention can be mounted on propelling members of vehicle including wheels of various wheeled vehicles such as a hybrid vehicle, a plug-in hybrid vehicle and a range extender, propellers of aeroplanes and screws of boats.

Further, in the embodiments described above, the planetary gear mechanisms are described as being differential mechanisms. However, other differential mechanisms may be adopted which includes other types of planetary gear mechanisms using no gearwheels such as a cyclone reducer, and differential mechanisms.

This patent application is based on Japanese Patent Application (No. 2013-259429) filed on Dec. 16, 2013, the contents of which are incorporated herein by reference.

DESCRIPTION OF REFERENCE NUMERALS AND CHARACTERS 20 rear wheel driving system (driving system)
21 output shaft
V wheeled vehicle (vehicle)
ENG engine (another drive source)
MOT motor (drive source)
TM1, TM2 power transmission mechanism
PL1, PL2 first and second planetary gear mechanisms (first and second differential mechanisms)
S1, S2 sun gear (first rotating element, second rotating element, third rotating element)
C1, C2 carrier (first rotating element, second rotating element, third rotating element)
R1, R2 ring gear (first rotating element, second rotating element, third rotating element)
LWr left rear wheel (left driving portion)
RWr right rear wheel (right driving portion)
CL1 first clutch (first switching mechanism, switching unit)

CL2 second clutch (second switching mechanism, switching unit)
GEN generator (first energy delivery and receipt unit)
CAP capacitor (first energy delivery and receipt unit)
BATT battery (second energy delivery and receipt unit)

The invention claimed is:

1. A driving system comprising:
a drive source, which drives a left driving portion that is disposed on a left side of a vehicle with respect to a traveling direction and a right driving portion that is disposed on a right side of the vehicle with respect to the traveling direction; and
a power transmission mechanism, which has a first differential mechanism and a second differential mechanism, each having a first rotating element, a second rotating element, and a third rotating element, wherein:
the first rotating elements of the first and second differential mechanisms are connected to each other so as to rotate integrally in a same direction;
the second rotating elements of the first and second differential mechanisms are connected to the left driving portion and the right driving portion, respectively;
the third rotating elements of the first and second differential mechanisms are connected to each other so as to rotate in opposite directions;
the power transmission mechanism comprises:
a first switching mechanism that can switch between an applied state where a power transmission path between the drive source and the first rotating elements of the first and second differential mechanisms is connected and a released state where the power transmission path between the drive source and the first rotating elements of the first and second differential mechanisms is disconnected; and
a second switching mechanism that can switch between an applied state where a power transmission path between the drive source and the third rotating elements of the first and second differential mechanisms is connected and a released state where the power transmission path between the drive source and the third rotating elements of the first and second differential mechanisms is disconnected;
the power transmission mechanism is configured to switch between a first state where the first switching mechanism is in the applied state while the second switching mechanism is in the released state and a second state where the first switching mechanism is in the released state while the second switching mechanism is in the applied state, and
the first switching mechanism and the second switching mechanism are disposed on a same rotational axis,
wherein the first rotating elements of the first and second differential mechanisms are disposed on another rotational axis that is different from the rotational axis,
the first switching mechanism and the second switching mechanism are disposed in a position that is offset from the first rotating elements of the first and second differential mechanisms in an axial direction, and
the first switching mechanism and the second switching mechanism are disposed between the first rotating elements of the first and second differential mechanisms in the axial direction.

2. The driving system according to claim 1, wherein:
the first rotating elements of the first and second differential mechanisms are disposed on the rotational axis.

3. The driving system according to claim 1, wherein
the first switching mechanism and the second switching mechanism are switched between the applied state and the released state by a same operating device.

* * * * *